US011695608B2

United States Patent
Gaal et al.

(10) Patent No.: US 11,695,608 B2
(45) Date of Patent: Jul. 4, 2023

(54) PEAK REDUCTION TONE ALLOCATION TECHNIQUES

(71) Applicant: QUALCOMM Incorporated, San Diego, CA (US)

(72) Inventors: Peter Gaal, San Diego, CA (US); Saeid Sahraei, San Diego, CA (US); Krishna Kiran Mukkavilli, San Diego, CA (US); June Namgoong, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/331,605

(22) Filed: May 26, 2021

(65) Prior Publication Data

US 2021/0377088 A1  Dec. 2, 2021

Related U.S. Application Data

(60) Provisional application No. 63/031,478, filed on May 28, 2020.

(51) Int. Cl.
*H04L 27/26* (2006.01)
*H04W 72/0453* (2023.01)

(52) U.S. Cl.
CPC ..... *H04L 27/2614* (2013.01); *H04W 72/0453* (2013.01)

(58) Field of Classification Search
CPC ............. H04L 27/2614; H04L 27/2618; H04L 27/2615; H04W 72/0453
See application file for complete search history.

(56) References Cited

U.S. PATENT DOCUMENTS

| 6,314,146 B1 | 11/2001 | Tellado et al. |
| 11,425,666 B2 * | 8/2022 | Wolf .................. H04W 52/54 |

(Continued)

FOREIGN PATENT DOCUMENTS

| EP | 1569372 A1 | 8/2005 |
| EP | 2056553 A1 | 5/2009 |

(Continued)

OTHER PUBLICATIONS

Partial International Search Report—PCT/US2021/034636—ISA/EPO—dated Sep. 2, 2021.
International Search Report and Written Opinion—PCT/US2021/034636—ISA/EPO—dated Dec. 6, 2021.
Jiang Y., et al., "Adaptive Weight Peak-Cancelling Scheme for OFDM Systems", IEEE International Symposium on Personal, Indoorand Mobile Radio Communications, PIMRC, IEEE, PI, XX, Sep. 1, 2007 (Sep. 1, 2007), 6 Pages, XP031168524, DOI: 10.1109/PIMRC.2007.4394319, ISBN: 978-1-4244-1143-6, Abstract p. 1-p. 3.

(Continued)

*Primary Examiner* — Jay P Patel
(74) *Attorney, Agent, or Firm* — Procopio, Cory, Hargreaves & Savitch LLP/Qualcomm

(57) ABSTRACT

A transmitting device communicates with a receiving device an indication to apply PAPR reduction for a data transmission. The transmitting device applies a first PAPR reduction signal and a second PAPR reduction signal to the data transmission to reduce at least one signal peak of the data transmission to yield a transmission signal, where the first PAPR reduction signal includes a first set of PRTs that does not overlap with data tones and the second PAPR reduction includes a second set of PRTs that overlaps with the data tones and does not overlap with reserved tones. The transmitting device transmits the transmission signal to the receiving device.

31 Claims, 31 Drawing Sheets

(56) References Cited

U.S. PATENT DOCUMENTS

| | | | |
|---|---|---|---|
| 2006/0140296 A1* | 6/2006 | Cleveland | H04L 27/2618 375/296 |
| 2007/0280365 A1* | 12/2007 | Seki | H04L 5/0048 375/260 |
| 2010/0166105 A1* | 7/2010 | Wu | H04L 27/262 375/295 |
| 2010/0172438 A1 | 7/2010 | Koyanagi et al. | |
| 2018/0269910 A1* | 9/2018 | Tanahashi | H04L 27/2618 |
| 2018/0278452 A1* | 9/2018 | Yang | H04B 1/0071 |
| 2021/0195535 A1* | 6/2021 | Wolf | H04W 72/042 |
| 2021/0288854 A1* | 9/2021 | Mukkavilli | H04L 27/2618 |
| 2021/0328847 A1* | 10/2021 | Zach | H04B 7/0617 |
| 2021/0344537 A1* | 11/2021 | Sahraei | H04L 27/2618 |
| 2021/0344544 A1* | 11/2021 | Sahraei | H04W 72/0453 |
| 2021/0351868 A1* | 11/2021 | Sahraei | H04L 27/34 |
| 2021/0359890 A1* | 11/2021 | Sahraei | H04L 27/2614 |
| 2021/0360635 A1* | 11/2021 | Sahraei | H04W 72/0453 |
| 2021/0377089 A1 | 12/2021 | Gaal et al. | |

FOREIGN PATENT DOCUMENTS

| | | | | |
|---|---|---|---|---|
| EP | 2706714 A1 * | 3/2014 | | H04L 27/2618 |
| WO | WO-2016122204 A1 * | 8/2016 | | H04B 1/0071 |
| WO | WO-2021243096 A2 * | 12/2021 | | H04L 27/2614 |

OTHER PUBLICATIONS

Jiang Y., et al., "Low-Complexity Polyphase-Kernels-Based PAPR Reduction in OFDM", Wireless Communications & Signal Processing, 2009. WCSP 2009. International Conference on, IEEE, Piscataway, NJ, USA, Nov. 13, 2009 (Nov. 13, 2009), pp. 1-4, XP031594665, ISBN: 978-1-4244-4856-2 paragraph [0011].

Lim D-W., et al., "Construction of the Near Optimal PRT Set Using the Cyclic Difference Set in TR Scheme", IEEE International Symposium on Personal, Indoor and Mobile Radio Communications, PIMRC, IEEE, PI, XX, Sep. 1, 2007 (Sep. 1, 2007), 5 Pages, XP031168166, DOI: 10.1109/PIMRC.2007.4394056 ISBN: 978-1-4244-1143-6 paragraph [0111].

Lim D.W., et al., "Near Optimal PRT Set Selection Algorithm for Tone Reservation in OFDM Systems," IEEE Transactions on Broadcasting, 2008, IEEE Service Center, Piscataway, NJ, US, vol. 54 (3), Part 1,Sep. 1, 2008 (Sep. 1, 2008), XP011343428, pp. 454-460, ISSN: 0018-9316, DOI:10.1109/TBC.2008.2000463 paragraph [IIIB].

Yu P., et al., "A Low Complexity Tone Reservation Scheme Based on Time-Domain Kernel Matrix for PAPR Reduction in OFDM Systems", IEEE Transactions on Broadcasting, vol. 61, No. 4, Dec. 2015, pp. 710-716.

* cited by examiner

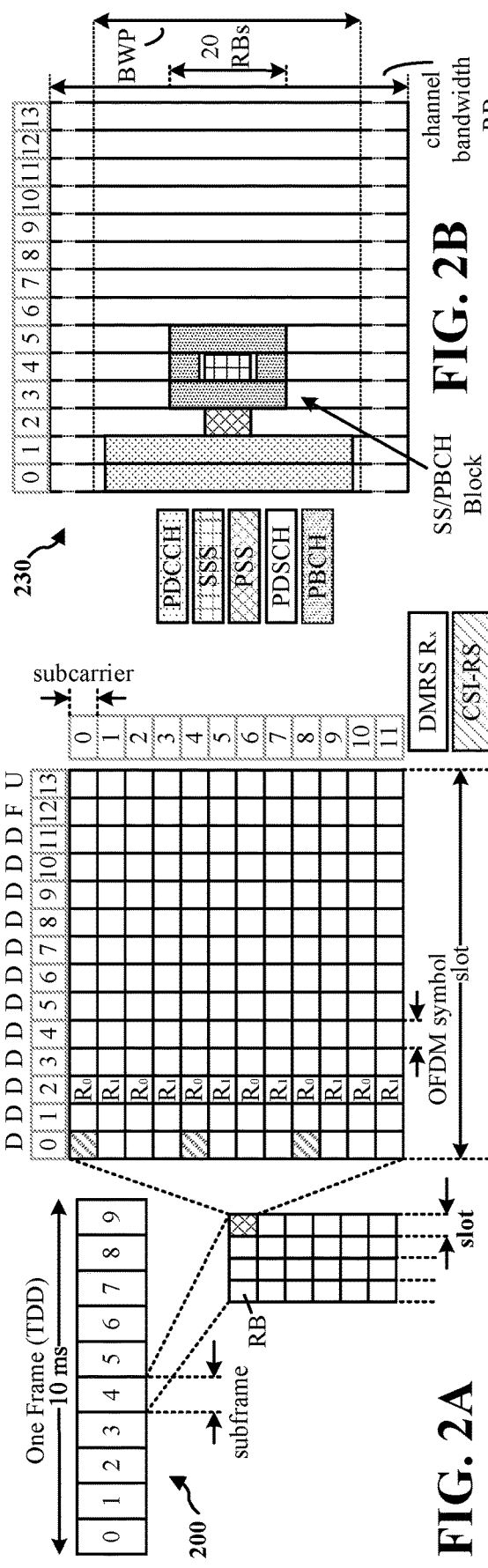
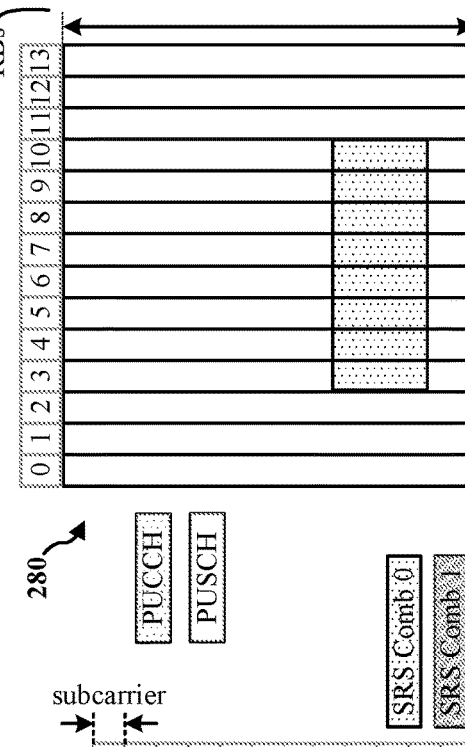
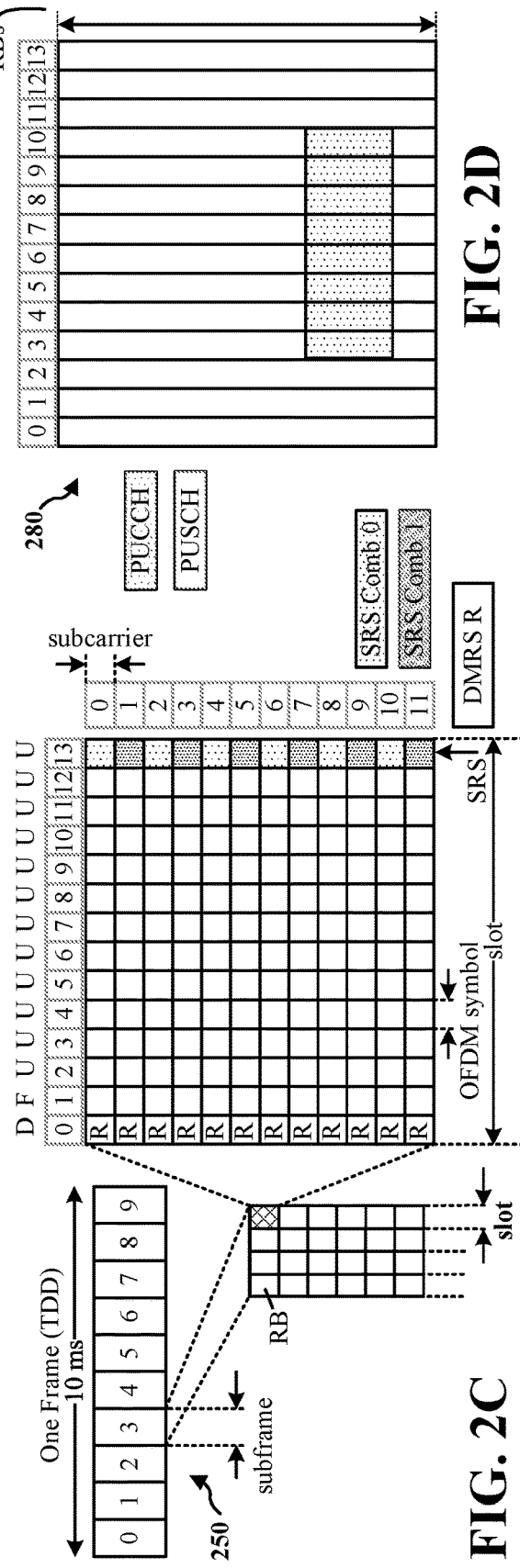
FIG. 2A  FIG. 2B  FIG. 2C  FIG. 2D

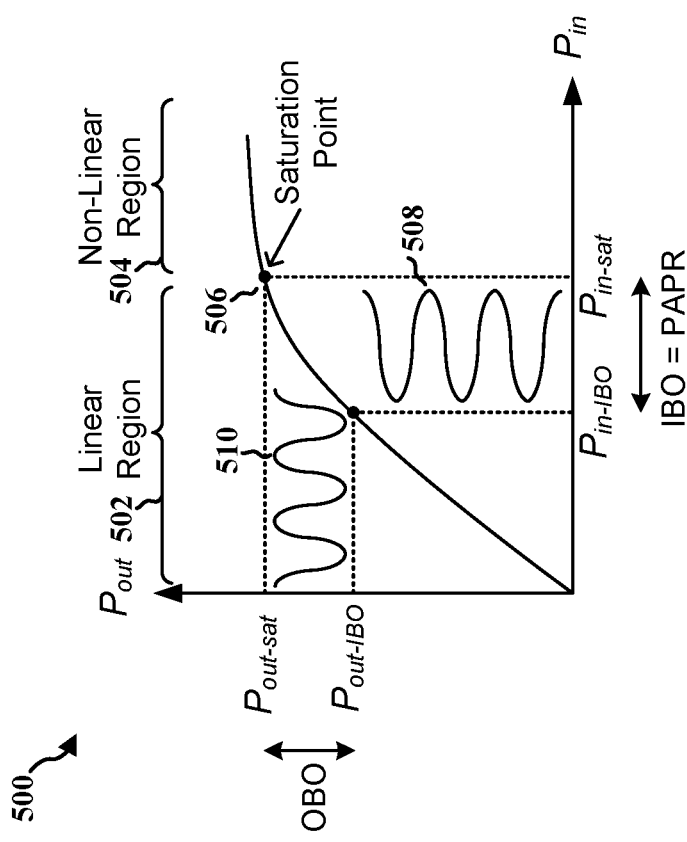

PEAK REDUCTION TONE ALLOCATION TECHNIQUES

CROSS REFERENCE TO RELATED APPLICATION(S)

This application claims the benefit of U.S. Provisional Application Ser. No. 63/031,478, entitled "PEAK REDUCTION TONE ALLOCATION TECHNIQUES" and filed on May 28, 2020, which is expressly incorporated by reference herein in its entirety. This application is also related to U.S. application Ser. No. 17/331,612, entitled "PEAK REDUCTION TONE ALLOCATION TECHNIQUES" and filed on May 26, 2021, which is also expressly incorporated by reference herein in its entirety.

TECHNICAL FIELD

The present disclosure relates generally to communication systems, and more particularly, to a wireless communication involving a peak reduction tone allocation. Some embodiments enable and provide techniques for managing and/or reducing peak-to-average power ratio (PAPR) to aid in efficient system operations (e.g., non-saturated power amplifier operations) and/or resource usage (e.g., leveraging tone selection for opportunistic transmissions and quality communications).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. In some aspects, the wireless communication may be performed at a transmitting device (e.g., user equipment, network node, or network equipment). The transmitting device may be configured to communicate with a receiving device an indication to apply peak to average power ratio (PAPR) reduction for a data transmission. The transmitting device may be configured to apply a first PAPR reduction signal and a second PAPR reduction signal to the data transmission to reduce at least one signal peak of the data transmission to yield a transmission signal, where the first PAPR reduction signal includes a first set of PRTs that does not overlap with data tones and the second PAPR reduction includes a second set of PRTs that overlaps with the data tones and does not overlap with reserved tones. Then, the transmitting device may be configured to transmit the transmission signal to the receiving device.

In an aspect of the disclosure, a method, a computer-readable medium, and an apparatus are provided for wireless communication. In some aspects, the wireless communication may be performed at a transmitting device (e.g., user equipment, network node, or network equipment). The transmitting device may be configured to generate a first PAPR reduction signal from a first set of peak reduction tones (PRTs) within a plurality of tones, where the plurality of tones further include one or more reserved tones and the first set of PRTs does not overlap with data tones of the plurality of tones. The transmitting device may be configured to generate a second PAPR reduction signal from a second set of PRTs within the plurality of tones, where at least a part of the second set of PRTs overlaps with the data tones, and the second set of PRT does not overlap with reserved tones of the plurality of tones. Then, the transmitting device may be configured to apply the first PAPR reduction signal and the second PAPR reduction signal to a data transmission, where at least one signal peak of the data transmission is reduced by the first PAPR reduction signal and the second PAPR reduction signal. Then the transmitting device can send the data transmission to a receiving device.

In an aspect of the disclosure, a method, a computer-readable medium, and an apparatus are provided for wireless communication. In some aspects, the wireless communication may be performed at a receiving device (e.g., user equipment, network node, or network equipment). The receiving device may be configured to receive a data transmission from a transmitting device, where at least one signal peak of the data transmission is reduced by a combination of a first PAPR reduction signal and a second PAPR reduction signal at the transmitting device, where the first PAPR reduction signal includes a first set of PRTs within a plurality of tones, and the plurality of tones further include one or more data tone and the first set of PRTs does not overlap with the one or more data tone, and where the second PAPR reduction signal includes a second set of PRTs within the plurality of tones, and at least a part of the second set of PRTs overlaps with the one or more data tone, and the second set of PRT does not overlap with the first set of PRT. Then the receiving device may be configured to identify a location, a magnitude and a phase of the at least one signal peak of the data transmission that is reduced based on a location of the first set of PRTs or the second set of PRTs or the one or more data tones or a combination thereof. Additionally, the receiving device may be configured to regenerate at least a portion of the at least one signal peak of the data transmission that is reduced based at least in part on the identified location, magnitude and phase of the at least one signal peak of the data transmission that is reduced.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively in accordance with various aspects of the present disclosure.

FIG. 5 is a diagram illustrating an example of operating the power amplifier at a mean input power in accordance with various aspects of the present disclosure.

DETAILED DESCRIPTION

Figure 1:
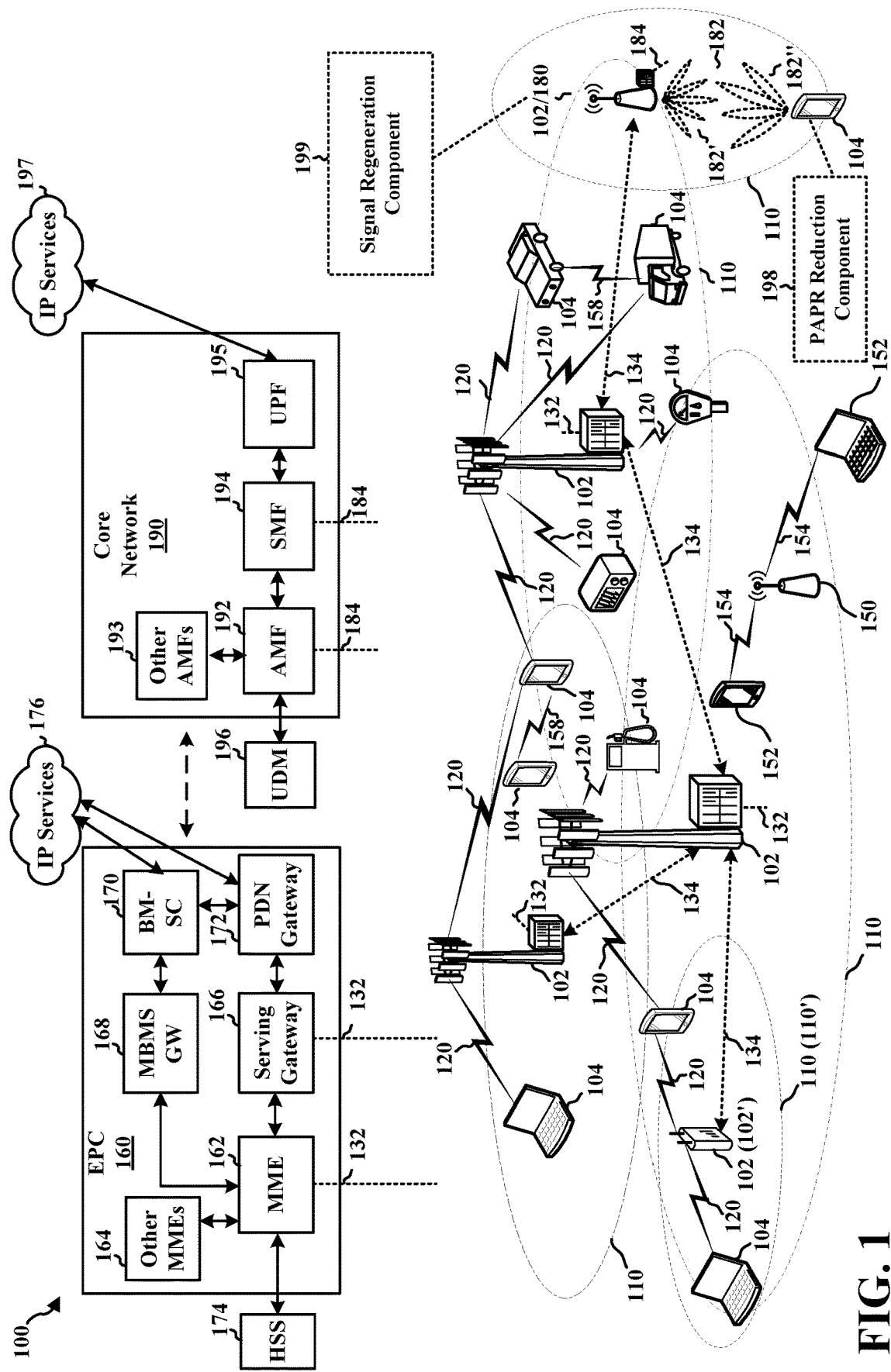
FIG. 1 is a diagram illustrating an example of a wireless communications system and an access network in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Techniques discussed herein generally relate to communication scenarios involving tone reservation and/or selection taking into account operational conditions. Aspects presented herein may improve the efficiency and performance of the tone reservation PAPR reduction technique by allocating PRTs based at least in part on the optimal Golomb ruler. Additionally, and/or alternatively, aspects presented herein may enable a transmitting device to use one or more kernels to generate one or more peak cancellation signal to reduce the PAPR of the transmission. Further, aspects presented herein may enable a receiving device to regenerate one or more peak(s) cancelled by a transmitting device to improve the SNR of the transmission.

FIG. 1 is a diagram illustrating an example of a wireless communications system and an access network 100. While the examples below may use the UE 104 to illustrate the transmitting device and use the base station 102 to illustrate the receiving device, the UE 104 may also be the receiving device and the base station 102 may also be the transmitting device. For purpose of illustration, the UE 104 may be the transmitting device and the base station 102 may be the receiving device for the examples below.

In certain aspects, the UE 104 may include a peak to average power ratio (PAPR) reduction component 198 configured to generate one or more peak cancelling signals, where the one or more peak cancelling signals may be generated from different kernels. The PAPR may represent the ratio of the largest peak of a waveform and the square root of an average power of the waveform. A first kernel may allocate PRTs on the reserved tones of a plurality of tones, and a second kernel may allocate PRTs on the data tones of the plurality of tones. As used here, a "tone" may be a single subcarrier in a frequency range. Then the UE 104 may use peak cancelling signals generated from the first kernel and the second kernel to cancel one or more peak of a signal transmission to reduce the PAPR of the signal transmission. A "peak cancelling signal" may refer to a signal that reduces the PAPR of a combined signal transmission. The UE 104 may combine the peak cancelling signals prior to perform the peak cancellation. In one configuration, the PAPR reduction component 198 may be configured to communicate with a receiving device an indication to apply PAPR reduction for a data transmission. In such configuration, the PAPR reduction component 198 may further be configured to apply a first PAPR reduction signal and a second PAPR reduction signal to the data transmission to reduce at least one signal peak of the data transmission to yield a transmission signal, where the first PAPR reduction signal includes a first set of PRTs that does not overlap with data tones and the second PAPR reduction includes a second set of PRTs that overlaps with the data tones and does not overlap with reserved tones.

In such configuration, the PAPR reduction component 198 may further be configured to transmit the transmission signal to the receiving device.

In another configuration, the PAPR reduction component 198 may be configured to generate a first PAPR reduction signal from a first set of PRTs within a plurality of tones, where the plurality of tones further include one or more reserved tones and the first set of PRTs does not overlap with data tones of the plurality of tones. In such configuration, the PAPR reduction component 198 may further be configured to generate a second PAPR reduction signal from a second set of PRTs within the plurality of tones, where at least a part of the second set of PRTs overlaps with the data tones, and the second set of PRTs does not overlap with reserved tones of the plurality of tones. In such configuration, the PAPR reduction component 198 may further be configured to apply the first PAPR reduction signal and the second PAPR reduction signal to a data transmission, where at least one signal peak of the data transmission is reduced by the first PAPR reduction signal and the second PAPR reduction signal. In such configuration, the PAPR reduction component 198 may further be configured to transmit the data transmission to a receiving device.

In certain aspects, the base station may include a signal regeneration component 199 configured to regenerate one or more peak cancelled by the PAPR reduction component 198, or by one or more kernel. The signal regeneration component 199 may identify the location, magnitude and phase of one or more cancelled peak within the data transmission, and then regenerate at least a portion of the one or more cancelled peak. In one configuration, the signal regeneration component 199 may be configured to receive a data transmission from a transmitting device, where at least one signal peak of the data transmission is reduced by a combination of a first PAPR reduction signal and a second PAPR reduction signal at the transmitting device, where the first PAPR reduction signal includes a first set of PRTs within a plurality of tones, and the plurality of tones further include one or more data tone and the first set of PRTs does not overlap with the one or more data tone, and where the second PAPR reduction signal includes a second set of PRTs within the plurality of tones, and at least a part of the second set of PRTs overlaps with the one or more data tone, and the second set of PRTs does not overlap with the first set of PRT. In such configuration, the signal regeneration component 199 may further be configured to identify a location, a magnitude and a phase of the at least one signal peak of the data transmission that is reduced based on a location of the first set of PRTs or the second set of PRTs or the one or more data tones or a combination thereof. In such configuration, the signal regeneration component 199 may further be configured to regenerate at least a portion of the at least one signal peak of the data transmission that is reduced based at least in part on the identified location, magnitude and phase of the at least one signal peak of the data transmission that is reduced.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G/NR frame structure that is TDD.

The illustrated examples in FIG. 2A-2D are merely to illustrate example aspects of a frame structure, and the aspects presented herein may be applied with various frame structures and/or channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2 slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
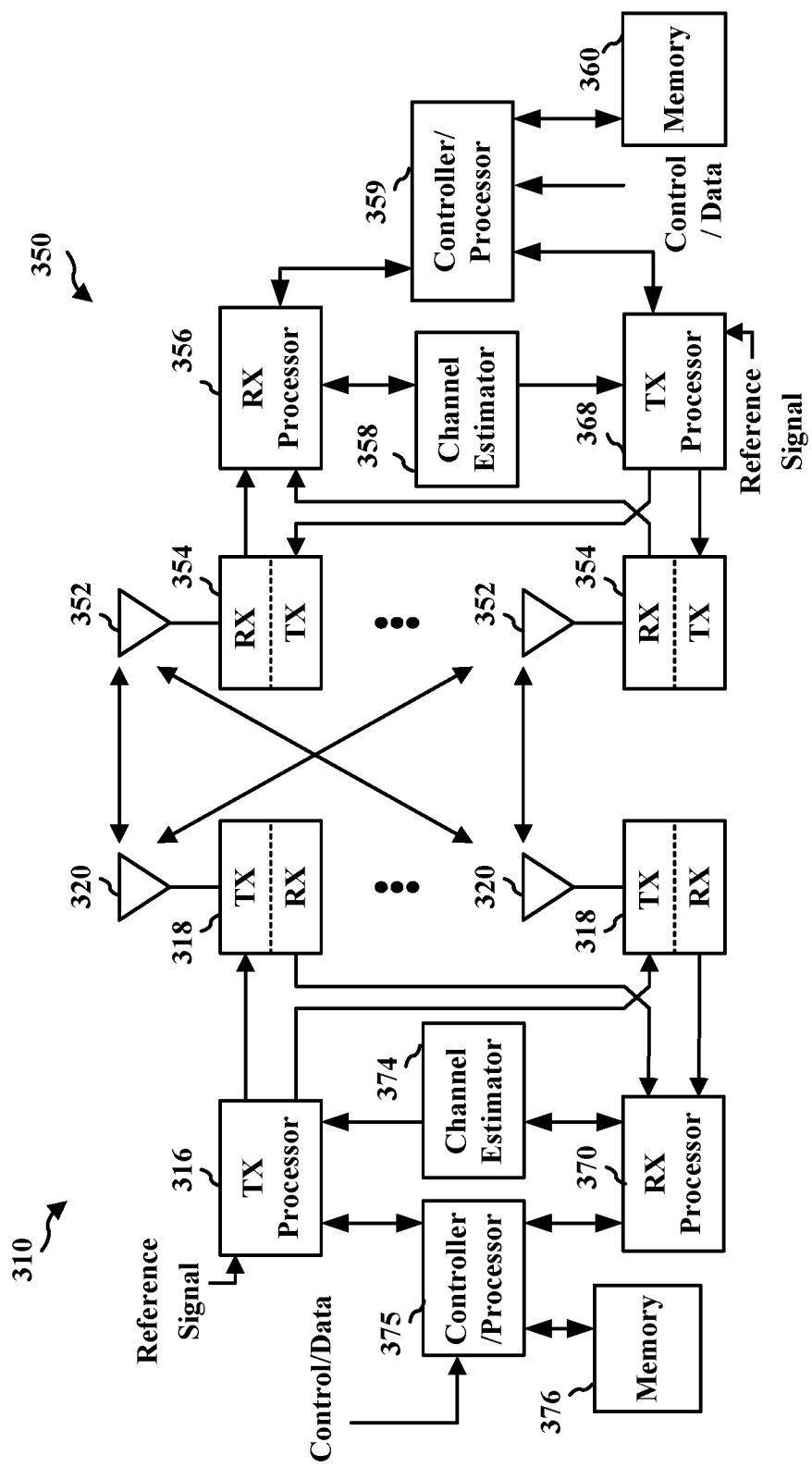
FIG. 3 is a diagram illustrating an example of a base station and user equipment (UE) in an access network in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PAPR reduction component 198 of FIG. 1.

At least one of the TX processor 316, the RX processor 370, and the controller/processor 375 may be configured to perform aspects in connection with the signal regeneration component 199 of FIG. 1.

A power amplifier (PA) is a device that may be used to increase the magnitude (e.g., voltage, current, power, etc.) of an input signal. A PA may take in a weak electrical signal or waveform, and then reproduce a similar but stronger waveform at an output by using extra power. The design and implementation of PAs in wireless communications may help signals transmitted by transmitting devices to be strong enough to reach (e.g., to be received by) the receiving devices.

Figure 4:
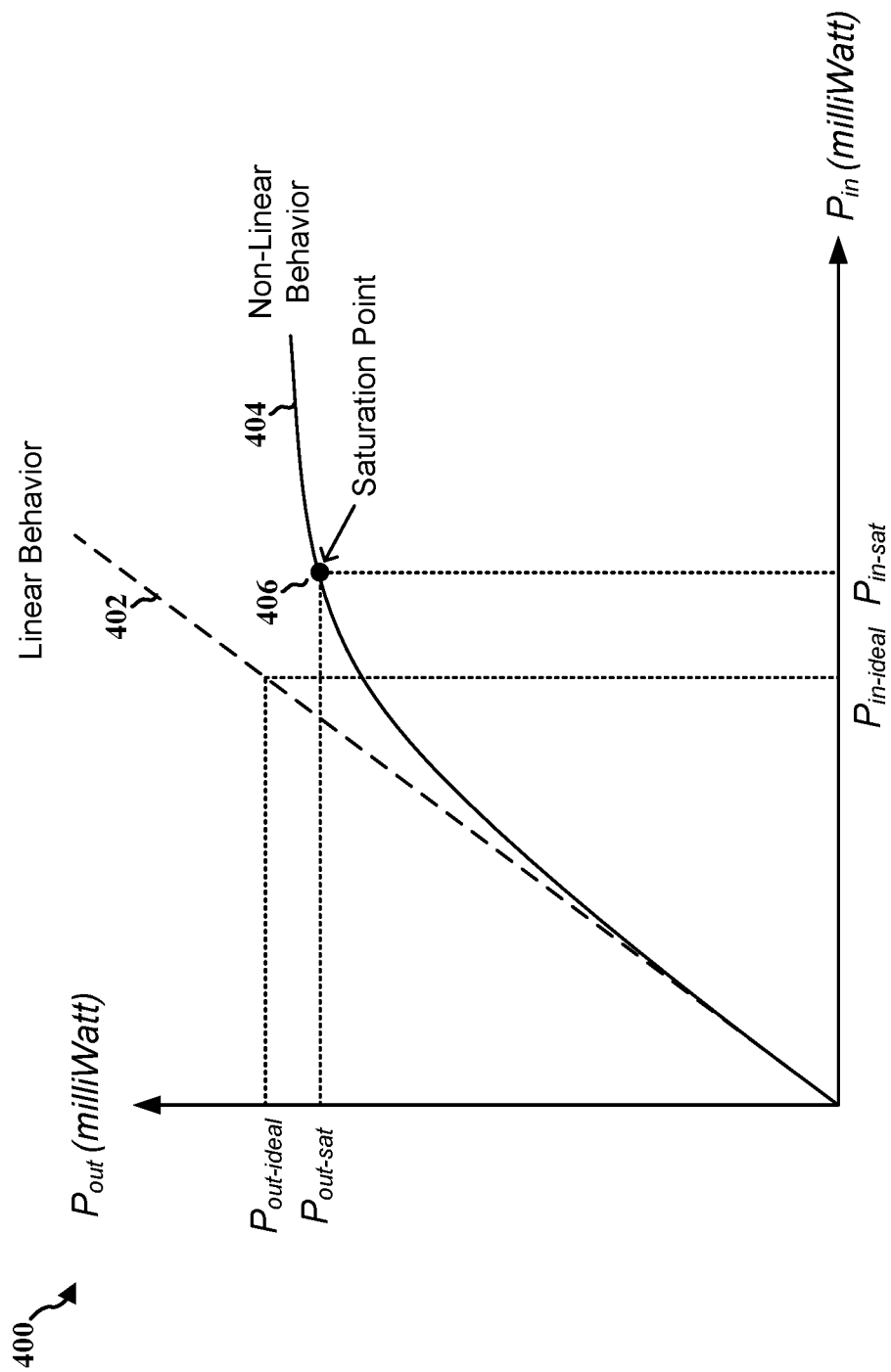
FIG. 4 is a diagram illustrating an example of relationship between the input signal and the output signal of the power amplifier in accordance with various aspects of the present disclosure.

As a PA may consume extra power to magnify an input signal, a goal may be for a PA to have a linear relationship between an input signal and an output signal. FIG. 4 is a diagram 400 illustrating an example relationship between an input signal ($P_{in}$) and an output signal ($P_{out}$) for a PA with a linear behavior and a PA with non-linear behavior. For the PA with linear behavior 402, the output signal (e.g., $P_{out\text{-}ideal}$) may be directly proportional to the input signal (e.g., $P_{in\text{-}ideal}$). For example, if 10 milliWatt of input signal power corresponds to 15 milliWatt of output signal power, then 20 milliWatt of input signal power may correspond to 30 milliWatt of output signal power, etc.

However, PAs may approximately follow the linear behavior for a limited range of input signals (e.g., within the linear region 502 as shown by FIG. 5) and may have non-linear behavior outside the range of the input signals. As the output signal power of the PA may not increase indefinitely due to physical constrains, at some point (e.g., at the saturation point 406), an increase in input signal power for the PA may not produce a discernible increase in the output signal power. Thus, the PA may follow non-linear behavior 404 as shown by FIG. 4, and the non-linear behavior 404 may become particularly noticeable when the PA is operating at higher input signal powers (e.g., at the non-linear region 504 as shown by FIG. 5). For example, when a PA is saturated (e.g., passing the saturation point 406), the PA's output signal may no longer be proportional to the input signal, where a large increase in an input signal power beyond the saturation input signal power (e.g., $P_{in\text{-}sat}$) point may yield a relatively small increase in an output signal power from the saturation output signal power (e.g., $P_{out\text{-}sat}$) point. As the PA may consume a significant fraction of the power in a communication device, operating the PA beyond the saturation point may waste additional power, and may be an inefficient use of the PA. In addition, the non-linear behavior 404 of the PA may also result in in-band and out-of-band distortion of the signal, and may degrade error vector magnitude (EVM) at the receivers when the input signal power and the output power are not proportional.

To avoid operating a PA beyond the saturation point (e.g., to avoid the drawbacks of the non-linearity at high input power), the PA may be configured to operate at a mean input power that is several dB lower than the saturation point, such that the input signal power may not exceed the saturation input signal power (e.g., $P_{in\text{-}sat}$) point. FIG. 5 is a diagram 500 illustrating operating a PA at a mean input power (e.g., $P_{in\text{-}IBO}$). For example, for an input signal waveform 508 with a high peak to average power ratio (PAPR), the waveform 508 may be transmitted in the linear region 502 of the PA by decreasing the average power of the input signal (e.g., Pin). This may be referred to as an "input backoff" (IBO), which may result in a proportional "output backoff" (OBO). A PA may operate most efficiently when the IBO is close or equal to the PAPR of the input signal. For example, if an input signal has a PAPR of X dB, then an IBO of X dB may be applied to the PA to avoid the non-linearity. This enables the input signal to be amplified within the linear region 502 when the waveform 508 of the input signal is at the peak. For example, if the waveform 508 has a PAPR of 10 dB, and the PA also has an IBO equals or close to 10 dB, then the waveform 508 may be amplified within the linear region 502 without crossing the saturation point 506 (e.g., $P_{in\text{-}sat}$). This may prevent the output signal waveform 510 from distortion during an amplification, which may happen when the waveform 508 or part of the waveform 508 is amplified at the non-linear region 504.

Figure 6B:
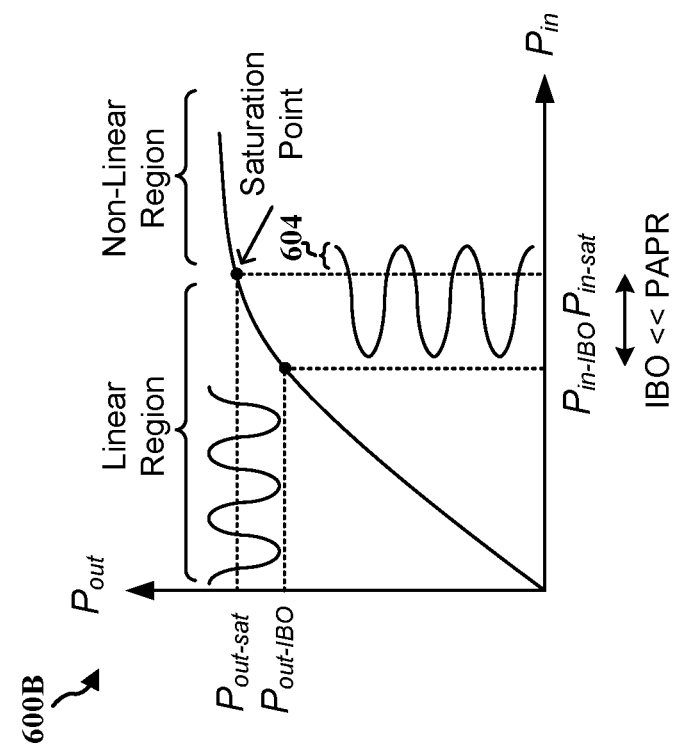
FIGS. 6A and 6B are diagrams illustrating examples of different input backoff setting in accordance with various aspects of the present disclosure.
Figure 6A:
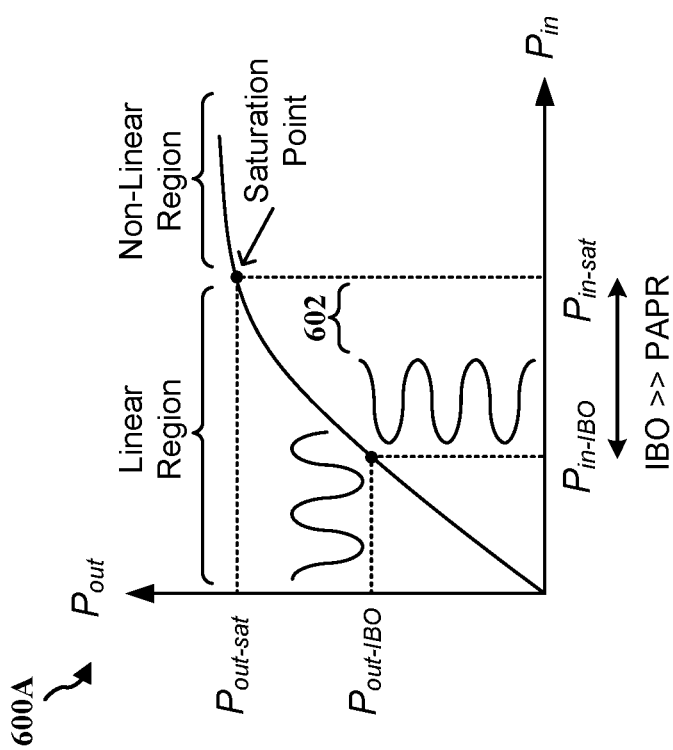

However, if a high IBO is applied to a PA but the input signal does not have a high PAPR (e.g., IBO>>PAPR), such as shown by diagram 600A of FIG. 6A, it may be an inefficient use of the PA as it may reduce the maximum amplification of the PA. For example, a portion 602 of the linear region within the PA may be unused due to the high IBO, particularly the region close to the saturation points where a high input signal (e.g., near $P_{in\text{-}sat}$) may be amplified to nearly proportionate high output signal (e.g., near $P_{out\text{-}sat}$). This may limit the maximum performance of the PA and reduce a transmission range of a transmitting device. On the other hand, if the IBO applied to a PA is too low and the input signal has a PAPR that exceeds the IBO (e.g., PAPR>>IBO), such as shown by diagram 600B of FIG. 6B, at least a portion (e.g., portion 604) of the input signal may be amplified at the non-linear region of the PA, which may cause the output signal to be distorted and the bit error rate (BER) performance of a transmitting device may be degraded.

While OFDM signals may have tolerance to inter-symbol interference and good spectral efficiency, due to large fluctuations in their signal envelopes, OFDM signals may suffer from significant PAPR that may grow rapidly with the size of the OFDM block. For example, for a network that employs larger OFDM blocks, such as may be employed in 5G NR, the OFDM blocks may have higher PAPR. Due to the high PAPR, a PA designed for a communicating device capable of transmitting larger OFDM block(s) may be configured with a high IBO, which may result in an inefficient use of the PA when the communicating device is not transmitting signals with high PAPR, such as described in connection with FIG. 6A. Therefore, as an alternative or in addition to applying a high IBO to the PA, PAPR reduction techniques may be used to reduce the PAPR of an input signal, such that the IBO applied to a PA may be kept at a lower value to maintain the spectral and energy efficiency of the PA. In addition, by reducing the PAPR, a PA may amplify the signal at a higher input power (e.g., as close to the saturation point as possible and within the linear region) and produce higher output signal.

In some examples, PAPR reduction techniques may be data-dependent and computationally expensive, which may make them unfit for a real-time implementation. For example, when a PAPR reduction mechanism is designed for the front end of a real-time transmission chain (e.g., to be operated on the fly), the PAPR reduction mechanism may have a relatively short time to process the input signal. For example, every time the PAPR reduction mechanism receives an OFDM symbol, it may have less than a millisecond to process the OFDM symbol to reduce the PAPR. For most PAPR techniques, a millisecond may not be enough as a lot of processing may be involved during the PAPR reduction. Clipping and filtering (CF) is one of the PAPR reduction techniques that may be used for real-time implementations, e.g., because of its low complexity and low processing time. However, CF and similar techniques may distort the signals themselves and result in in-band signal distortion, which may not converge to a desirable solution.

Cellular networks that operate in a higher and wider range of frequencies (e.g., 4G LTE, 5G NR, etc.) may have an abundance of bandwidth both in the uplink and downlink. This may include the addition of FR2 as well as the increase in the available bandwidth to 100 MHz in the sub-6 frequencies (i.e., frequencies under 6 GHz). Cellular networks with abundant or excess bandwidth may use longer OFDM symbols (e.g., larger OFDM blocks) for transmissions. While increasing the OFDM symbol size may increase the PAPR of the OFDM symbol as mentioned above, the excess bandwidth may also be used for PAPR reduction. For example, when a transmitting device such as a UE is transmitting in the uplink, there may be multiple free resource blocks available to the transmitting device.

In some techniques described herein, a transmitting device may use a tone reservation approach to reduce PAPR for an OFDM symbol. These techniques can include scenarios where a transmitting device may use unused, otherwise-idle, or reserved tones (e.g., unused or reserved subcarriers) of an OFDM symbol to accommodate a peak-cancelling signal that lowers PAPR of the OFDM symbol. For example, in a sample deployment scenario, the magnitude and the phase of reserved tones may be optimized for a given OFDM symbol to minimize PAPR. Additionally, or alternatively, a transmitting device may reserve some tones in subcarriers of an OFDM symbol, and the reserved tones may be used for PAPR reduction instead of transmitting data.

Tones used for PAPR reduction in reservation techniques may have a variety of features. For example, a tone reserved for PAPR reduction (e.g., tone containing the peak-cancelling signal) may be referred as a peak reduction tone (PRT). Given that, in some scenarios, there may be no overlap between one or more reserved tones and one or more data tones within one or more respective OFDM symbols (e.g., the reserved tones may be orthogonal with the data tones), a tone reservation scheme does not introduce any EVM and/or adjacent channel leakage ratio (ACLR) restrictions. Thus, a receiving device (e.g., a base station receiving the OFDM symbol) may be configured to block, disregard, ignore, and/or bypass signals in the reserved tones and decode signals in data tones. Bypassing and not decoding signals in reserved tones enables and provides improved device signal processing and improves communication throughput. As such, for purposes of the present disclosure, the reserved tones may also be referred to as "non-data tones," which may include PRTs.

Varying tone characteristics can aid in some deployments. As one example, the magnitude and the phase of one or more reserved tones may be adjusted for each OFDM symbol to produce suitable PRTs. And the allocation of PRTs in each OFDM symbol may also be customized for optimized PAPR reduction. Additionally, or alternatively, a number of PRTs for each OFDM symbol may vary depending on the available bandwidth. While the location of PRTs may be determined on a per-OFDM symbol basis, fixing the location of PRTs for OFDM symbols in advance may reduce the complexity of the transmitting device. As the optimization (e.g., allocation) may be performed in advance instead of in real-time, the transmitting device's performance may be significantly improved. In addition, there may be a generally good index allocation for the PRTs within the OFDM symbol. As such, in some examples, for purposes of the present disclosure, the reserved tones may also be referred to as "non-data tones," which may include PRTs.

Figure 7:
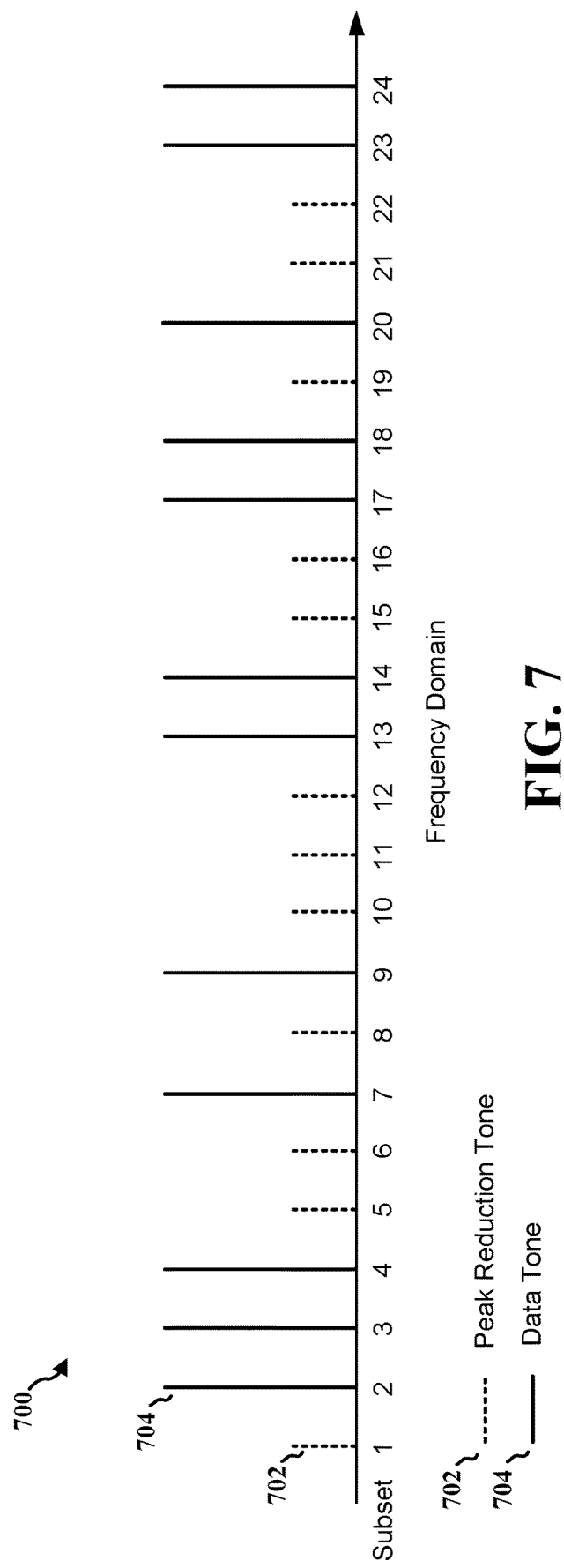
FIG. 7 is a diagram illustrating an example tone distribution showing peak reduction tones and data tones in accordance with various aspects of the present disclosure.

FIG. 7 is a diagram 700 illustrating an example allocation of PRTs (e.g., reserved tones) 702 and data tones 704 (e.g., tone containing data information). The illustration depicts several tones within an OFDM symbol in the frequency domain. As can be seen, PRTs are disposed among data tones such that some data tones flank PRTs. In some aspects, allocation of PRTs 702 in an OFDM symbol enables low PAPR in the time domain. Transmitting devices may obtain the waveform of the OFDM symbol in time domain by taking the Inverse Fast Fourier Transform (IFFT) of the signal in frequency domain. FIG. 7 depicts a sample arrangement of PRTs and data tones and many other PRT/data tone arrangements may also be used given configurable nature of techniques discussed herein.

Indeed, as mentioned previously, transmitting devices may customize the location and the number of PRTs 702 for an OFDM symbol. Adaptive configuration enables flexibility considering communication operations and/or other factors (e.g., such as channel conditions, class/types of data transmission, etc.). For example, if a transmitting device (e.g., the UE) is granted two (2) resource blocks that include twenty-four (24) tones for transmission, the transmitting device may use half of the available tones (e.g., twelve (12) tones) as PRTs. The transmitting device may also choose any subset of the 24 available tones as long as the receiving device (e.g., the base station) is made aware of the transmitting device's choice, which may be configured through signaling and/or fixed in advance. For example, the transmitting device may choose subsets 1, 5, 6, 8, 10, 11, 12, 15, 16, 19, 21 and 22 for PRTs, and may inform its choice of subsets to the receiving device via signaling. In some examples, the subsets may be fixed in advance so that the receiving device may know which tones are PRTs without receiving additional signaling from the transmitting device.

If the location of the reserved tones is known by a transmitting device (e.g., a UE, a base station, etc.), the transmitting device may apply a signal to clipping noise ratio-tone reservation (SCR-TR) algorithm to the reserved tones to optimizes their values for PAPR reduction. For example, suppose a transmitting device is granted a total of N tones $\{1, \ldots, N\}$ (e.g., subsets 1-24 of FIG. 7) for transmission. Let $\Phi$ be a subset of $\{1, \ldots, N\}$ corresponding to the PRT locations (e.g., subsets 1, 5, 6, 8, 10-12, 15, 16, 19, 21 and 22 of FIG. 7). The data tones may be allocated to the remaining tones, $\{1, \ldots, N\}\backslash\Phi$ (e.g., subsets 2-4, 7, 9, 13, 14, 17, 18, 20, 23, 24 of FIG. 7). Then, a frequency domain kernel P may be constructed based on:

$$P_i = \begin{cases} 1 & \text{if } i \in \Phi \\ 0 & \text{if } i \in [N]\backslash\Phi \end{cases},$$

where $P_i$ may denote the $i^{th}$ tone of the total granted tones N (e.g., $P_1=1^{st}$ tone, $P_4=4^{th}$ tone, $P_{24}=24^{th}$ tone, etc.). Based on the frequency domain kernel, when the $i^{th}$ tone is a subset of $\Phi$, a value of 1 may be assigned to the $i^{th}$ tone (e.g., subsets 1, 5, 6, 8 ... of FIG. 7). When the $i^{th}$ tone is not a subset of $\Phi$, a value of 0 may be assigned to the $i^{th}$ tone instead (e.g., subsets 2-4, 7, 9 ... of FIG. 7). Next, let p denotes P in the time domain, where a time domain kernel p may be obtained by taking the IFFT of P, e.g., p=ifft(P), and let X denotes the frequency-domain data (e.g., data tones). As the value 0 is assigned to the $i^{th}$ tone when the $i^{th}$ tone is not a subset of $\Phi$, naturally, $X_i=0$, if $i \in \Phi$. For example, in FIG. 7, $X_1$ and $X_5$ may be 0 as subsets 1 and 5 are within the subset of $\Phi$, and $X_2$ and $X_7$ may not be 0 as subsets 2 and 7 are not within the subset of $\Phi$, etc. Similarly, let x denotes X in time domain kernel, where x may be obtained by taking the IFFT of X, e.g., x=ifft(X). If the number of PRTs is sufficiently large and the location of the PRTs are chosen properly, then the time domain kernel p may look like a delta function with negligible side-lobes (shown in FIG. 9).

Figure 8:
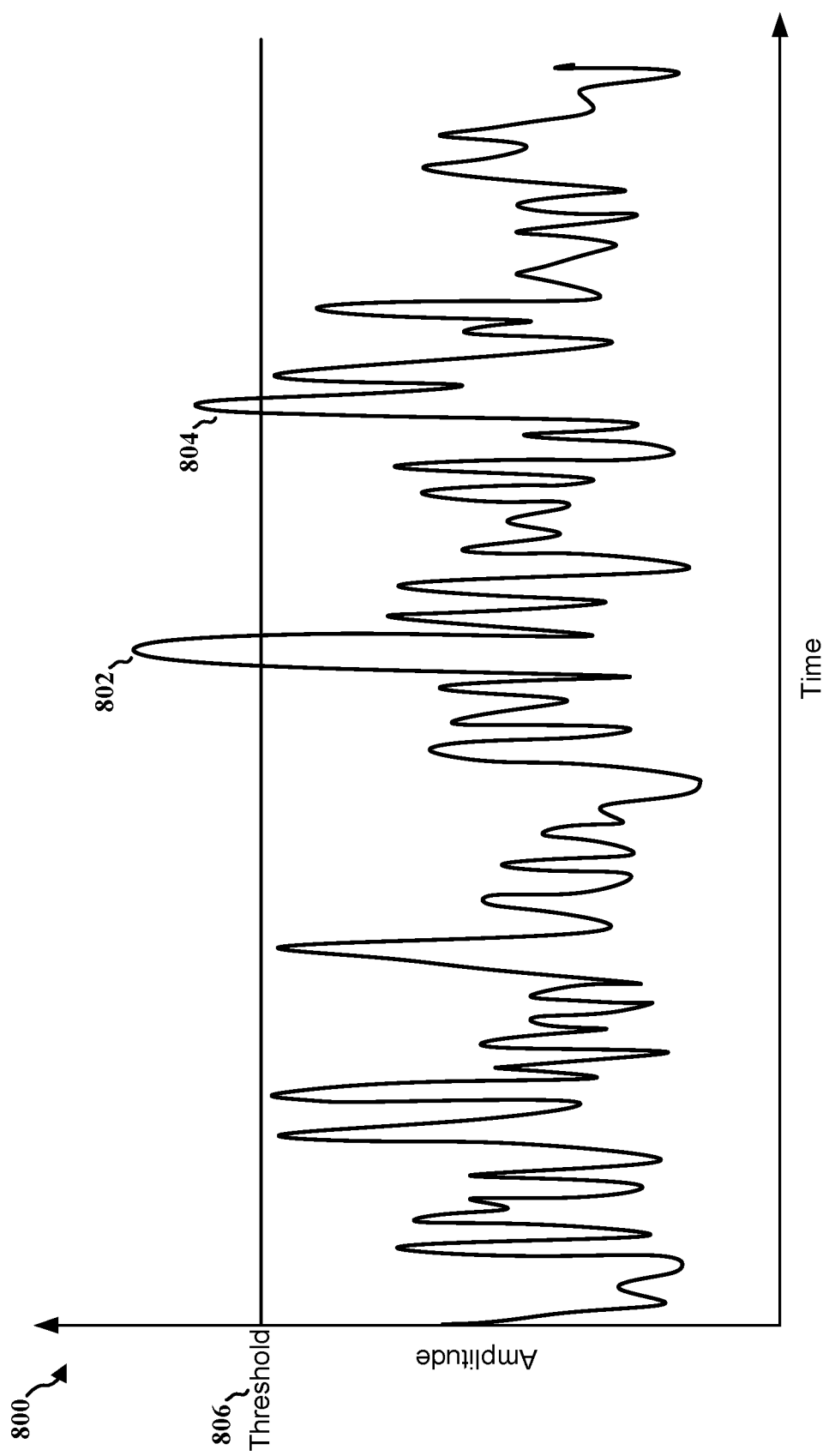
FIG. 8 is a diagram illustrating an example of a time domain data in accordance with various aspects of the present disclosure.

FIG. 8 is a diagram 800 illustrating an example of a time domain data signal (e.g., x or an OFDM signal). A threshold 806 may be defined/configured for a transmitting device for determining whether a particular waveform of a time domain data has one or more peaks exceeding the threshold 806, and the transmitting device may determine whether any of the one or more peaks is to be reduced. For example, based on the threshold 806, a transmitting device may be able to determine that the waveform has a peak 802 and a peak 804 exceeding the threshold 806. The transmitting device may also determine the magnitude and location of the peaks, and/or the largest peak among the peaks (e.g., the peak 802).

Figure 9:
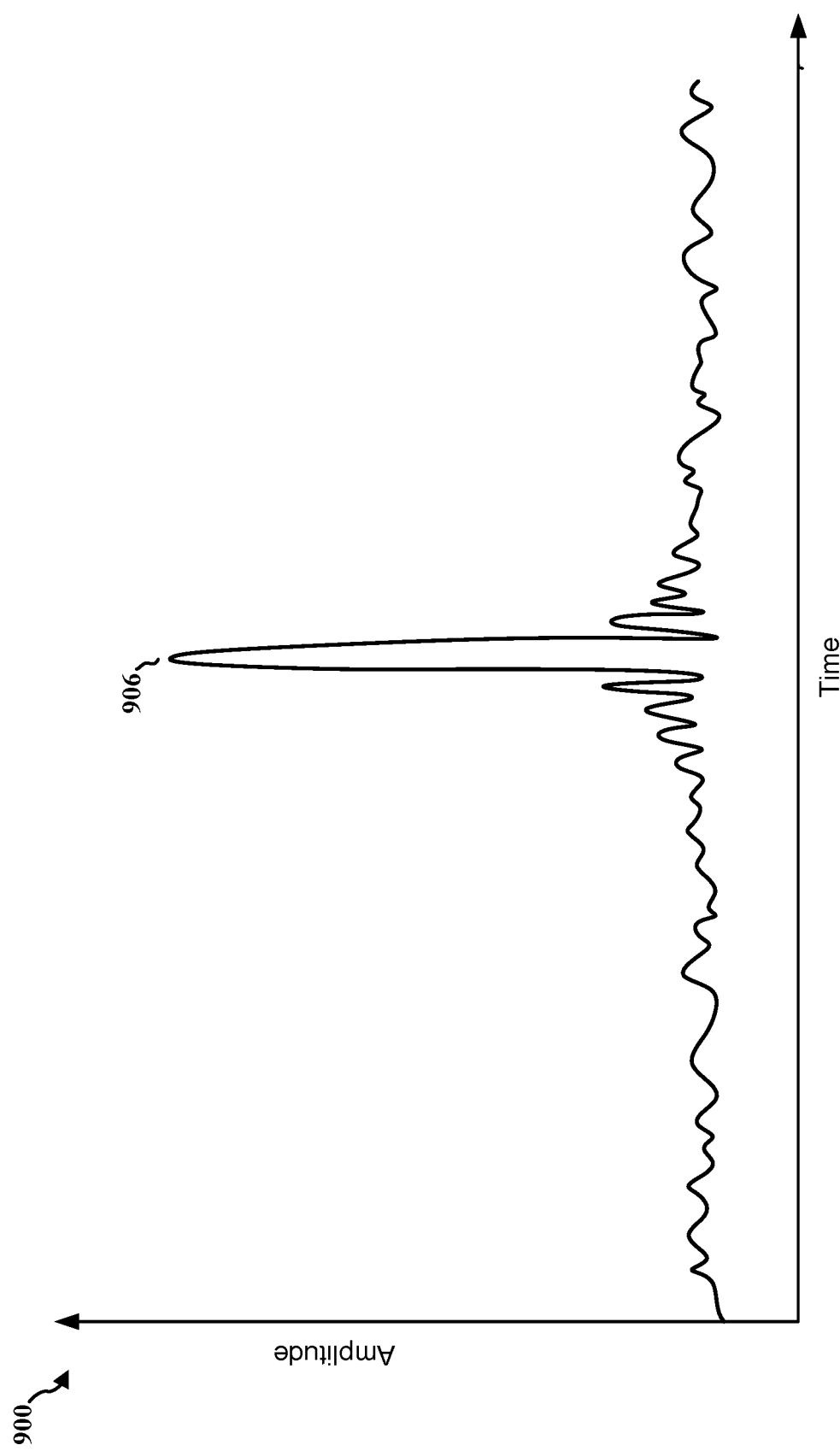
FIG. 9 is a diagram illustrating an example of a time domain kernel in accordance with various aspects of the present disclosure.

FIG. 9 is a diagram 900 illustrating an example of a time domain kernel for p. If the number of PRTs is sufficiently large and the location of the PRTs are chosen properly, then the time domain kernel p may look like a delta function with negligible side-lobes as shown by the diagram 900. For example, the time domain signal may appear as a waveform with a single peak 906, where the single peak 906 may be relatively narrow in width compare to the largest peak of x (e.g., 802 of FIG. 8). Next, the SCR-TR algorithm may circularly shift p in the time-domain until p aligns with the largest peak of x.

Figure 10:
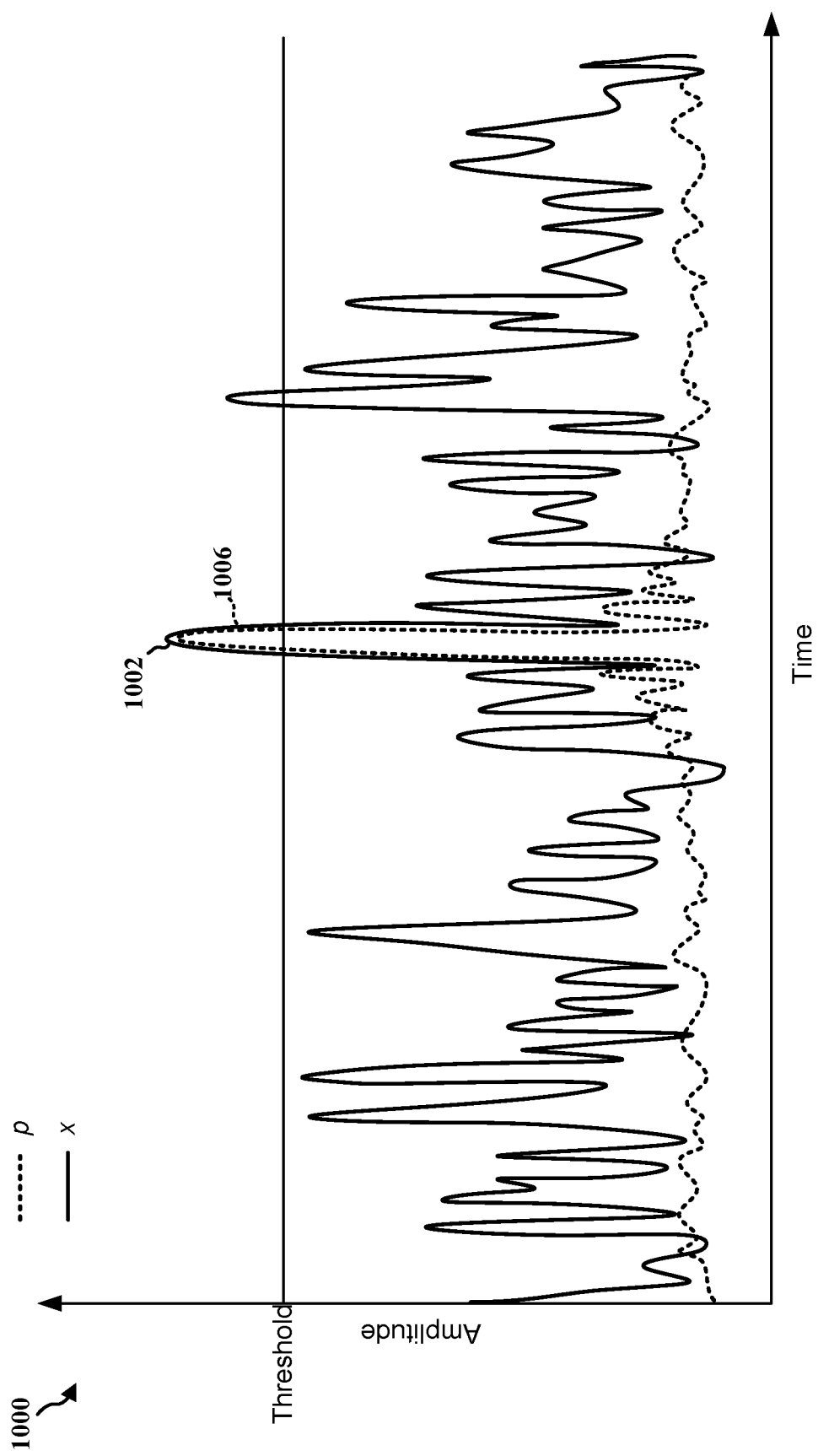
FIG. 10 is a diagram illustrating an example of circular shifting and alignment based on the SCR-TR algorithm in accordance with various aspects of the present disclosure.

FIG. 10 is a diagram 1000 illustrating an example of circular shifting and alignment based on the SCR-TR algorithm. First, the SCR-TR algorithm may determine the location of the largest peak of x. Let $j \in [LN]$ be the index, where L may denote an oversampling factor, N may denote a total number of granted tones and j may be an element of LN. Next, the algorithm circularly shifts p until the peak 1006 of p aligns with the largest peak 1002 of x, which may be represented by $p^j=\text{circshift}(p,j)$. The algorithm then subtracts the scaled and shifted p from x to obtain $$x_{new} = x - \frac{|x(j)|-\mu}{p(0)}p_j e^{i \angle x(j)},$$

where $\mu$ is the target peak, $\angle x(j)$ is the phase of $x(j)$, and $i=\sqrt{-1}$. In other words, the cancellation signal may be circularly shifted to the peak location of x and then subtracted from the original information signal, so that the power of the peak tones may be reduced.

Figure 11:
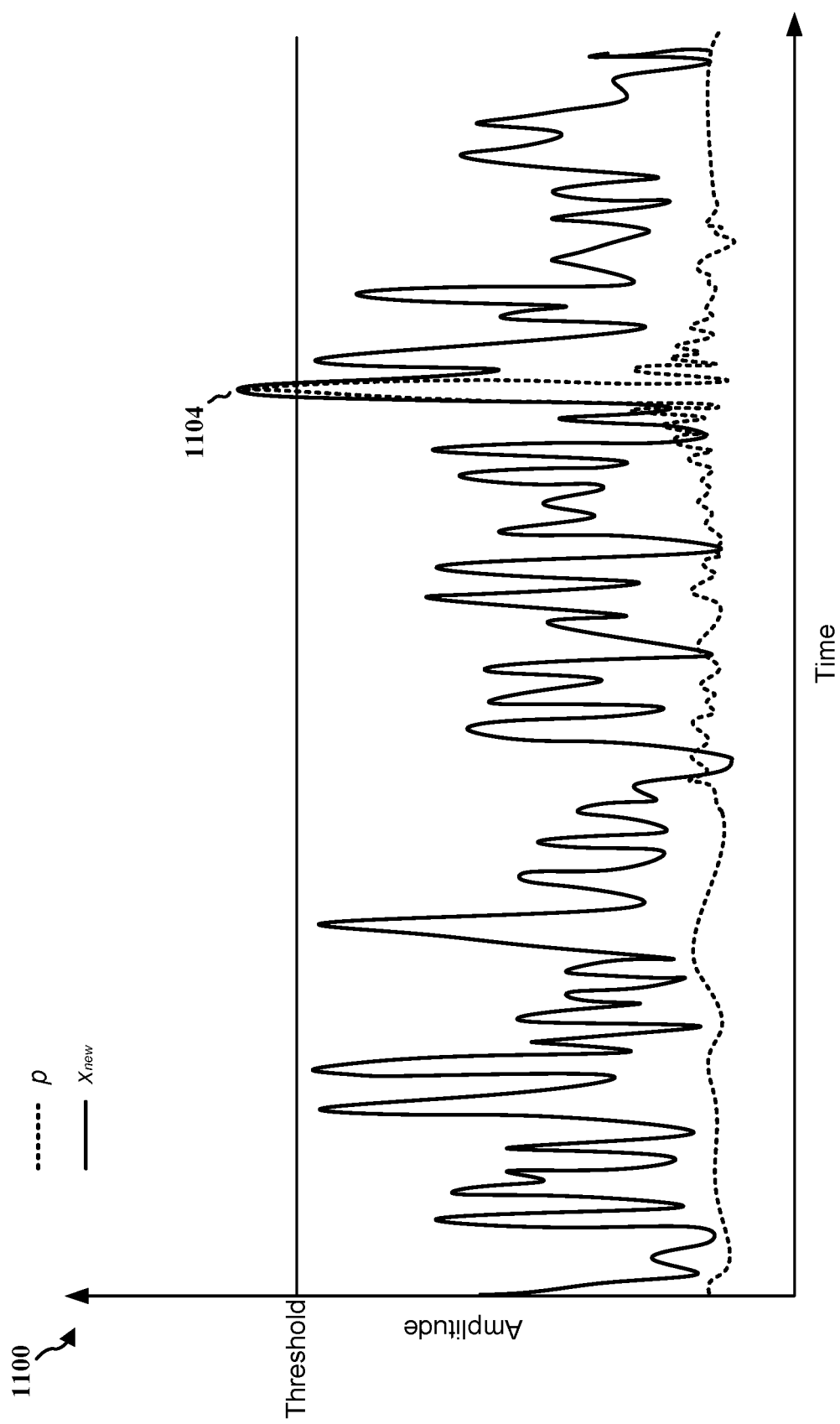
FIG. 11 is a diagram illustrating an example of circular shifting and alignment based on the SCR-TR algorithm in accordance with various aspects of the present disclosure.

FIG. 11 is a diagram 1100 illustrating $x_{new}$, where the previous largest peak of x has been subtracted by the scaled and shifted p. The SCR-TR algorithm may iterate this process serval times to optimize the PAPR reduction. For example, the process may be performed in several iterations, starting from the highest peak and canceling one peak per iteration. As shown by FIG. 11, after previous largest peak of x (e.g., the peak 802, 1002) is eliminated from x, the algorithm may circularly shift p to a next highest peak 1104 of x that is also above the threshold, and subtracted the peak 1104 by the scaled and shifted p and so on. Note that circularly shifting p in the time domain does not impact the location of reserved tones in the frequency domain, but it may disturb their phase. For example, phases may be added to P. However, as data tones (e.g., subsets 2-4, 7, 9 ... of FIG. 7) are assigned with the value zero (0), their values may not be changed because adding phase to zero result in zero. On the other hand, the phase of PRTs may be modified because they are assigned with the value one (1). So, the PRT may become a complex number with magnitude one and the added phase. Thus, circularly shifting p does not impact the location of reserved tones. By applying the SCR-TR algorithm for the tone reservation, PAPR of the OFDM symbol may be reduced to a proper margin, and the corresponding PA may be configured with a lower IBO. For example, The OFDM symbol using 64 PRTs or 96 PRs may have an overall lower PAPR compare to the OFDM symbol that does not use any PRTs.

Figure 12:
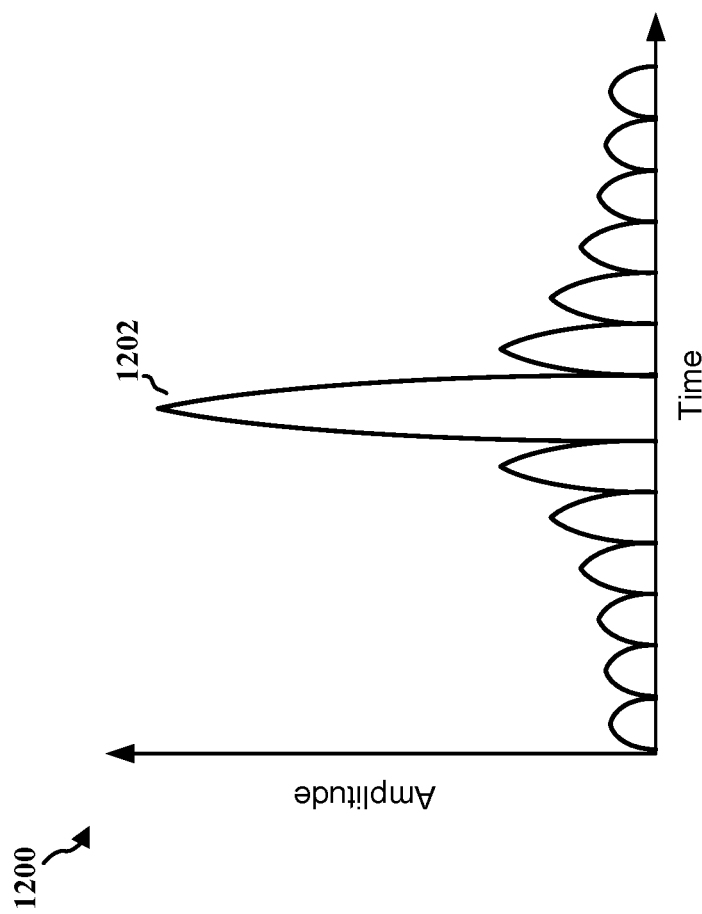
FIG. 12 is a diagram illustrating an example waveform of selecting PRTs contiguously in accordance with various aspects of the present disclosure.
Figure 13:
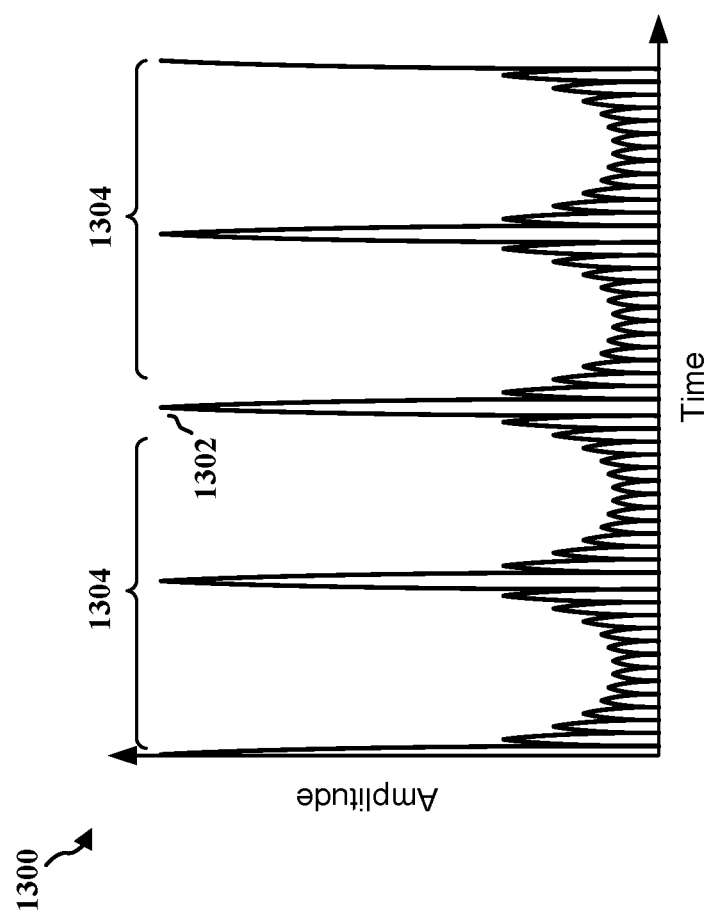
FIG. 13 is a diagram illustrating an example waveform of selecting PRTs uniformly in accordance with various aspects of the present disclosure.

As shown in FIG. 9, when the number of PRTs is sufficiently large and the location of the PRTs are chosen properly, the time domain kernel p may generate a single narrow spike (e.g., the single peak 906) with low and negligible side-lobes. However, if the number of PRTs is insufficient and/or when the location of the PRTs are not chosen properly, the signal and the waveform produced by the time domain kernel p may be less suitable for signal peak cancellation or reduction. For example, as shown by diagram 1200 of FIG. 12, when the reserved tones and their respective PRTs are located contiguously, the resulting waveform generated by the time domain kernel p may have a wide peak 1202 and wide side-lobes. This waveform may be less desirable for signal peak cancellation as the wide peak 1202 may not be properly aligned with the largest peak in the time domain data signal (e.g., the peak 802 in FIG. 8), and may overlap with other portion(s) of the time domain data signal. This may result in more peaks being created (e.g., generated) at other places when the waveform in FIG. 12 is applied to the time domain signal for signal peak reduction. As shown by FIG. 13, when the reserved tones and their respective PRTs are located uniformly (e.g., spacing between PRTs is uniform), the resulting waveform 1300 generated by the time domain kernel p may have a narrow peak 1302. However, the waveform may also produce side-lobes 1304 with one or more peaks that may be as high as the peak 1302. While the peak 1302 may be aligned with the highest peak of the time domain data signal for signal peak reduction or cancellation, other peaks on the side-lobes 1304 may create additional peaks during signal peak cancellation.

Figure 14:
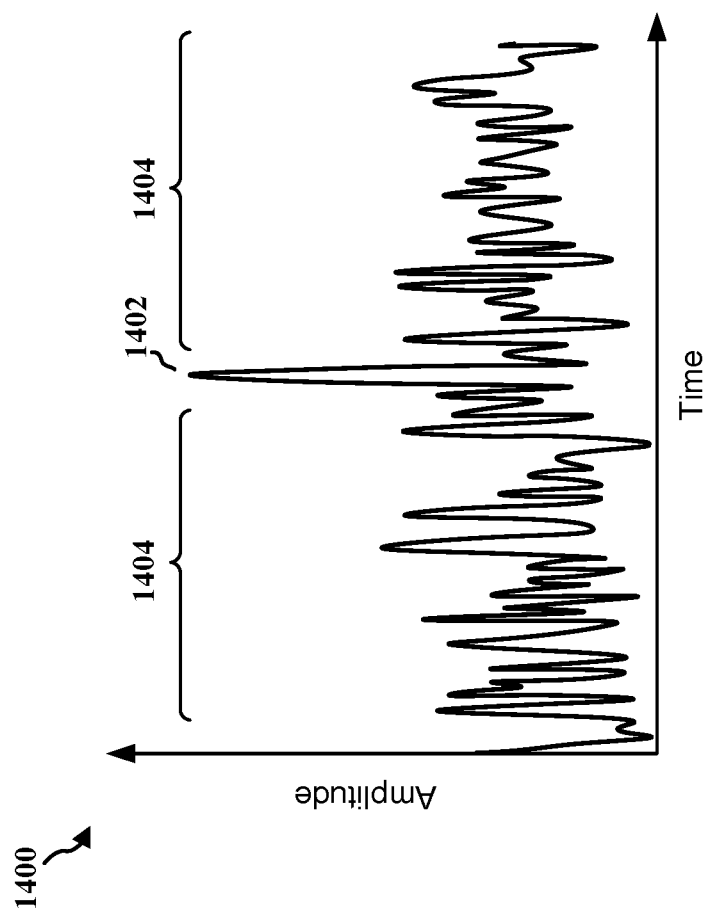
FIG. 14 is a diagram illustrating an example waveform of selecting PRTs randomly in accordance with various aspects of the present disclosure.

As shown by FIG. 14, when the reserved tones and their respective PRTs are located randomly, the resulting waveform 1400 generated by the time domain kernel p may have a main peak 1402 that is tall and narrow, and the peaks of side-lobes 1404 may be shorter than the main peak 1402, which may appear as having the characteristic of combining both waveforms in FIGS. 12 and 13. While the peaks on the side-lobes 1404 may create additional peaks when this waveform is used for signal peak reduction or cancellation, the increase may be moderate and may not be as high as the increase created by the waveform in FIG. 13. Thus, the waveform in FIG. 14 may be more suitable for signal peak reduction than the waveforms in FIGS. 12 and 13, and may be used for reducing the PAPR of the time domain signal. However, as allocating PRTs randomly may yield unpredictable and/or random results, the way in which the random number is generated and chosen at the time domain kernel p may further be configured and optimized to increase the likelihood that the resulting waveform would have a single narrow peak with low side-lobes, such as the waveform shown by FIG. 9.

As illustrated in connection with FIGS. 9 to 14, a signal or waveform suitable for reducing a peak of another signal may include a single peak with low side-lobes. Thus, as shown by diagram 1500 in FIG. 15, an optimized waveform 1506 (e.g., waveform represented by solid line) for signal peak cancellation or reduction may include a single narrow peak 1502 and have no side-lobes 1504, which may be referred as an "ideal" or "perfect" waveform or a waveform produced by an "ideal" or "perfect" kernel for purpose of illustration below.

Techniques discussed herein can provide a number of benefits. For example, some aspects presented herein may enable a time domain kernel to select the location (e.g., sequence) of PRTs and construct a waveform that resembles or is close to the waveform 1506 of FIG. 15. In one example, a sequence may have n elements $a_0, \cdots, a_{n-1}$, with $a_i \in \{0, 1\}$, where at is either 0 or 1 and 1 may correspond to the PRT and 0 may correspond to the data tone, such as described in connection with $P_i$ of the frequency domain kernel P above. The modular autocorrelation $b_j$ of the sequence may be defined by:

$$b_j = \Sigma_{i=0}^{n-1} a_i a_{mod(i+j,n)} \text{ for } j=0, \cdots, n-1.$$

For example, the sequence (e.g., $a_0, \cdots, a_{n-1}$) may be circularly shifted in the frequency domain. Thus, if each element $a_i$ in the original sequence is multiplied by its circular shift (e.g., $a_{mod(i+j,n)}$), the sum of the resulting elements may yield the autocorrelation $b_j$ of the sequence.

The autocorrelation of the sequence may be referred as a "perfect" autocorrelation if $b_j$=constant for $j \neq 0$, such that a sequence $a_0, \cdots, a_{n-1}$ with the "perfect" autocorrelation may generate a "perfect" time domain kernel (e.g., kernel that produces "ideal" waveform 1506) as ifft(a). For example, a "perfect" autocorrelation $b_j$ may be represented by:

$$b_j = \begin{cases} c, & j=0 \\ d, & j \neq 0 \end{cases} \leftrightarrow [iff(b)]_j = \begin{cases} c+d(n-1), & j=0 \\ c-d, & j \neq 0 \end{cases},$$

where the value of b is high when j=0, and the value of b is low when j≠0. The "perfect" frequency domain kernel (e.g., ifft(a)) may then be derived from $|ifft(a)|=\sqrt{|ifft(b)|}$. Accordingly, a "perfect" autocorrelation may be generated for a sequence when elements (e.g., 0 and 1) of the sequence are properly chosen.

Additionally, or alternatively, some aspects presented herein may be referred to as a "difference set," which may be used to determine one or more sequences that may generate a "perfect" autocorrelation. In one example, for a sequence with n elements $a_0, \cdots, a_{n-1}$ with $a_i \in \{0, 1\}$, such as described above, let $S \subseteq \{0, \cdots, n-1\}$ represents the non-zero indices of a. In other words, S may be a subset of 0 to n-1 and may include all the indices for which the $a_i$ is equal to 1. For example, if a sequence a=[1100010], then S may include index 0, index 1 and index 5 (e.g., $a_0$, $a_1$ and $a_5$) in the subset as they are equal to 1. Thus, S may also be represented as S={0, 1, 5}⊆{0, 1, ···, 6}, etc.

Next, the elements $a_i$ within the sequence $a_0, \cdots, a_{n-1}$ may be chosen in a way where the difference between any pair of elements within the sequence is different from other pair. For example, referring to the example above where S={0, 1, 5}, the difference between any pair of elements within the set is different as the difference between 0 and 1 is 1, difference between 1 and 5 is 4, and difference between 0 and 5 is 5. Thus, the three possible pair differences in this set would be 1, 4 and 5 where the difference between any pair of elements is distinct (i.e., not the same as other pairs). The difference between the pair of elements may also be referred as the "pairwise differences" of the elements, and a subset S including pairwise differences of elements may be referred as a "difference set."

Accordingly, the autocorrelation b of the sequence may alternatively be defined as:

$$b_j = \Sigma_{i=0}^{n-1} 1_{\{\{i, mod(i+j,n)\} \subseteq S\}} \text{ for } j=0, \cdots, n-1,$$

or $$b_j = \Sigma_{\{i,k\} \subseteq S} 1_{\{mod(k-i,n)=j\}} \text{ for } j=0, \cdots, n-1.$$

Thus, for a given sequence $a_0, \cdots, a_{n-1}$ with corresponding S, the autocorrelation b may be "perfect" if every $j \in \{1, \cdots, n-1\}$ can be written in exactly λ ways as difference of elements of S, where λ may be independent of j. The set S may then be considered as a "difference set" with repetition λ. As the value one (1) within the sequence may correspond to a PRT (e.g., location of each PRT) and the value zero (0) may correspond to a data tone, for a "difference set" S with repetition λ, the square of a total number of PRTs (e.g., numPRT) within the sequence may approximately equal to a total number of tones (e.g., numTones) multiplied by λ, such that $numPRT^2 \cong numTones \times \lambda$. By choosing zeros (0) and ones (1) for the sequence $a_0, \cdots, a_{n-1}$ based on the above-mentioned approach, a "perfect"

autocorrelation b for the sequence may be created, and a "perfect" kernel may then be constructed based on the "perfect" autocorrelation.

In one example, a "perfect ruler" may be used to determine the allocation of zeros (0) and ones (1) within the sequence $a_0, \cdots, a_{n-1}$. A perfect ruler may be a set of integers $S \subseteq \{0, \cdots, n-1\}$ where the pairwise differences of the elements of S modulus n form a closed interval of integers. In addition, a perfect ruler may correspond to a "difference set" with $\Lambda=1$, meaning that each difference (e.g., difference between a pair of elements within the sequence) may be repeated once. As the perfect ruler or integers within the perfect ruler complies with the requirement of creating the "perfect" autocorrelation (e.g., having a subset S with "difference set" and repetition $\lambda=1$), using the perfect ruler to allocate PRTs (e.g., using S as PRT indices) may result in a "perfect" kernel.

For example, referring back to the example where the subset $S=\{0, 1, 5\} \subseteq \{0, 1, \cdots, 6\}$. The difference set of S may be represented by a vector having six possible combinations: $\{1-0, 5-0, 0-1, 0-5, 1-5, 5-1\}$, which may result in $\{1, 5, -1, -5, -4, 4\}$. A modulo operation (e.g., mod) may then be applied to this vector to convert values or numbers within the vector to non-negative numbers. The modulo operation may be used to find the remainder or signed remainder after division of one number by another. For example, for two numbers, a and n, a modulo n (or a mod n) is the remainder of the Euclidean division of a by n, where a is the dividend and n is the divisor. To convert all values within the vector to non-negative numbers, a number that is higher than the total number of elements in the vector (e.g., such as by 1) may be chosen as the divisor n for performing the modulo operation for all the values in the vector. For example, as the vector has six elements, a number that is larger than 6, such as 7, may be chosen as the divisor, such that $\{1, 5, -1, -5, -4, 4\} \bmod 7 = \{1, 5, 6, 2, 3, 4\}$ (e.g., 1 mod 7=1, −1 mod 7=6, −4 mod 7=3, etc.). In other words, what mod may do to the vector is that when an element (e.g., integer) in the vector is greater than 0 and less than the divisor, the mod may do nothing. On the other hand, when the integer in the vector is less than 0, such as a negative number, then the mod number (e.g., 7) may be added to the negative integer (e.g., 1 mod 7=1, 5 mod 7=5, 4 mod 7=4, etc.). Thus, $\{1, 5, -1, -5, -4, 4\}$ mod 7 becomes $\{1, 5, -1+7, -5+7, -4+7, 4\}$ and yields $\{1, 5, 6, 2, 3, 4\}$. Further, it may be observed that the resulted numbers (e.g., elements) in the vector after applying the mod may include a set of consecutive numbers (e.g., 1, 2, 3, 4, 5, 6 in this example). Thus, to construct a "perfect" kernel, the chosen subset S (e.g., location of the PRTs) may include and follow this property, where the difference between all possible pairs of elements (or pair combinations) within the sequence provide a closed interval of integers (e.g., the perfect ruler). This may again be referred as the "difference set." In other words, one way a "perfect" kernel may be constructed is to choose a subset S that yields a consecutive pair differences (e.g., after applying mod) where each difference appears once. For example, the possible pair differences in the example above, after applying modulo operation, yields a consecutive sequence 1, 2, 3, 4, 5, 6 where no number within the sequence repeated (e.g., same as another number). Thus, if a set of PRTs are allocated based on the subset $S=\{0, 1, 5\}$, such that $a=[1100010] \rightarrow a*\bar{a}=[3111111] \rightarrow \text{ifft}(a*\bar{a})=[9222222] \rightarrow |\text{ifft}(a)|=[31.41.41.41.41.41.4]$. The values may represent a "perfect" kernel in time domain as it may have one main peak (e.g., corresponding to the value 3), and everything else outside the peak may be flat (e.g., all other values are 1.4), etc.

In another example, or as an alternative, a "Golomb ruler" or an "optimal Golomb ruler" may be used to determine the allocation of 0 and 1 within the sequence $a_0, \cdots, a_{n-1}$. An optimal Golomb ruler may be a set of integers $S \subseteq \{0, \cdots, n-1\}$ where the pairwise differences of the elements of S modulus n are distinct. In other words, the optimal Golomb ruler may be a set of integers where no two pairs of integers have the same difference. For example, the sequence [0, 1, 4, 6] and the sequence [0, 2, 7, 8, 11] may have the property of the optimal Golomb ruler as the difference between any pair of integers within the sequence is distinct and different from other pairs. Table 1 below is an example illustrating different sets of integers or sequence that may consider to have the property of the optimal Golomb ruler. The integers/elements in Table 1 may be used as the prime candidates for the location of PRTs within a plurality of tones. In addition, if an increment or an offset (e.g., 1, 5, 10, etc.) is applied to the set of integers/elements to the in Table 1, the resulting value may still maintain the property of the optimal Golomb ruler. For example, if an offset or increment 10 is applied to the sequence [0, 1, 4, 6], the resulting sequence [10, 11, 14, 16] may still maintain the property of the optimal Golomb ruler as the difference between any pair of integers within the sequence may be distinct.

TABLE 1

Example Optimal Golomb Ruler Sets

| Order # | Length | Marks |
|---|---|---|
| 1 | 0 | 0 |
| 2 | 1 | 0, 1 |
| 3 | 3 | 0, 1, 3 |
| 4 | 6 | 0, 1, 4, 6 |
| 5 | 11 | 0, 1, 4, 9, 11 |
| 6 | 17 | 0, 1, 4, 10, 12, 17 |
| 7 | 25 | 0, 1, 4, 10, 18, 23, 25 |
| 8 | 34 | 0, 1, 4, 9, 15, 22, 32, 34 |
| 9 | 44 | 0, 1, 5, 12, 25, 27, 35, 41, 44 |
| 10 | 55 | 0, 1, 6, 10, 23, 26, 34, 41, 53, 55 |
| 11 | 72 | 0, 1, 4, 13, 28, 33, 47, 54, 64, 70, 72 |
| 12 | 85 | 0, 2, 6, 24, 29, 40, 43, 55, 68, 75, 76, 85 |
| 13 | 106 | 0, 2, 5, 25, 37, 43, 59, 70, 85, 89, 98, 99, 106 |
| 14 | 127 | 0, 4, 6, 20, 35, 52, 59, 77, 78, 86, 89, 99, 122, 127 |
| 15 | 151 | 0, 4, 20, 30, 57, 59, 62, 76, 100, 111, 123, 136, 144, 145, 151 |
| 16 | 177 | 0, 1, 11, 26, 32, 56, 68, 76, 115, 117, 134, 150, 163, 168, 177 |
| 17 | 199 | 0, 5, 7, 17, 52, 56, 67, 80, 81, 100, 122, 138, 159, 165, 168, 191, 199 |
| 18 | 216 | 0, 2, 10, 22, 53, 56, 82, 83, 89, 98, 130, 148, 153, 167, 188, 192, 205, 216 |
| 19 | 246 | 0, 1, 6, 25, 32, 72, 100, 108, 120, 130, 153, 169, 187, 190, 204, 231, 233, 242, 246 |
| 20 | 283 | 0, 1, 8, 11, 68, 77, 94, 116, 121, 156, 158, 179, 194, 208, 212, 228, 240, 253, 259, 283 |
| 21 | 333 | 0, 2, 24, 56, 77, 82, 83, 95, 129, 144, 179, 186, 195, 255, 265, 285, 293, 296, 310, 329, 333 |
| 22 | 356 | 0, 1, 9, 14, 43, 70, 106, 122, 124, 128, 159, 179, 204, 223, 253, 263, 270, 291, 330, 341, 353, 356 |
| 23 | 372 | 0 3 7 17 61 66 91 99 114 159 171 199 200 226 235 246 277 316 329 348 350 366 372 |
| 24 | 425 | 0 9 33 37 38 97 122 129 140 142 152 191 205 208 252 278 286 326 332 353 368 384 403 425 |
| 25 | 480 | 0 12 29 39 72 91 146 157 160 161 166 191 207 214 258 290 316 354 372 394 396 431 459 467 480 |

TABLE 1-continued

Example Optimal Golomb Ruler Sets

| Order # | Length | Marks |
|---|---|---|
| 26 | 492 | 0 1 33 83 104 110 124 163 185 200 203 249 251 258 314 318 343 356 386 430 440 456 464 475 487 492 |
| 27 | 553 | 0 3 15 41 66 95 97 106 142 152 220 221 225 242 295 330 338 354 382 388 402 415 486 504 523 546 553 |

The allocation of PRTs based on the optimal Golomb ruler may provide higher or better PA-PR reduction than allocating PRTs randomly, such as described in connection with FIG. 14. For example, an optimal (e.g., maximally dense) Golomb ruler may maximize |S| for a given n, where n may be a total number of tones and S may correspond to the order number in Table 1 (e.g., number of elements/integers within the set). Thus, for specific choices of n, the optimal Golomb ruler may function as a perfect ruler. While generating an optimal Golomb ruler may be time consuming or difficult as the number of integers (e.g., tones) increases, efficient constructions for near-optimal Golomb rulers may be used, such as by using the Ruzsa construction. The Ruzsa construction may provide a fast and efficient construction, which may provide Golomb rulers with p−1 elements for every prime number p. For example, S may be determined by:

$$S = p*(1:p-1) + (p-1)*g^{1:p-1} \mod p(p-1),$$

where p may be a prime and g may be a primitive root of $\mathbb{F}_p$. Based on this construction, |S|=p−1 and n=p(p−1), and the approximate maximal or optimal value for |S| may be obtained. For example, if |S|=7, then the integer set {0, 1, 4, 10, 18, 23, 25} within order #7 in Table 1 may be used to allocate the PRTs. As such, a near "perfect" kernel may be constructed by determining the |S| and allocating the PRTs based on the corresponding optimal Golomb ruler set, such as illustrated in Table 1.

For example, a UE may first determine an order of the optimal Golomb ruler (e.g., the order # in Table 1) and optionally an offset. In one aspect, the UE may determine the order number by finding the square root of the number of allocated tones (e.g., total tones) and rounding this square root number to the closest integer (e.g., whole number). For example, if total number of tones is 71, the UE may calculate the square root of 71, which is approximately 8.426, and the UE may round this number to the closest whole number (e.g., 8). Depending on the configuration, the UE may add a constant (e.g., 1) to the rounded whole number to obtain the order number for the Golomb ruler (e.g., the order number in Table 1). Then, the UE may choose the optimal Golomb ruler of an appropriate order from Table 1 based on the obtained order number. In some examples, to align the integers associated with the selected order number from the Golomb ruler to the allocated tones, the UE may apply an offset to the marks within the selected order number such that the first mark within the selected order number (e.g., the first mark on the selected order of the Golomb ruler) may correspond to the first allocated tone. Then, the UE may determine the PRT indices or location of PRTs based on integers with the offset.

Techniques discussed herein can provide a number of benefits. For example, some aspects presented herein may reduce the PAPR of a transmission, where one or more kernel may be used at a transmitting device (e.g., the UE) to generate/construct peak-cancelling signals (e.g., PAPR reduction signal) to cancel or reduce one or more peaks of the data transmission. Additionally, in some aspects, a receiving device (e.g., the base station) may receive the data transmission and be configured to regenerate the one or more peak(s) cancelled by the transmitting device. This may effectively reduce or mitigate some impact that may be associated with signal cancellation or reduction, such as reduction in signal-to-noise ratio (SNR) of the channel, while achieving the PAPR reduction for the transmission.

Figure 15:
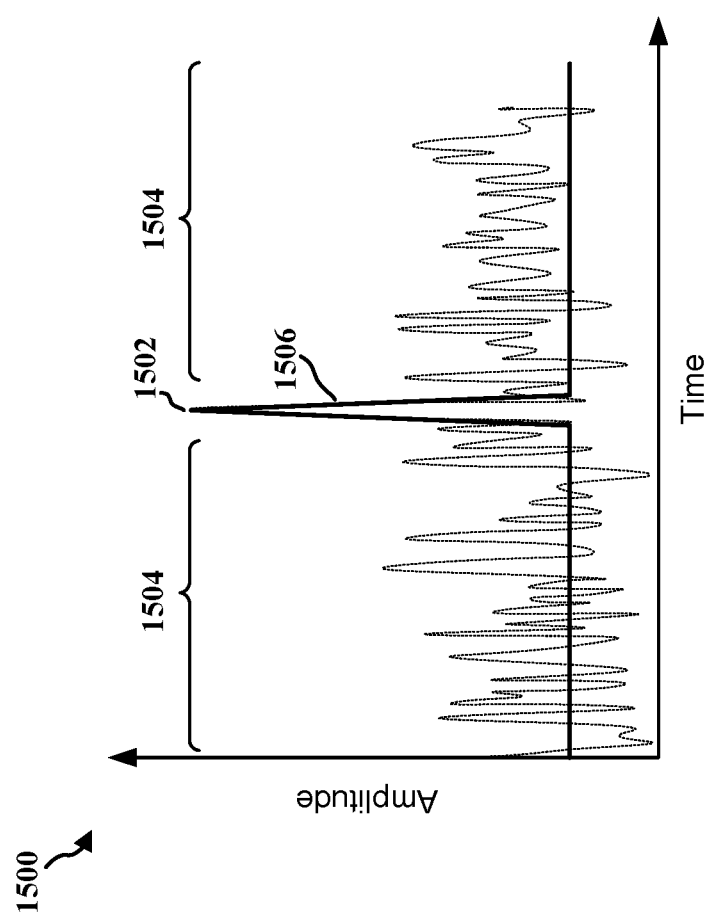
FIG. 15 is a diagram illustrating an example ideal waveform in accordance with various aspects of the present disclosure.
Figure 16:
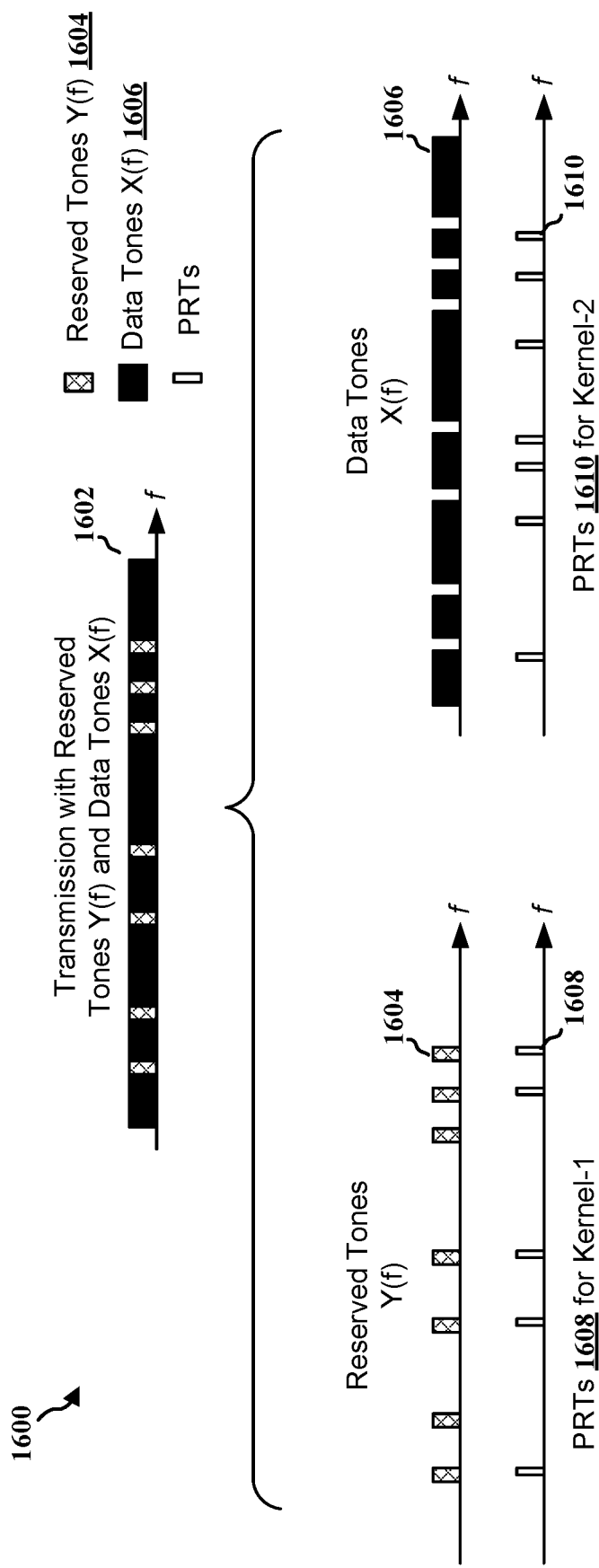
FIG. 16 is a diagram illustrating an example of locating PRTs for two kernels in accordance with various aspects of the present disclosure.

In one aspect of the present disclosure, two kernels (e.g., kernel-1 and kernel-2) may be used by a transmitting device (e.g., a UE, a base station) for peak cancellation, where each kernel may generate/construct a peak cancelling signal based on its respective PRTs, such as described in connection with FIGS. 9-11 and 15. FIG. 16 is a diagram 1600 illustrating an example of allocating PRTs for two kernels. In one aspect, for a transmission with a set of tones 1602 including multiple reserve tones 1604 and data tones 1606, PRTs 1608 for kernel-1 may be allocated to or within the reserved tones 1604, and the location of the PRTs 1608 for kernel-1 may not overlap with the data tones 1606. PRTs 1610 for kernel-2 may be allocated to or within the data tones 1606, and the location of the PRTs 1610 for kernel-2 may partially or fully overlap with the data tones 1606. The location of the PRTs 1610 for kernel-2 may not overlap with the reserved tones 1604, such that the PRTs 1608 for kernel-1 does not overlap with the PRTs for 1610 kernel-2.

Figure 17:
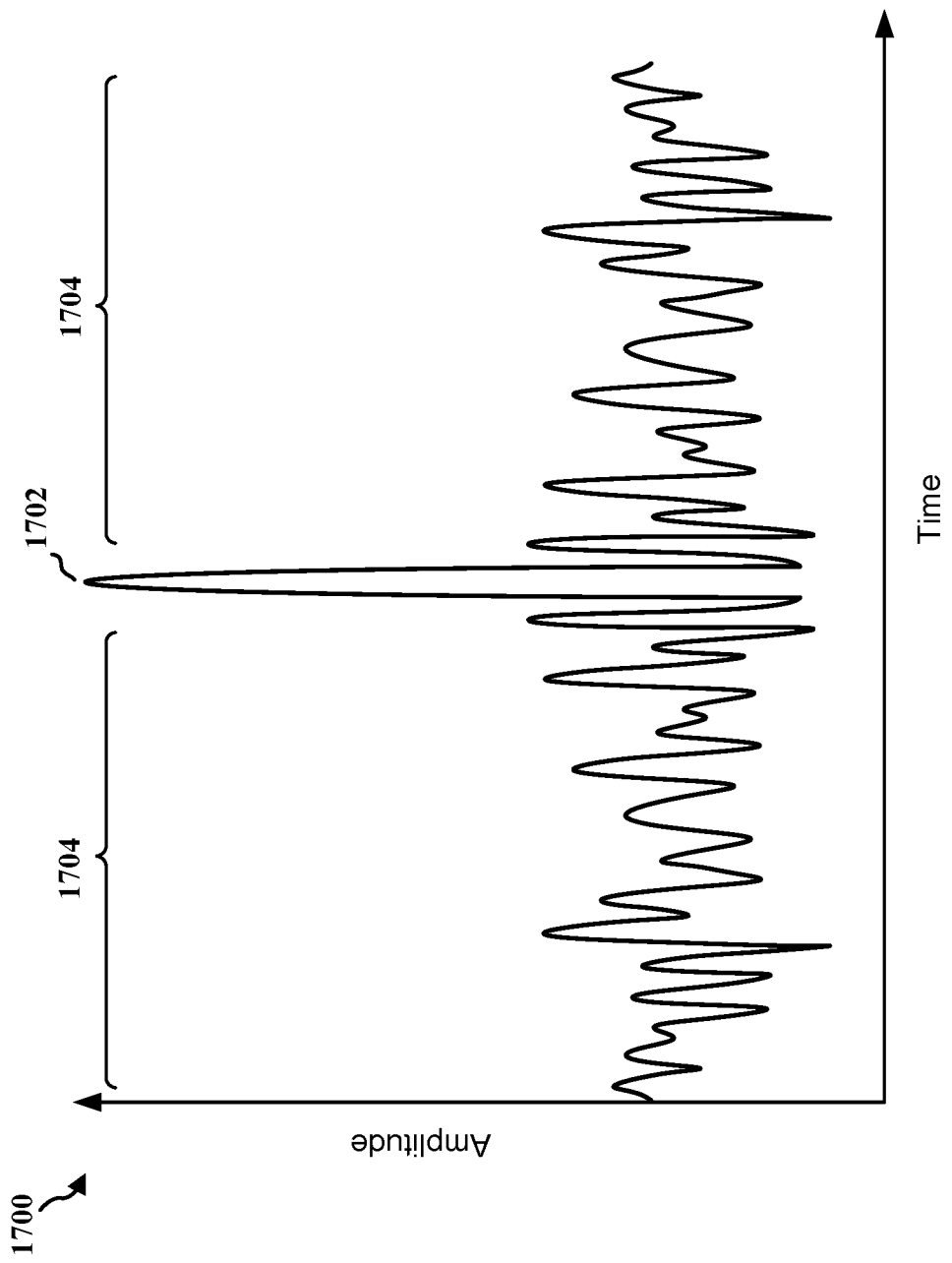
FIG. 17 is a diagram illustrating an example waveform generated by kernel-1 in accordance with various aspects of the present disclosure.

FIG. 17 is a diagram 1700 illustrating an example waveform generated/constructed by kernel-1, such as described in connection with FIGS. 9-11 and 15. As the location of the PRTs 1608 for kernel-1 may be confined to reserved tones 1604, while the peak cancelling signal generated by kernel-2 may have moderate to high side-lobes 1704 with a single peak 1702, the peak cancelling signal generated by kernel-1 may not introduce EVM, such as described in connection with FIG. 5. In addition, allocating PRTs to reserved tones 1604 may not add any distortion to the signal. However, the peak cancelling signal generated by kernel-1 may introduce peak regrowth at some of the peak signals (e.g., of the OFDM signal) because of the moderate to high side-lobes 1704. This may reduce the efficiency of the peak cancelling signal, where less PAPR may be reduced. For example, the side-lobes 1704 may limit the peak cancelling signal to provide a moderate PAPR reduction, such that the PAPR may be unable to go below certain threshold (e.g., 7 dB, 20 dB, etc.). The PRT allocation mechanism described in connection with FIG. 15 (e.g., perfect ruler, Golomb ruler, etc.) may be used for locating PRTs for kernel-1.

Figure 18:
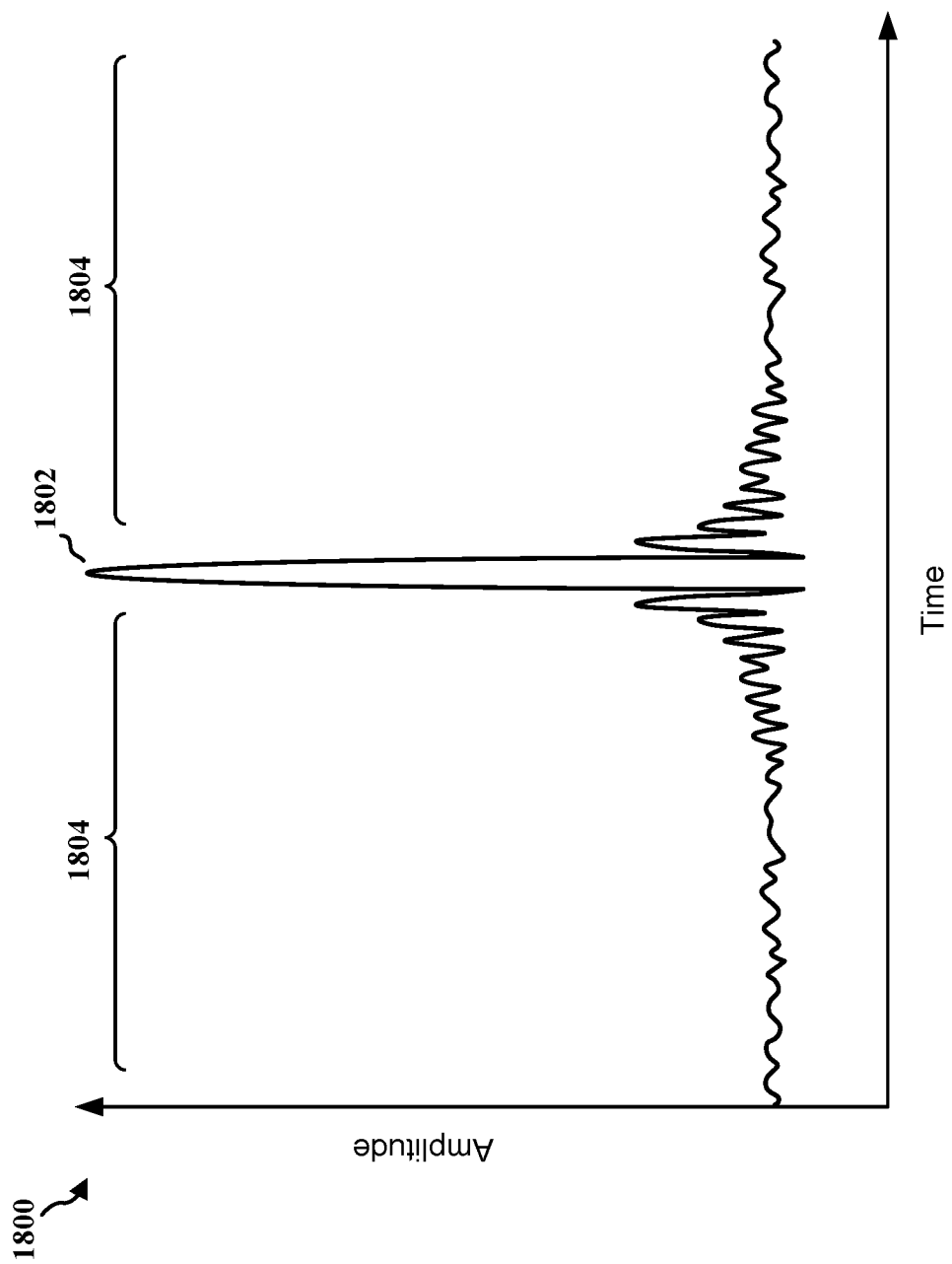
FIG. 18 is a diagram illustrating an example waveform generated by kernel-2 in accordance with various aspects of the present disclosure.

FIG. 18 is a diagram 1800 illustrating an example waveform generated/constructed by kernel-2, such as described in connection with FIGS. 9-11 and 15. As the location of the PRTs 1610 for kernel-2 may overlap with data tones which may be larger than the reserved tones, this may provide kernel-2 with more option to allocate PRTs and optimize the peak cancelling signal. Thus, the peak cancelling signal generated by kernel-2 may have lower side-lobes 1804 with a single peak 1802, and may introduce very limited or no peak regrowth. However, as the PRTs 1610 for kernel-2 may overlap with data tones 1606, either in full or in part, the signal may be distorted in the frequency domain. In addition, the peak cancelling signal generated by kernel-2 may introduce EVM.

As peak reduction signals generated by kernel-1 and kernel-2 may have different characteristics, such as described in connection with FIGS. 17 and 18, in one aspect of the present disclosure, a linear combination may be applied to kernel-1 and kernel-2 to combine the peak cancelling signals generated from kernel-1 and kernel-2. In other words, the signal generated from kernel-1 (e.g., Signal 1) may be combined with the signal generated from kernel-2 (e.g., Signal 2) to form a combined signal (e.g., Signal 3). In on example, Signal 1 may be linearly combined with Signal 2 by first applying a ratio α (e.g., 0≤α≤1) to Signal 1 and applying another ratio (1−α) to Signal 2, and then combining the resulting signals to generate Signal 3, such that Signal 3=α*Signal 1+(1−α)*Signal 2. By linearly combining Signal 1 and Signal 2, the negative effects (e.g., peak regrowth, EVM, etc.) associated with each signal may be reduced. In one other aspect of the present disclosure, the ratio applied to Signal 1 and the ratio applied to Signal 2 may not equal 1. For example, a first ratio (e.g., α) may apply to Signal 1, and a second ratio (e.g., β) may apply to the Signal 2, such that Signal 3=α*Signal 1+β*Signal 2 and α+β does not equal to 1. Note that while the linear combination of Signal 1 and Signal 2 here is described as generating a new peak cancelling signal (e.g., Signal 3), a transmitting device may also apply the signal from kernel-1 (e.g., Signal 1) and the signal from kernel-2 (e.g., Signal 2) separately to the data transmission without combining them (e.g., no Signal 3 is generated). Thus, for purpose of illustration below, linear combination may refer to linearly combining one or more signal into a new signal, or applying one or more signal having linear combination relation separately.

Referring to the example above regarding the frequency domain kernel P, where a transmission is granted a total of N tones $\{1, \ldots, N\}$, $\Phi$ represents a subset of $\{1, \ldots, N\}$ corresponding to the PRT locations and data tones are allocated to the remaining tones $\{1, \ldots, N\}\backslash\Phi$, such as described in connection with FIG. 7. Kernel-1 in frequency domain may be represented by:

$$\text{kernel} - 1: \quad P_i = \begin{cases} 1 & \text{if } i \in \Phi \\ 1 & \text{if } i \in [N]\backslash\Phi \end{cases}$$

(e.g., 0 for PRT and 1 for data tone).

The time domain kernel of kernel-1 may be denoted as $p_{kernel-1}$, which may be obtained by taking the IFFT of kernel-1 P. On the other hand, as kernel-2 allocates its PRTs on data tones instead of reserved tones, kernel-2 in frequency domain may be represented by:

$$\text{kernel} - 2: \quad P_i = \begin{cases} 0 & \text{if } i \in \Phi \\ 1 & \text{if } i \in [N]\backslash\Phi \end{cases}$$

(e.g., 0 for PRT and 1 for data tone).

Similarly, the time domain kernel of kernel-2 may be denoted as $p_{kernel-2}$, which may be obtained by taking the IFFT of kernel-2 P As the SCR-TR algorithm may be used to determine the location of the largest peak of a waveform, the combined signal (e.g., Signal 3) from kernel-1 and kernel-2 may be circularly shifted to the highest peak of a waveform z to cancel or reduce the highest peak (e.g., the highest peak of z is subtracted by the scaled and shifted Signal 3) to reduce the PAPR of the waveform z, such as described in connection with FIG. 10. Thus, the resulting waveform $z_{new}$ (e.g., after applying circular shift) may be represented by:

$$z_{new} = z - (|z(j)| - \mu) e^{-\angle z(j) \cdot 1i} \cdot \text{circshift}(\alpha p_{kernel1} + (1-\alpha)p_{kernel2}, j).$$

Figure 19:
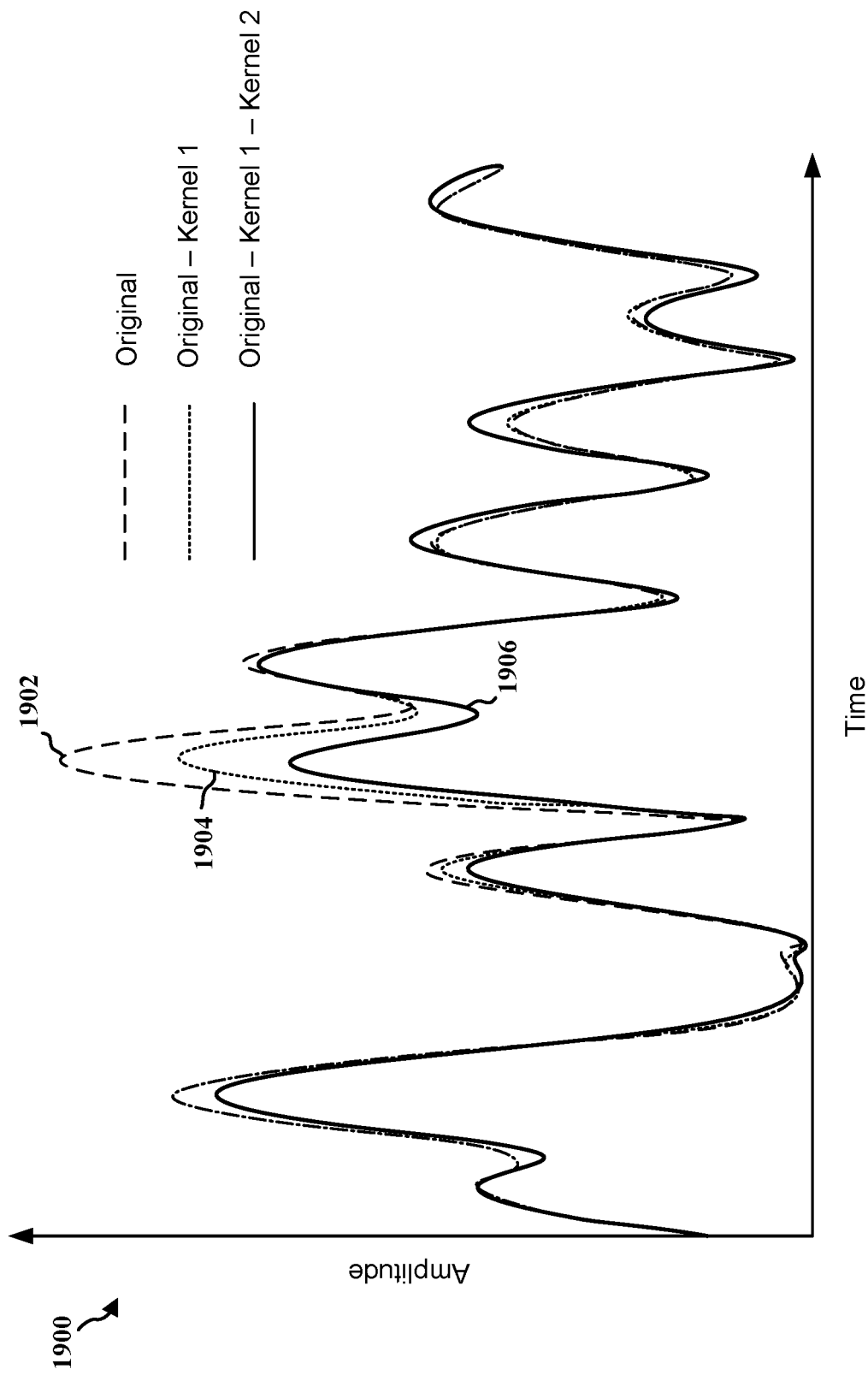
FIG. 19 is a diagram illustrating an example signal peak reduction involving kernel-1 and/or kernel-2 in accordance with various aspects of the present disclosure.

FIG. 19 is a diagram 1900 illustrating an example signal peak reduction involving kernel-1 (e.g., as described in connection with FIGS. 8 to 11) and both kernel-1 and kernel-2. By applying the linearly combined signal (e.g., Signal 3) from kernel-1 and kernel-2, the resulting waveform 1906 (e.g., waveform $z_{new}$) may have overall lower peaks than the original waveform 1902 (e.g., waveform z) and the waveform 1904 that applies peak cancelling signal from just kernel-1 (e.g., Signal 1). The combined peak cancellation signal (e.g., Signal 3) thus may provide a better PAPR reduction for the data transmission, and the threshold described in connection with FIG. 17 may further be lowered.

Figure 20:
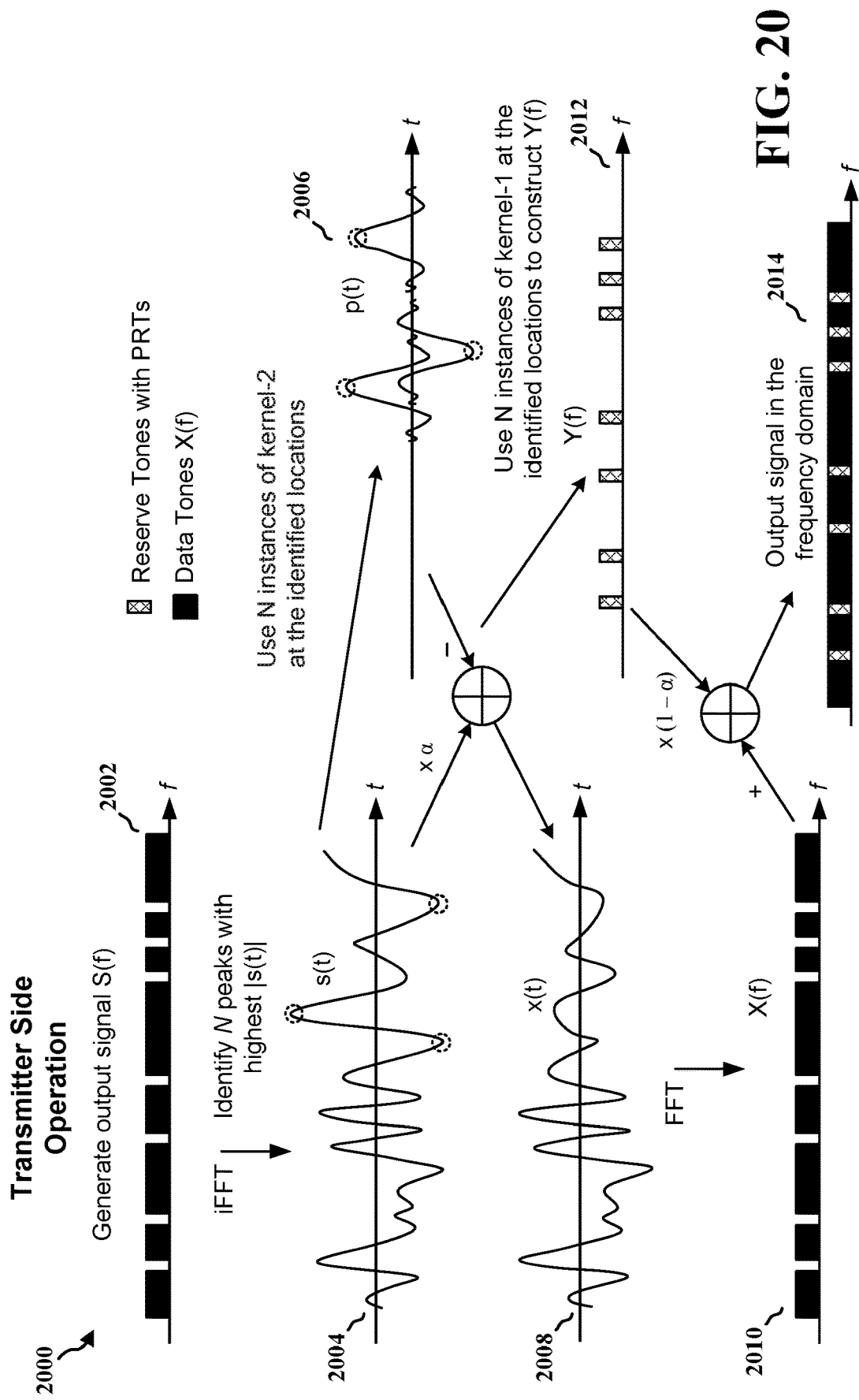
FIG. 20 is a diagram illustrating an example signal peak reduction involving linear combination of kernel-1 and kernel-2 in accordance with various aspects of the present disclosure.

FIG. 20 is a diagram 2000 illustrating an example signal peak reduction involving linear combination of kernel-1 and kernel-2 at a transmitting device (e.g., the UE 104, 350, etc.) according to aspects of the present disclosure. At 2002, a transmitting device may generate an output signal S(f) in frequency domain, such as for a data transmission. At 2004, the output signal S(f) may be converted into an output time domain signal s(t) by applying iFFT to the S(f), then highest N peak(s) of the s(t) may be identified, such as described in connection with FIGS. 8-11. At 2006, peak cancellation signal generated from kernel-2 (e.g., the p(t)) multiplied by a (e.g., the ratio for linear combination) may be applied to the s(t) to cancel or reduce highest N peak(s) of s(t) (e.g., represented by dotted circle associated with 2004 and 2006). At 2008, a resulting signal x(t) may be generated after signal peak reduction (e.g., circular shift) is applied to the s(t). At 2010, the resulting time domain signal x(t) may be converted back to a frequency domain signal X(f) by applying FFT to the x(t). At 2012, frequency domain signal Y(f) from kernel-1 (e.g., with PRTs allocated on reserve tones) is multiplied by (1−α) and added to/combined with the X(f), and an output signal is generated at 2014 for transmission. As the reserved tones and their respective PRTs at 2012 do not overlap with data tones at 2010, the two may be combined without overlapping each other, such as shown at 2014. The PRTs allocated by kernel-1 may further be used to generate peak cancelling signal (e.g., Signal 1) to further reduce the N peaks of x(t), such as described in connection with FIGS. 7 to 11. While this example shows the signal from kernel-2 being applied to the output signal S(f) before applying the signal from kernel-1, the signal from kernel-1 may also be applied to the output signal S(f) before the signal from kernel-2. Signals from kernel-1 and kernel-2 may also be applied to the output signal S(f) simultaneously, or be combined before applying to the output signal S(f) (e.g., generating Signal 3), etc.

Aspects presented herein may reduce distortion of a transmitted signal (e.g., data transmission) and improve the SNR of the channel at a receiving device (e.g., base station 102, 180, 310), where the receiving device may be configured to regenerate one or more peak being cancelled at the transmitting device, such as the peak cancellation described in connection with FIGS. 16-20. Thus, distortion or EVM introduced during signal peak cancellation process, such as by kernel-2, may be mitigated or removed, and the transmitted signal may be compensated.

In one aspect, to regenerate one or more peak cancelled at a transmitting device, the receiving device may be configured first to identify the location of the cancelled peak(s) and/or the magnitude of the cancelled peak(s) in a received signal (e.g., the signal transmitted from the transmitting device). If the transmitting device is able to identify the location and magnitude of the cancelled peak(s), the transmitting device may regenerate the cancelled peak(s). For example, a reversed process of signal cancellation described in connection with FIGS. 16-20 may be applied to the received signal, where the peak cancellation signal(s) (e.g., Signal 1 generated by kernel-1, Signal 2 generated by kernel-2, etc.) may be circularly shifted to the identified cancelled peak location(s) and added to the received signal instead of subtracted from the received signal.

In one example, let z(t)=x(t)+y(t) be a received signal (e.g., 1602, 2014) in time domain where x(t) may represent the data tones and y(t) may represent the PRTs (or reserved tones including PRTs), such as described in connection with the example kernel-1 and kernel-2 above. In one aspect, for a receiving device to identify the location and magnitude of the cancelled peak(s), the receiving device may first transfer z(t)=x(t)+y(t) into frequency domain (e.g., Z(f)=X(f)+Y(f)), and the receiving device may set Y(f) to zero in the frequency domain such that Z(f)=X(f). As Y(f) is confined to reserved tones and does not overlap with data tones, Y(f) may be identified and removed from Z(f) (e.g., by setting the value of the identified reserved tones to 0).

Figure 21:
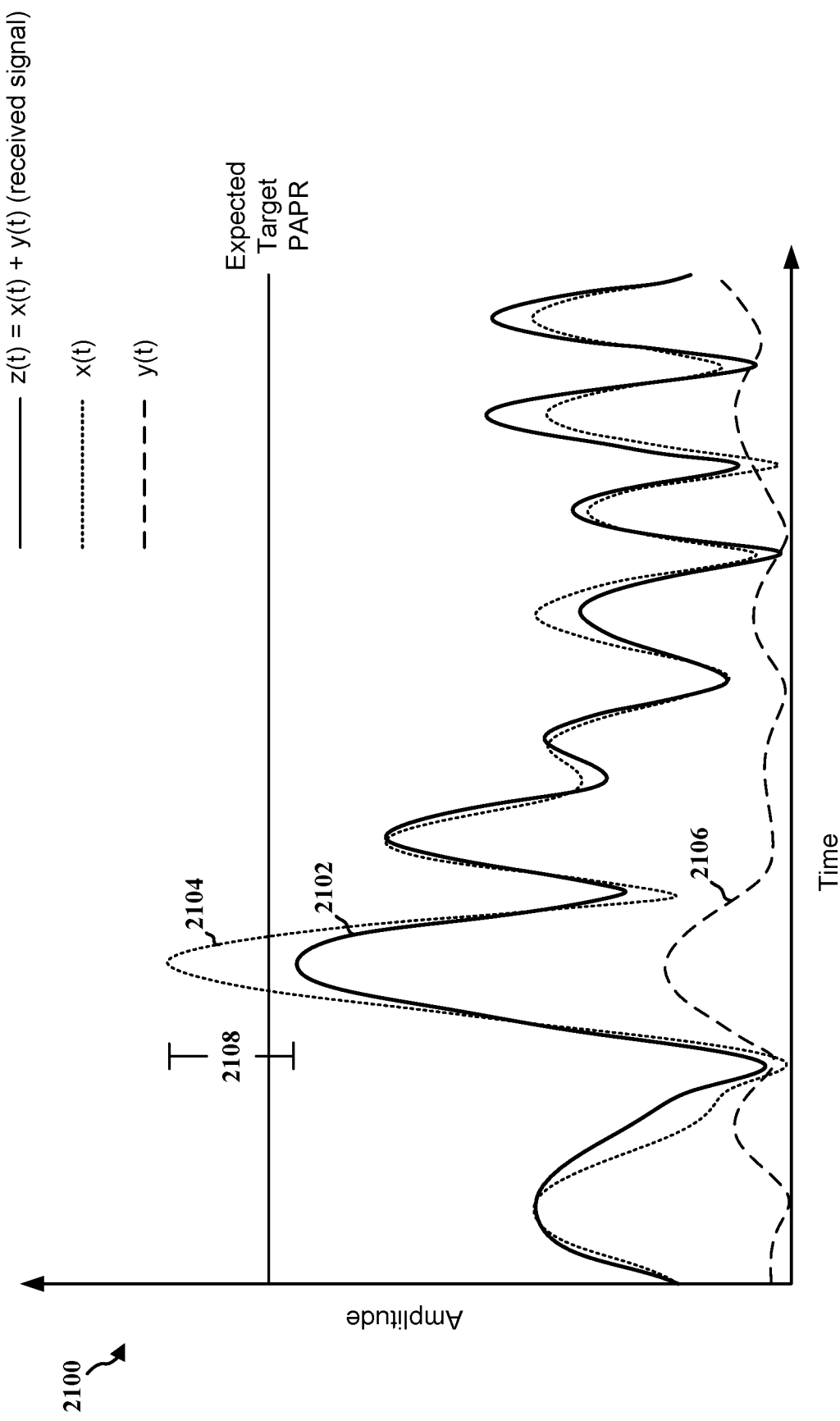
FIG. 21 is a diagram illustrating an example of a received signal observed at a receiving device in accordance with various aspects of the present disclosure.

FIG. 21 is a diagram 2100 illustrating an example of a received signal (e.g., z(t)) observed at a receiving device. A waveform 2102 may represent z(t), the received signal; a waveform 2104 may represent x(t), the data tones; and a waveform 2106 may represent y(t), the reserved tones or PRTs. The waveform 2104 for x(t) may be obtained by setting y(t) to 0, such as described in connection with Y(f) above. By observing the waveform 2102 (e.g., z(t)) and the waveform 2104 (e.g., x(t)), the receiving device may be able to determine the location and magnitude of the peak(s) cancelled by PRTs in y(t) (e.g., by the cancellation signal generated from kernel-1) at the transmitting device.

In one aspect, the receiving device may obtain the location of the cancelled peak(s) by comparing the phase of z(t) and x(t), where the phase may match at the cancelled peak location. For example, the receiving device may decide whether a peak was cancelled at cancelled at $t_0$ by defining that $|x(t_0)|$>target_peak, where $\angle x(t_0) \approx \angle y(t_0)$ such that y(t) has a peak at $y(t_0)$. The receiving device may obtain the magnitude of the cancelled peak(s) based on the difference (e.g., 2108) between the peak of the waveform 2012 and the peak of the waveform 2014. Thus, the transmitting device may be able to regenerate the cancelled peak(s) based on knowing their location and magnitude.

In one other aspect of the present disclosure, if the signal peak reduction performed at the transmitting device also involves additional kernel(s), such as kernel-2, the peak regeneration performed by the receiving device may also take the ratio (e.g., α) applied to kernel-1 into consideration if the value of α is known by the receiving device, such as through signaling from the transmitting device. For example, after observing and determining the peak difference (e.g., 2108) of a peak between z(t) and x(t), in restoring the peak, the receiving device may multiply the ratio α to the peak different (e.g., α is multiplied to the difference 2108).

In another aspect of the present disclosure, based on knowing the location of the peak(s) cancelled by kernel-1, the receiving device may also determine that the peak cancellation or reduction performed by kernel-2 is likely to occur at same peak location(s). In other words, the transmitting device may assume that peak(s) cancelled/reduced by signal generated from kernel-1 is also cancelled/reduced by signal generated from kernel-2. Thus, Once a cancelled peak is identified, the receiving device may compensate for kernel-2 (e.g., regenerate the peak cancelled by kernel-2) at the identified location. The receiving device may restore the peaks circularly using the circular shift concept described above, such that a signal with regenerated cancelled peak(s) (e.g., signal $x_{new}$) may be represented by:

$$x_{new} = x + \frac{1-\alpha}{\alpha} |y(t_0)| e^{\angle x(t_0) \cdot 1 i} circhisft(p_2, t_0).$$

To keep track of the cancelled peaks, the receiving device may construct an auxiliary signal $x_{aux}$=x-|y(t_0)| $e^{\angle x(t_0) \cdot 1 i}$ circhisft(p*, t_0) where p* may be an "ideal" kernel, such as described in connection with FIG. 15.

Figure 22:
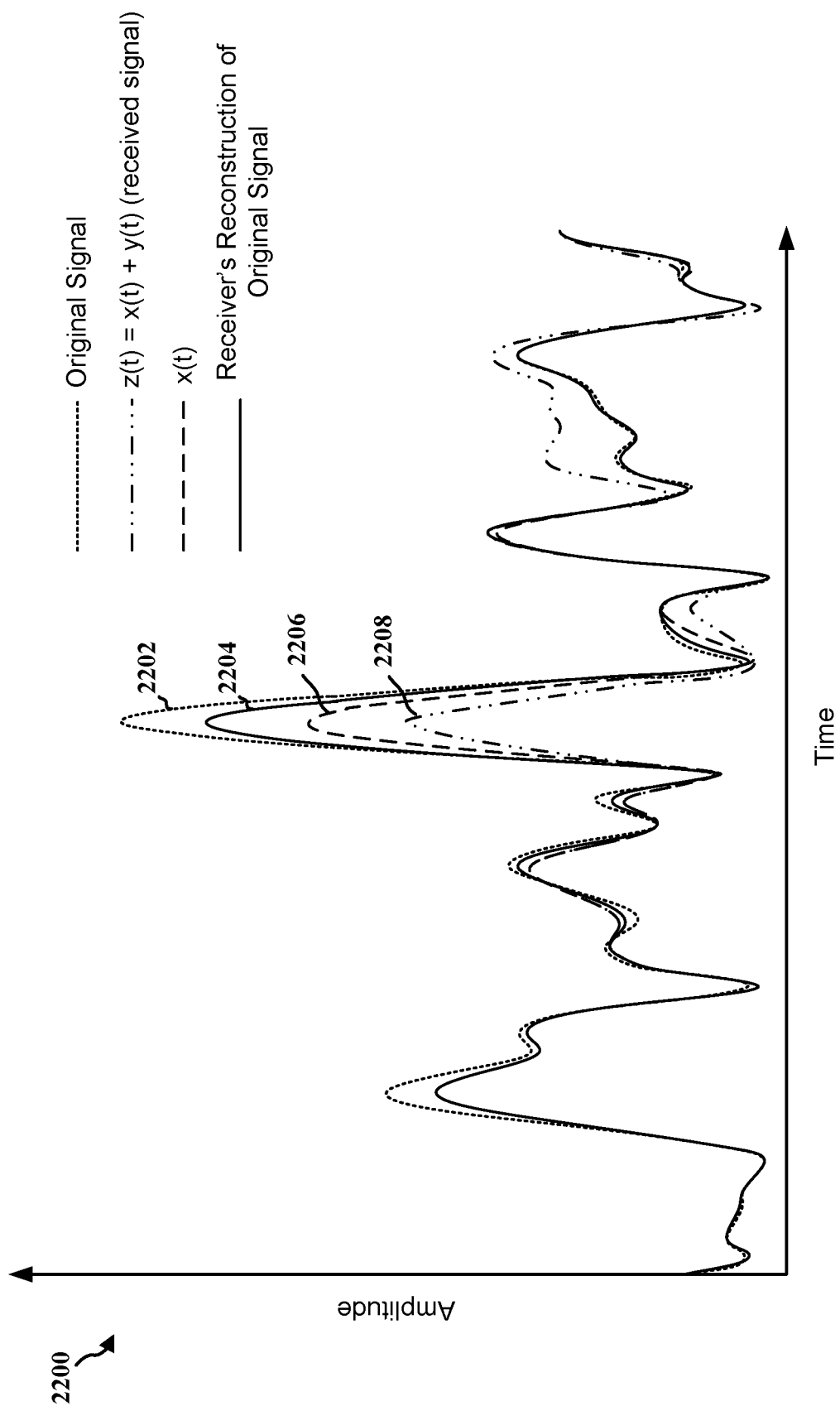
FIG. 22 is a diagram illustrating an example of regenerated signal at a receiving device in accordance with various aspects of the present disclosure.

FIG. 22 is a diagram 2200 illustrating an example of regenerated signal (e.g., $x_{new}$) at a receiving device. As described above, by observing the waveform 2206 of x(t) and waveform 2208 of z(t), the location and magnitude for peaks cancelled at the transmitting device may be identified. Then the receiving device may compensate the received signal z(t) by regenerating the cancelled peaks in z(t) to construct the waveform 2204 (e.g., $x_{new}$), which is closer to the waveform 2202 of the original signal (e.g., signal before peak reduction) than the received waveforms 2208 z(t). Thus, the distortion and/or EVM produced during the signal peak cancellation process at the transmitting device may be mitigated.

Figure 23:
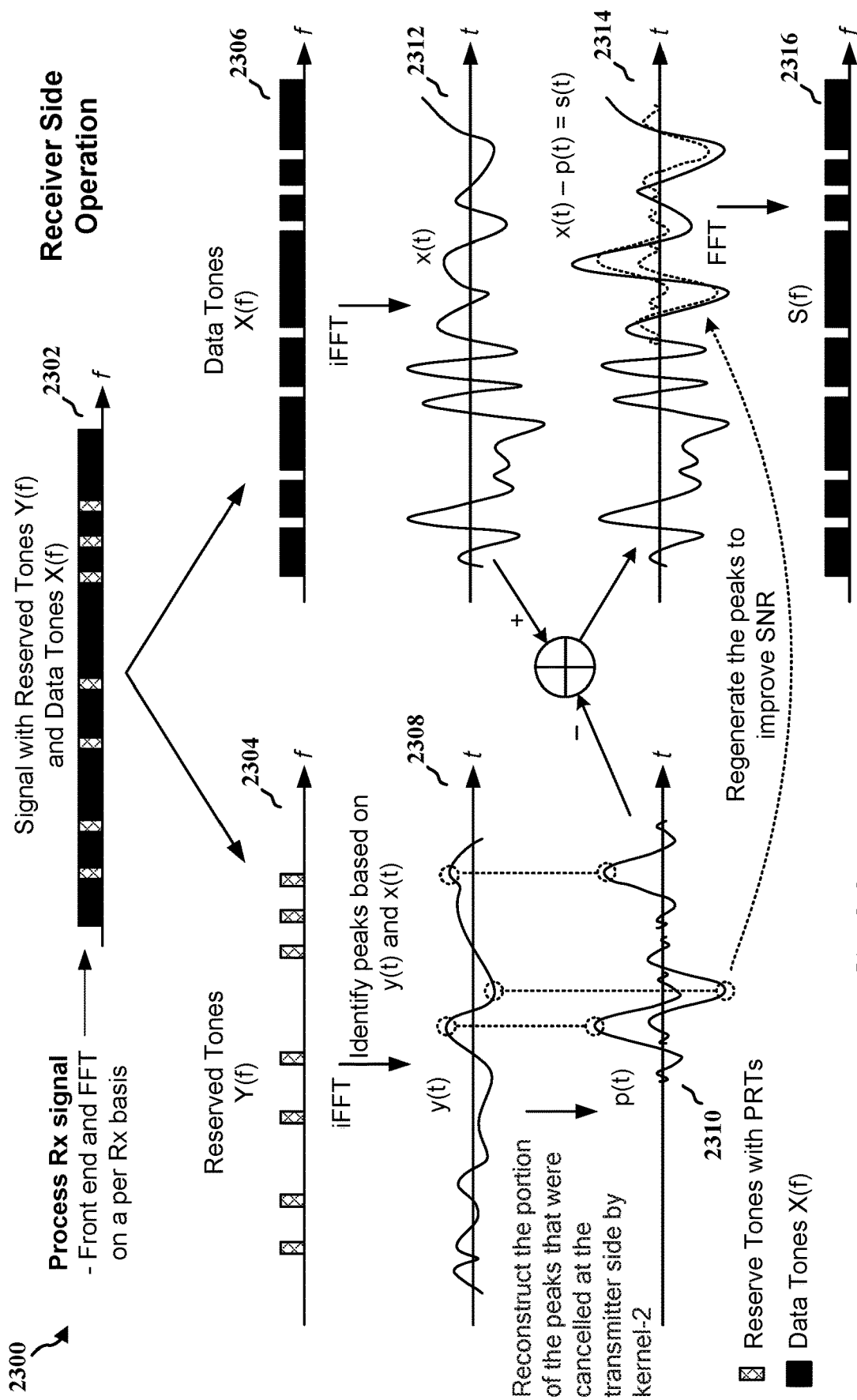
FIG. 23 is a diagram illustrating an example of signal regeneration at a receiving device in accordance with various aspects of the present disclosure.

FIG. 23 is a diagram 2300 illustrating an example of signal regeneration at a receiving device (e.g., base station 102, 180, 310, etc.). At 2302, the receiving device may receive a signal in frequency domain (e.g., Z(f)) including reserved tones Y(f) and data tones X(f) from a transmitting device. The receiving device may first separate Y(f) from X(f), such as shown at 2304 and 2306. At 2308, the receiving device may convert frequency domain signal Y(f) to time domain signal y(t) by applying iFFT to the Y(f). At 2310, the receiving device may identify one or more peaks cancelled at the transmitting device based on x(t) and y(t), such as described in connection with FIGS. 22 and 23. Similarly, at 2312, the receiving device may convert frequency domain signal X(f) to time domain signal x(t) by applying iFFT to the X(f). At 2314, the transmitting device may perform peak regeneration (e.g., x(t)+p(t)), and a resulting signal s(t) (e.g., $x_{new}$) may be obtained, such as described in connection with FIGS. 22 and 23. At 2316, the receiving device may then convert the resulting time domain signal s(t) to frequency domain signal S(t) by applying FFT to the s(t).

Referring back to the example where a linear combination is applied to the kernel-1 and the kernel-2. In each iteration, $z_{new}$=z-(|z(j)|-μ) $e^{\angle z(j) \cdot 1 i}$ (α$p_{kernel1}$+(1-α)$p_{kernel-2}$), the parameter α (e.g., 0≤α≤1) may determine how much each kernel contributes or the percentage of each kernel's contribution. For example, if α=0, then only kernel-1 may be contributing the peak cancelling signal; if α=1, then only kernel-2 may be contributing the peak cancelling signal; if α=0.4, then kernel-1 may be contributing 40% of the peak cancelling signal while kernel-2 may be contributing 60% of the peak cancelling signal, etc. As such, the value of α may also affect the performance of PAPR reduction when one or more kernel is used.

Aspects presented herein provide factors that may be considered by a transmitting device in determining the value of α. As when the value of α is approaching 0 (e.g., α≈0), such as 0.1, 0.2, etc., the contribution of kernel-2 approaches 1 (e.g., 100%), thereby most of the burden may be placed on kernel-2. As PRTs for kernel-2 (e.g., 1608 of FIG. 16) overlaps with data tones (e.g., 1606 of FIG. 16) either in full or in part, kernel-2 may distort the signal in the frequency domain, and may also introduce EVM to the transmission, such as described in connection with FIG. 18. In one example, a transmitting device may select the value of α to be close to zero (e.g., 0.1-0.3) and place more burden (e.g., contribution) on kernel-2 when a target PAPR is unable to be achieved with kernel-1 alone because of the high side-lobes generated by kernel-1, such as the PAPR threshold described in connection with FIG. 18. Thus, if the target of the transmitting device is to further lower the PAPR threshold, kernel-2 may be configured to provide more contribution than kernel-2. In another example, the transmitting device may select the value of α to be close to zero or have kernel-2 to provide more contribution than kernel-1 when there is a high Signal-to-Interference-plus-Noise Ratio (SINR) in the channel. When the receiving device is unable to decode PRTs in the reserved tones (e.g., y(t)), it may be difficult for the receiving device to perform peak regeneration for the received signal and compensate for the received signal, such as described in connection with FIGS. 21 to 23. For example, when the receiving device is unable to decode y(t), the receiving device may not be able to determine x(t) from z(t). Without x(t), the receiving device may not be able to determine the location and magnitude of the cancelled peak(s). As the signal for reserved tones or PRTs located in reserved tones (e.g., y(t)) are weaker than data tones in general (e.g., x(t)), when there is a high SINR in the channel, more burden should be placed on kernel-2 (i.e., contribution of kernel-2 is higher than kernel-1). Note that the transmitting device may be a base station or a UE. Thus, when the receiving device is a base station, the receiving device may determine the value of α for the transmitting device, such as a UE.

On the other hand, in another aspect, when the value of α is approaching 1 (e.g., a 1), such as 0.8, 0.9, etc., the contribution of kernel-1 approaches 1 (e.g., 100%), thereby most of the burden may be placed on kernel-1. While a signal generated from kernel-1 may not introduce EVM, the signal may have moderate to high side-lobes, such as described in connection with FIG. 17. In one example, a transmitting device may select the value of α to be close to 1 (e.g., 0.1-0.3) and place more burden (e.g., contribution) on kernel-1 when there is a poor channel condition (e.g., high SINR) where the receiving device is unable to decode y(t) or learn anything from y(t). In another example, the transmitting device may select the value of α to be close to 1 when the number of available PRTs or reserved tones is high in kernel-1. When there are more options for allocating PRTs, better peak cancelling signal may be formed and lower target PAPR may be achieved, such as described in connection with FIGS. 17 and 18. In other words, when the peak cancelling signal generated by kernel-1 is good or sufficient, the transmitting device may configure kernel-1 to provide higher contribution than kernel-2. In one other example, the transmitting device may select the value of α to be close to 1 when PRTs are to be shared by other UE(s) or when the PRTs between UE(s) overlap each other. For example, if two UEs are using same PRTs (e.g., PRT sequence) or there is at least an overlap between their PRTs, the base station may be unable to decode the y(t) as the y(t) may correspond to multiple users. Thus, more burden may be placed on kernel-1.

Figures 24A, 24B, 24C:
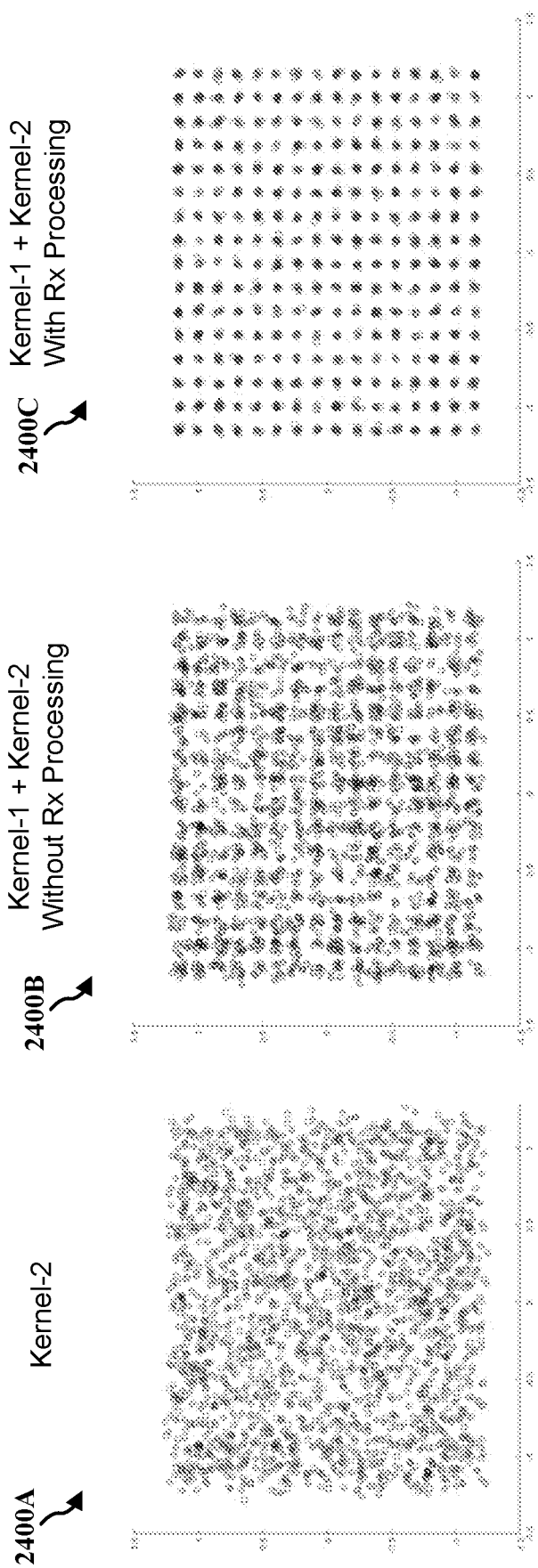
FIGS. 24A, 24B and 24C are diagrams illustrating example EVM in accordance with various aspects of the present disclosure.

FIGS. 24A, 24B and 24C are diagrams 2400A, 2400B and 2400C illustrating example EVM for 256QAM, where target PAPR is 7 dB, α=0.5, numDataTones=240, numPRT=16. When only kernel-2 is used, as shown by FIG. 24A, a lot distortion may be observed at the receiving device, where the receiving device may not be able to read or understand the constellation and decode the signal. The EVM may also be high (e.g., −22 dB). When both kernel-1 and kernel-2 are used and they are linearly combined with α=0.5 (e.g., each kernel contributes equally), as shown by FIG. 24B, the constellation of the received signal may look better than the constellation in FIG. 24A. As kernel-1 does not introduce any distortion (e.g., PRTs are located to reserved tones), by placing part of the burden (e.g., contribution) to kernel-1, the EVM of the received signal may be improved (e.g., −27 dB). Thus, the receiving device may be able to decode the received signal. When peak regeneration (e.g., described in connection with FIG. 23) is further applied to the received signal, as shown by FIG. 24C, the EVM may further be improved (e.g., −36 dB) as the regenerated signal more closely resembles the original signal (e.g., signal before applying peak cancellation by kernel-1 and kernel-2). The constellation of the signal overserved by the receiving device may look cleaner than ones shown in FIGS. 24A and 24B, and the receiving device may have higher success rate of decoding the received signal.

Figure 25:
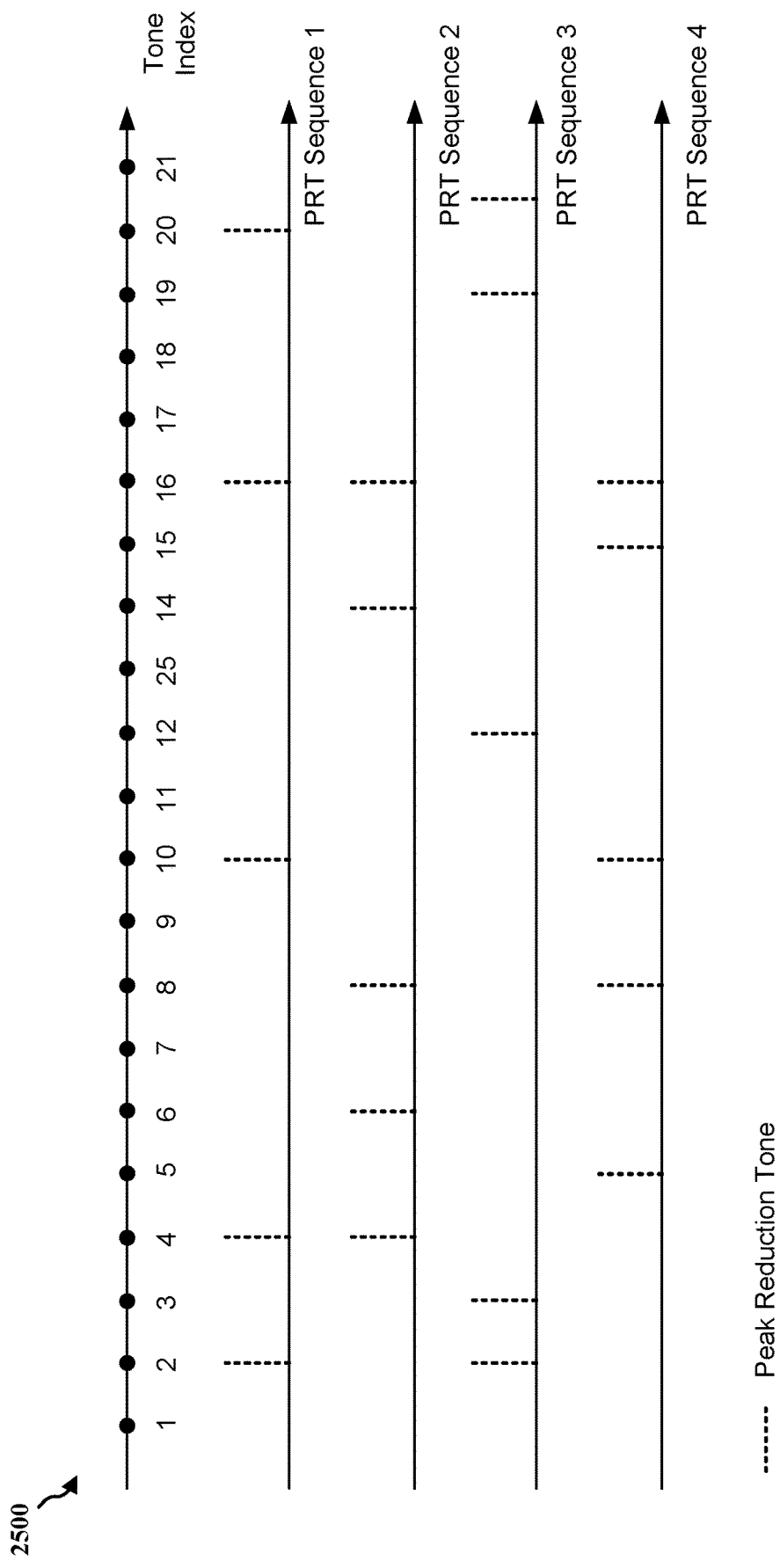
FIG. 25 is a diagram illustrating an example of PRT table in accordance with various aspects of the present disclosure.

In some examples, a PRT table or a PRT set including one or more PRT sequences may be pre-defined and fixed at the transmitting device and the receiving device. For example, each PRT sequence in the PRT table or set may include a fixed number of PRTs at pre-fixed locations (e.g., fixed PRT pattern), and the number of PRTs and/or their locations may be different for each PRT sequence. There may also be overlaps between different PRT sequences. For example, one PRT sequence may have PRTs at tones 1, 2, 3, 5, 7, another PRT sequence may have PRTs at tones 1, 2, 4, 6, 7 (with some overlap), and another PRT sequence may have PRTs at tones 4, 6, 8, 9, 10 (without overlap), etc. FIG. 25 is a diagram 2500 illustrating an example of PRT table, where one or more sequence of PRTs may be pre-defined in the PRT table. Thus, a transmitting device may pick a sequence within the PRT table to locate PRTs.

In addition to specific-transmission based aspects, techniques also include receiver-specific features. For example, a receiving device (e.g., base station) to decode a transmission involving the tone reservation, the receiving device may be configured to determine which tones within a transmission are data tones and which tones are PRTs. This determination aids and/or enables a receiving device to ignore or bypass PRTs and decode data tones. In addition, the receiving device may also need to know whether the transmitting device is sending the transmission with the tone reservation in the first place, whether PRTs are allocated to data tones, whether peak regeneration is required and/or which PRT sequence is chosen by the transmitting device, etc.

Techniques discussed herein can provide a number of benefits. For example, some aspects presented here may enable a transmitting device to signaling the location of the reserved tones or PRTs to a receiving device. In one aspect, the location of the PRTs may be fixed in advance either in a PRT table (PRTT) or via a deterministic function such as a perfect ruler, a Golomb ruler, a Gold sequence, a Costas array and/or a linear function, such as described in connection with FIG. 15 and Table 1. Thus, the transmitting device, such as a base station, may signal (e.g., send indication to) the receiving device, such as a UE the appropriate row of the PRT table and/or the parameters of the deterministic function. For example, the base station may inform the UE which set of Golomb ruler to use for allocation of PRTs, and the UE may allocate PRTs according to the set chosen by the base station, such that the base station may know which tones to ignore (e.g., PRTs) and which tones to decode. The base station may send this information to the UE via DCI, MAC-CE and/or RRC, etc., and the base station may determine whether to use DCI, MAC-CE and/or RRC depending on how time sensitive is the communication. In addition, the UE may recover the PRT sequence from the PRT table if a PRT table is indicated to the UE by the base station. Thus, each entry of the PRT table may be the PRT sequence, or it may be parameters to a deterministic function that generates the PRT sequence, etc. Alternatively, or additionally, the signaling for PRT location may be explicit, where the base station may inform the UE(s) which tones should be used as PRT. For example, if any PRT related or tone reservation mechanism is used in the downlink, the base station may be configured to inform the UE of the parameters the base station has used. If the mechanism is used for the uplink, the base station may be configured to inform the UE which parameters to use. As mentioned previously, the transmitting device may be a base station or a UE and the receiving device may be a base station or a UE as well. Thus, examples using the base station and the UE are for illustration purposes, and shall not be construed to limit the scope of the present disclosure.

To assist a receiving device to restore cancelled peak(s) and regenerate the received signal, such as described in connection with FIGS. 21-23, the transmitting device and the receiving device may need to have a consensus or the same knowledge on certain parameters. In one aspect, when one or more peak cancelling kernel (e.g., kernel-1 and kernel-2) is used, the transmitting device and the receiving device may agree the parameter for $\alpha$, such as via explicit signaling or in a PRT table. In other aspect, the transmitting device and the receiving device may agree on the target PAPR, such as shown by the "expected target PAPR" in FIG. 21. For example, the transmitting device may set an expected target PAPR, and the receiving device may receive a transmission z(t) with the signal falling below the expected target PAPR, such as shown by 2102 in FIG. 21. The receiving device may then set y(t) to zero to obtain x(t), such as described in connection with FIGS. 21-23, where the receiving device may observe one or more peak in x(t) exceeds the expected target PAPR. Thus, the receiving device may be able to identify the location of the one or more cancelled peak(s) based at least in part on the expected target PAPR. In one other aspect, the transmitting device, such as a UE, may need to know the permissible power spectral density (e.g., max power allowed) for each kernel (e.g., kernel-1 and kernel-2).

Figure 26A:
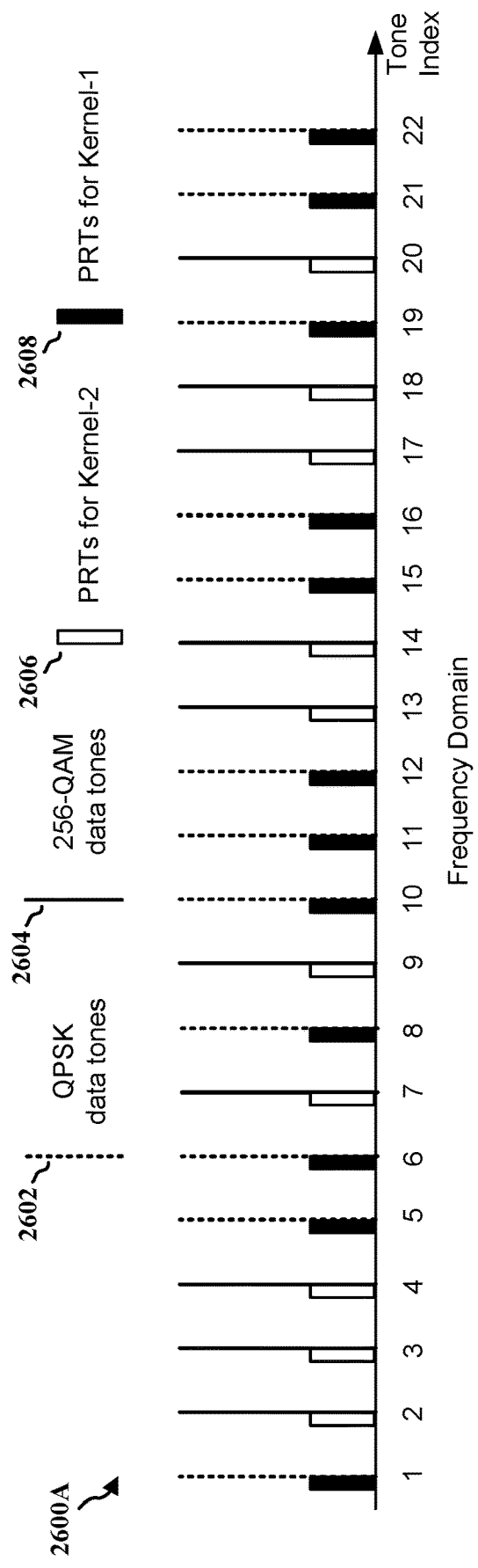
FIGS. 26A and 26B are diagrams illustrating example MCS for kernel-1 and kernel-2 in accordance with various aspects of the present disclosure.
Figure 26B:
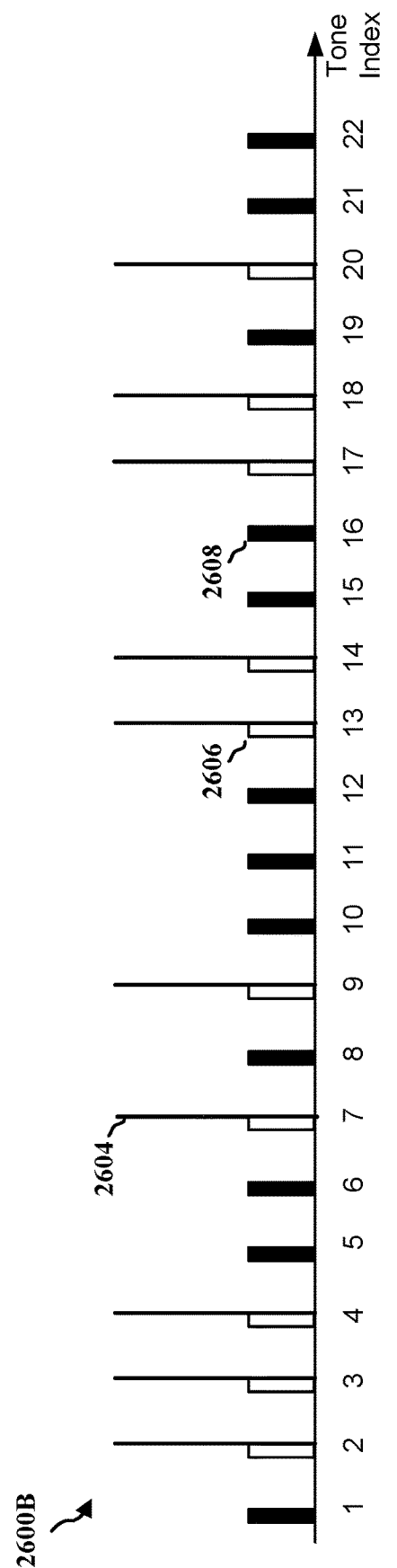

Techniques discussed herein can provide a number of benefits. For example, some aspects presented herein may enable a transmitting device to multiplex different MCS for the one or more kernels (e.g., kernel-1 and kernel-2). In one aspect, tones corresponding to kernel-1 and kernel-2 may be overloaded with different Modulation and Coding Scheme (MCS). FIGS. 26A and 26B are diagrams 2600A and 2600B illustrating example MCS for kernel-1 and kernel-2. In FIG. 26A, a transmission may include a plurality of data tones (e.g., tone index 1-22) without reserved tones, such that the PRTs 2608 for kernel-1 and PRTs 2606 for kernel-2 are overlapped with data tones (e.g., kernel-1 is functioning similar to kernel-2). The transmitting device may apply a first MCS (e.g., 256-QAM data) on the data tones 2604 corresponding to the PRTs 2606 for kernel-2 (e.g., tone index 2-4, 7, 9, 13, 14, 17, 18, 19) and the transmitting device may apply a second MCS (e.g., QPSK) to the data tones 2602 corresponding to the PRTs 2608 for kernel-1 (e.g., tone index 1, 5, 6, 8, 10-12, 15, 16, 19, 21, 22). As one kernel in kernel-1 and kernel-2 may have a noise higher than the other one, the transmitting device may apply an MCS with lower modulation order (e.g., QPSK) to the kernel with higher noise level as MSC with lower modulation order may be more tolerable or susceptible to the noise. The transmitting device may then apply an MCS with higher modulation order (e.g., 256-QAM) to the kernel with lower noise level.

When a receiving device receives the transmission, the receiving device may first decode data tones 2602 that has lower modulation order, and then subtract data tones 2602 from the transmission. The transmission after subtracting data tones 2604 is shown by FIG. 26B, where the allocation of data tones 2604 that has higher modulation order and PRTs 2608 for kernel-1 may resemble to the diagram 700 of FIG. 7. For example, the receiving device may observe a transmission that has PRTs (e.g., 2608) not overlapping with data tones (e.g., 2604). Based on the transmission shown in FIG. 26B, the receiving device may identify the location and magnitude of the one or more peak cancelled at the transmitting device using PRTs 2606 for kernel-1, such as described in connection with FIGS. 21-23. Based on the identified location and magnitude of the cancelled peak(s), the receiving device may regenerate/reconstruct the cancelled peak(s) to improve the SNR, such as described in connection with FIGS. 21-23. Afterwards, the receiving device may decode the data tones 2604 with higher modulation order (e.g., 256-QAM). Although the example of QPSK and 256 QAM is provided to illustrate the concept of two MCSs applied to the different sets of data tones, the concepts described herein may also be applied for other MCS than QPSK and 256 QAM.

For example, let x(t) be the waveform corresponding to the high MCS data (e.g., 2604) and y(t) be the waveform corresponding to the low MCS data (e.g., 2602). Then the PRTs (e.g., 2608 and 2606) corresponding to the high MCS data and the low MCS data may be used to reduce the PAPR of x(t)+y(t). For instance, if the PRT waveform for kernel-1 and kernel-2 are s1(t) and s2(t) respectively, then the goal of the transmitting device is to make x(t)+y(t)+s1(t)+s2(t) to have a low PAPR. The tone reservation mechanism (e.g., PRT allocation) described in connection with FIGS. 7-11 and 15-20 may be applied to x(t)+y(t)+s1(t)+s2(t) to achieve the goal. For example, let X(f), Y(f), S1(f) and S2(f) be the frequency-domain representation of x(t), y(t), s1(t) and s2(t). There may be no overlap between the tones in the support of X(f) and Y(f), where tones in the support of Y(f) and S2(f) fully overlap and tones in the support of X(f) and S1(f) fully overlap. In another aspect, when using two MCS, the transmitting device, such as a UE, may assign different transmission power to X(f) and Y(f). For instance, if the two MCS are equal, then the transmitting device may assign a higher transmission power to Y(f) to compensate for the noise introduced by kernel-2, such that the receiving device is able to differentiate X(f) and Y(f).

For a receiving device to decode the transmission involving two MCS, the receiving device may need to be informed that the transmitting device is transmitting the transmission using two MCS. In one example, when a base station is the receiving device, the base station may signal (e.g., send indication to) a transmitting device (e.g., the UE) regarding the one or more potential and different MCS to use for different subsets of the tones for a transmission. In another example, a first MCS may be signaled for the first subset of the data tones and a second MCS may be signaled for the second subset.

In order for a receiving device, such as a base station, to decode a transmission involving two MCS, the transmitting device, such as the UE, may attempt to limit noise that is introduced into the transmission (e.g., in the PRTs 2606 and 2608). Otherwise the receiving device may not be able to decode the transmission. In one aspect, a power constraint may be applied to the transmission device for each set of tones. For example, a base station may apply one or more power constraints for each set of tones (e.g., 2606, 2608) to a UE transmitting with two MCS. The UE may then follow the power constraints rule received for each set of tones that is to be transmitted to the base station. This may avoid significant distortion to the data (e.g., 2602 and 2604). The power constraint rule(s) may be inferred from the two MCS that are signaled to the UE, or it may be signaled separately (e.g., in a separate message or indication), or it may be fixed in advance in the UE, such as in the PRT table. In receiving the transmission, the base station may perform noise estimation for the data (e.g., 2602, 2604) based at least in part on the assumption that the UE is using the PRTs for reducing the peaks of the signal while adhering to the required power constraint.

Figure 27:
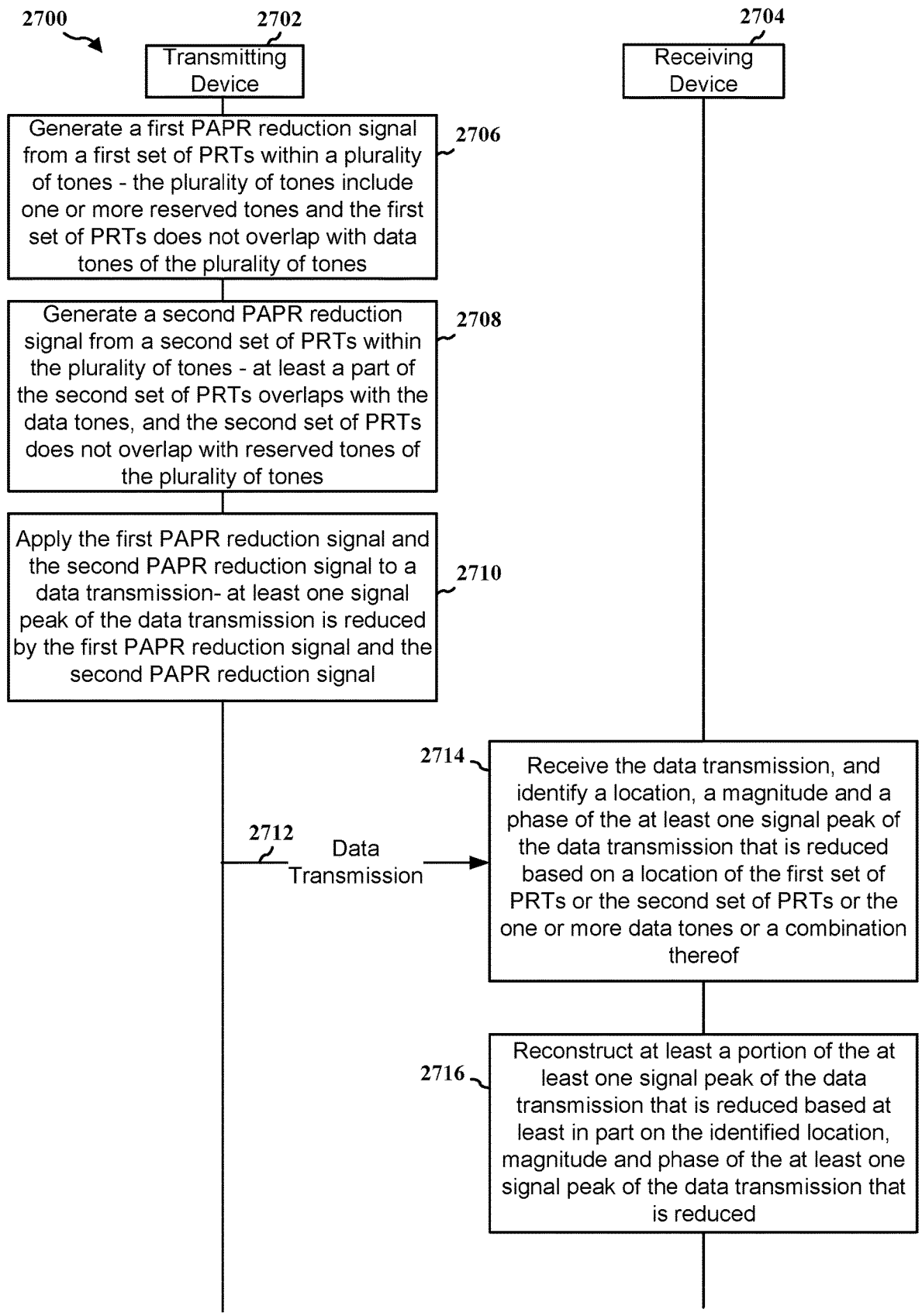
FIG. 27 illustrates an example communication flow between a transmitting device and a receiving device in accordance with various aspects of the present disclosure.

FIG. 27 illustrates an example communication flow 2700 between a transmitting device 2702 and a receiving device 2704 according to aspects of the present disclosure. For example, the aspects may be performed by a transmitter and receiver as discussed in connection with FIG. 1 or 3. The transmitting device 2702 may be a UE or a base station, and the receiving device 2704 may also be a UE or a base station.

At 2706, the transmitting device 2702 may generate a first PAPR reduction signal from a first set of PRTs within a plurality of tones, where the plurality of tones may include one or more reserved tones and the first set of PRTs may not overlap with data tones of the plurality of tones, such as described in connection with FIGS. 16-20. As the first set of PRTs may not overlap with data tones, the first kernel may be configured to generate the first PAPR reduction signal without introducing error vector magnitude, such as described in connection with FIG. 17.

At 2708, the transmitting device 2702 may generate a second PAPR reduction signal from a second set of PRTs within the plurality of tones, where at least a part of the second set of PRTs overlaps with the data tones, and the second set of PRT may not overlap with reserved tones of the plurality of tones, such as described in connection with FIGS. 16-20. In one example, the first PAPR reduction signal may be generated from a first kernel and the second PAPR reduction signal may be generated from a second kernel. In such an example, the second kernel may be configured to generate the second PAPR reduction signal without peak regrowth, such as described in connection with FIG. 18.

At 2710, the transmitting device 2702 may apply the first PAPR reduction signal and the second PAPR reduction signal to a data transmission, where at least one signal peak of the data transmission may be reduced by the first PAPR reduction signal and the second PAPR reduction signal, such as described in connection with FIGS. 16-20.

In one example, prior to apply the PAPR reduction signals, the transmitting device 2702 may receive an indication from the receiving device 2704 to apply PAPR reduction for the data transmission. In addition, the transmitting device 2702 may receive an indication from the receiving device 2704 of a permissible spectral density. For example, the transmitting device 2702 may receive the indication regarding whether to apply PAPR and/or the location of the reserved tones in at least one of RRC signaling, DCI, or a MAC-CE.

In another example, in applying the first PAPR reduction signal and the second PAPR reduction signal to the data transmission, the transmitting device 2702 may combine the first PAPR reduction signal with the second PAPR reduction signal to form a third PAPR reduction signal, and applies the third signal to the data transmission to reduce the PAPR of the transmission, such as described in connection with FIGS. 16-20. In addition, the transmitting device 2702 may apply a first ratio to the first PAPR reduction signal and a second ratio to the second PAPR reduction signal, such that the first PAPR reduction signal and the second PAPR reduction signal may have different ratio of contribution to the peak cancellation, such as described in connection with FIG. 20.

In another example, the transmitting device 2702 may determine the first ratio and the second ratio based on one or more of: channel conditions, an amount of available peak reduction tones, whether a PAPR can be achieved with a kernel applied to reserved tones, or sharing of peak reduction tones with other user equipment. In addition, the transmitting device 2702 may receive an indication of a parameter for at least one of the first ratio or the second ratio from a transmitting device, such as a receiving device 2704. In response, the transmitting device 2702 may send a response to the receiving device 2704 regarding the parameter received from the receiving device, such as a receipt confirmation.

At 2708, after applying the first PAPR reduction signal and the second PAPR reduction signal to a data transmission, the transmitting device 2702 may transmit the data transmission to the receiving device 2704.

At 2714, after the receiving device 2704 receives the data transmission from the transmitting device 2702, the receiving device 2704 may identify a location, a magnitude and a phase of the at least one signal peak of the data transmission that is reduced based on a location of the first set of PRTs or the second set of PRTs or the one or more data tones or a combination thereof, such as described in connection with FIGS. 16-20.

At 2716, the receiving device 2704 may regenerate at least a portion of the at least one signal peak of the data transmission that is reduced based at least in part on the identified location, magnitude and phase of the at least one signal peak of the data transmission that is reduced, such as described in connection with FIGS. 16-20. The regeneration of the at least one signal peak of the data transmission may increase the SNR of the data transmission.

In one example, to regenerate a peak cancelled by the first PAPR reduction signal and the second PAPR reduction signal, the receiving device 2704 may apply a first ratio to the first PAPR reduction signal and a second ratio to the second PAPR reduction signal, such as described in connection with FIGS. 16-20, where the value of the first ratio and the second ratio may each be less than one, and the first ratio and the second ratio may optionally add up to one. In such an example, the receiving device 2704 may determine the first ratio and the second ratio based on one or more of: channel conditions, an amount of available peak reduction tones, whether a target PAPR can be achieved with a kernel applied to reserved tones, and/or sharing of peak reduction tones with other user equipment. The receiving device 2704 may also send an indication of a parameter for at least one of the first ratio or the second ratio to the transmitting device, such that the transmitting device may apply the parameter for the first ratio or the second ratio when sending the data transmission to the receiving device 2704. In response, the receiving device 2704 may receive a response from the transmitting device about the parameter, such as a receiving confirmation or capability/availability to apply the parameter, etc.

Figure 28:
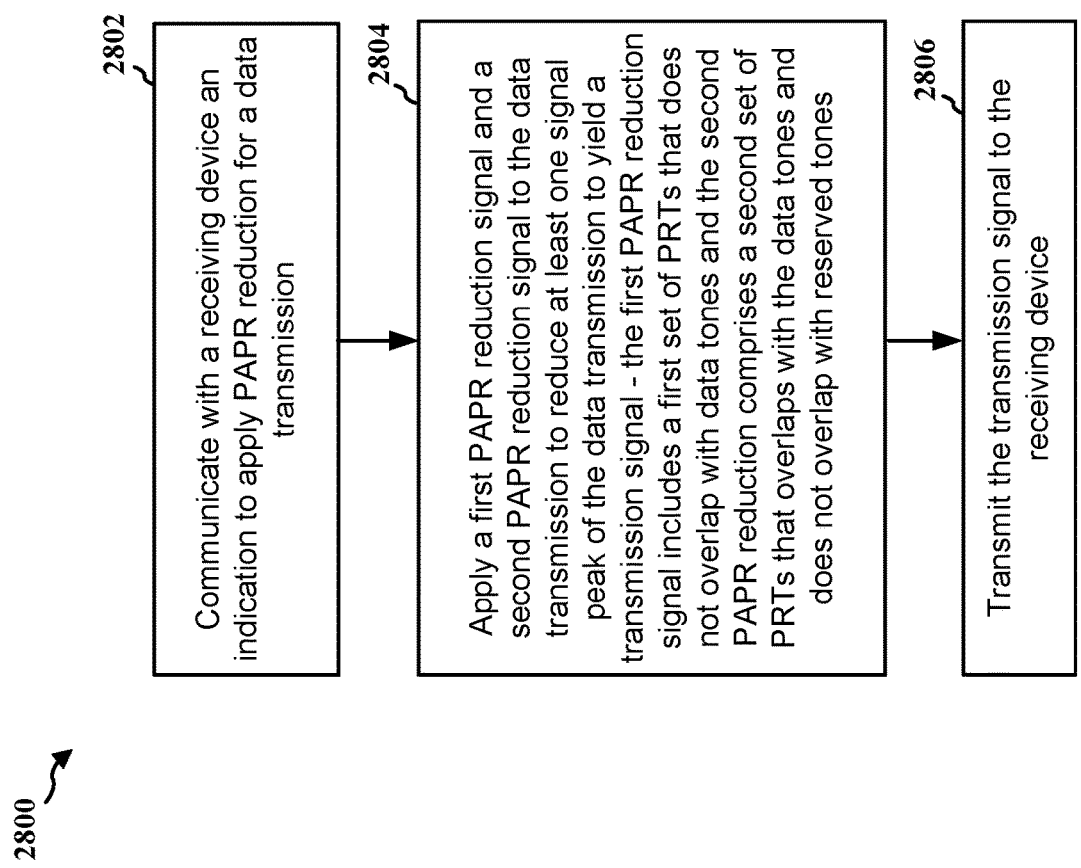
FIG. 28 is a flowchart of a method of wireless communication in accordance with various aspects of the present disclosure.

FIG. 28 illustrates a flowchart of a method 2800 of wireless communication. The method may be performed by a transmitting device or a component of a transmitting device (e.g., the transmitting device 2702; the apparatus 2902; a processing system, which may include the memory 360 and which may be the entire UE 350 or a component of the UE 350, such as the TX processor 368, the RX processor 356, and/or the controller/processor 359). In some aspects, the method may be performed by a transmitting device such as described in connection with any of FIG. 1, 3, or 27. One or more aspects illustrated in FIG. 28 may be optional. Various implementations may include a method with any combination of the aspects described in connection with FIG. 28. The method may enable the transmitting device to use one or more kernel to generate one or more peak cancelling signal. The transmitting device may then reduce the PAPR of a transmission by applying the one or more peak cancelling signal(s) to the transmission. The one or more peak cancelling signal(s) may be combined prior to be applied to the transmission.

At 2802, the transmitting device may communicate with a receiving device an indication to apply PAPR reduction for a data transmission, such as described in connection with FIGS. 16-20 and 27. For example, at 2712, the transmitting device 2702 may communicate with the receiving device 2704. The communication may be performed, e.g., by the transmission component 2934 and/or the reception component 2930 of the apparatus 2902 in FIG. 29.

At 2804, the transmitting device may apply a first PAPR reduction signal and a second PAPR reduction signal to the data transmission to reduce at least one signal peak of the data transmission to yield a transmission signal, where the first PAPR reduction signal includes a first set of PRTs that does not overlap with data tones and the second PAPR reduction includes a second set of PRTs that overlaps with the data tones and does not overlap with reserved tones, such as described in connection with FIGS. 16-20 and 27. For example, at 2710, the transmitting device 2702 may apply the first PAPR reduction signal and the second PAPR reduction signal to a data transmission, where at least one signal peak of the data transmission is reduced by the first PAPR reduction signal and the second PAPR reduction signal. The application of the first PAPR reduction signal and the second PAPR reduction signal to the data transmission may be performed, e.g., by the first kernel component 2940, the second kernel component 2942, and/or the PAPR application component 2944 of the apparatus 2902 in FIG. 29.

In one example, the first PAPR reduction signal may be generated from a first kernel and the second PAPR reduction signal may be generated from a second kernel, such as described in connection with 2706 and 2708 of FIG. 27. In such an example, the second kernel may be configured to generate the second PAPR reduction signal without peak regrowth, such as described in connection with FIG. 18.

In another example, as the first set of PRTs may not overlap with data tones, the first kernel may be configured to generate the first PAPR reduction signal without introducing EVM, such as described in connection with FIG. 17.

In another example, prior to apply the PAPR reduction signals, the transmitting device may receive an indication from a base station to apply PAPR reduction for the data transmission. In addition, the transmitting device may receive an indication from a base station of a permissible spectral density. The transmitting device may receive the indication regarding whether to apply PAPR and/or the location of the reserved tones in at least one of RRC signaling, DCI, or a MAC-CE.

In another example, in applying the first PAPR reduction signal and the second PAPR reduction signal to the data transmission, the transmitting device may combine the first PAPR reduction signal with the second PAPR reduction signal to form a third PAPR reduction signal, and applies the third signal to the data transmission to reduce the PAPR of the transmission, such as described in connection with FIGS. 16-20. In addition, the transmitting device may apply a first ratio to the first PAPR reduction signal and a second ratio to the second PAPR reduction signal, such that the first PAPR reduction signal and the second PAPR reduction signal may have different ratio of contribution to the peak cancellation, such as described in connection with FIG. 20.

In another example, the transmitting device may determine the first ratio and the second ratio based on one or more of: channel conditions, an amount of available peak reduction tones, whether a PAPR can be achieved with a kernel applied to reserved tones, or sharing of peak reduction tones with other user equipment. In addition, the transmitting device may receive an indication of a parameter for at least one of the first ratio or the second ratio from a transmitting device, such as a base station. In response, the transmitting device may send a response to the base station regarding the parameter received from the receiving device, such as a receipt confirmation.

At 2806, after applying the first PAPR reduction signal and the second PAPR reduction signal to the data transmission to reduce at least one signal peak of the data transmission to yield a transmission signal, the transmitting device may transmit the transmission signal to the receiving device, as described in connection with FIG. 20. For example, at 2712, the transmitting device 2702 may transmit the data transmission to the receiving device 2704. The transmission of the data may be performed, e.g., by the data process component 2946 and/or the transmission component 2934 of the apparatus 2902 in FIG. 29.

Figure 29:
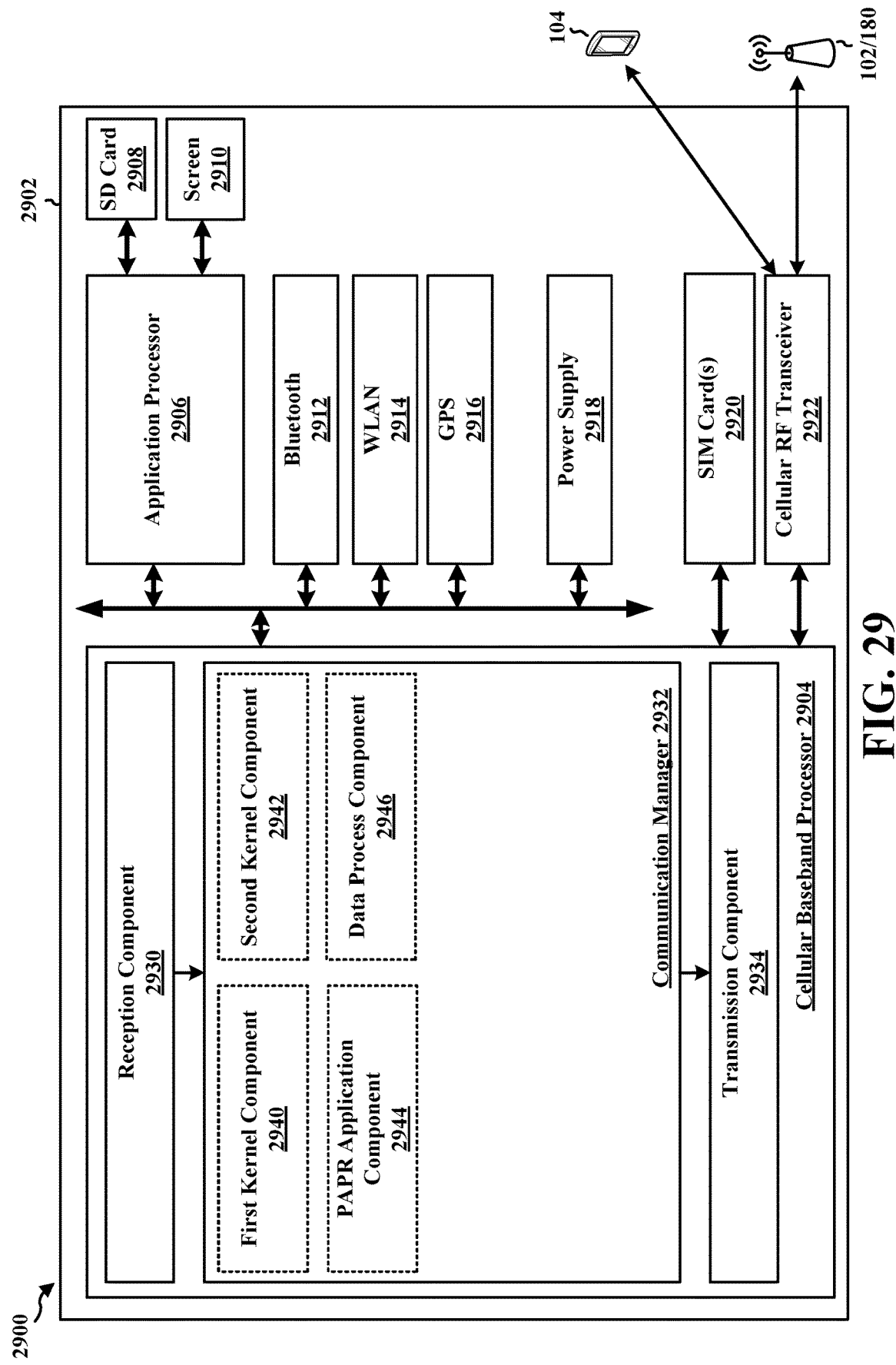
FIG. 29 is a diagram illustrating an example of a hardware implementation for an example apparatus in accordance with various aspects of the present disclosure.

FIG. 29 is a diagram 2900 illustrating an example of a hardware implementation for an apparatus 2902. The apparatus 2902 may be a transmitting device (e.g., the transmitting device 2702). In some aspects, the apparatus 2902 may be a UE (e.g., as described in connection with the UE 104 or 350 in FIGS. 1 and/or 3), a component of a UE, or may implement UE functionality. In other aspects, the apparatus 2902 may be a base station (e.g., as described in connection with the base station 102/180 or 310 in FIG. 1 and/or FIG. 3), a component of a base station, or may implement base station functionality.

The apparatus 2902 may include a cellular baseband processor 2904 (also referred to as a modem) that may be coupled to a cellular RF transceiver 2922. In some scenarios, the apparatus 2902 may further include one or more subscriber identity modules (SIM) cards 2920, an application processor 2906 coupled to a secure digital (SD) card 2908 and a screen 2910, a Bluetooth module 2912, a wireless local area network (WLAN) module 2914, a Global Positioning System (GPS) module 2916, and/or a power supply 2918. The cellular baseband processor 2904 communicates through the cellular RF transceiver 2922 with a receiving device, e.g., which may be the UE 104 and/or BS 102/180. The cellular baseband processor 2904 may include a computer-readable medium/memory. The cellular baseband processor 2904 is responsible for general processing, including the execution of software stored on the computer-readable medium/memory. The software, when executed by the cellular baseband processor 2904, causes the cellular baseband processor 2904 to perform the various functions described herein. The computer-readable medium/memory may also be used for storing data that is manipulated by the cellular baseband processor 2904 when executing software. The cellular baseband processor 2904 further includes a reception component 2930, a communication manager 2932, and a transmission component 2934. The communication manager 2932 includes the one or more illustrated components. The components within the communication manager 2932 may be stored in the computer-readable medium/memory and/or configured as hardware within the cellular baseband processor 2904. The cellular baseband processor 2904 may be a component of the UE 350 and may include the memory 360 and/or at least one of the TX processor 368, the RX processor 356, and the controller/processor 359. In one configuration, the apparatus 2902 may be a modem chip and include just the baseband processor 2904, and in another configuration, the apparatus 2902 may be the entire UE (e.g., see 350 of FIG. 3) and include the additional modules of the apparatus 2902. In other aspects, the cellular baseband processor 2904 may be a component of the base station 310 or the entire base station 310 and may include the additional modules of the apparatus 2902.

The communication manager 2932 includes a first kernel component 2940 that is configured to generate a first PAPR reduction signal from a first set of PRTs within a plurality of tones, where the plurality of tones further include one or more reserved tones and the first set of PRTs does not overlap with data tones of the plurality of tones. The communication manager 2932 further includes a second kernel component 2942 that is configured to generate a second PAPR reduction signal from a second set of PRTs within the plurality of tones, where at least a part of the second set of PRTs overlaps with the data tones, and the second set of PRT does not overlap with reserved tones of the plurality of tones. The communication manager 2932 further includes a PAPR application component 2944 that is configured to communicate with a receiving device an indication to apply PAPR reduction for a data transmission and/or is configured to apply a first PAPR reduction signal and a second PAPR reduction signal to the data transmission to reduce at least one signal peak of the data transmission to yield a transmission signal, where the first PAPR reduction signal includes a first set of PRTs that does not overlap with data tones and the second PAPR reduction includes a second set of PRTs that overlaps with the data tones and does not overlap with reserved tones, e.g., as described in connection with 2802 and 2804 of FIG. 28. The communication manager 2932 further includes a data process component 2946 that is configured to transmit the transmission signal to the receiving device, e.g., as described in connection with 2808 of FIG. 28.

The apparatus may include additional components that perform each of the blocks of the algorithm in the flowcharts of FIG. 28. As such, each block in the flowcharts of FIG. 28 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2902 may include a variety of components configured for various functions. In one configuration, the apparatus 2902, and in particular the cellular baseband processor 2904, includes means for generating a first PAPR reduction signal from a first set of PRTs within a plurality of tones, where the plurality of tones further include one or more reserved tones and the first set of PRTs does not overlap with data tones of the plurality of tones (e.g., the first kernel component 2940). The apparatus 2902 may further include means for generating a second PAPR reduction signal from a second set of PRTs within the plurality of tones, where at least a part of the second set of PRTs overlaps with the data tones, and the second set of PRT does not overlap with reserved tones of the plurality of tones (e.g., the second kernel component 2942). The apparatus 2902 may further include means for communicating with a receiving device an indication to apply PAPR reduction for a data transmission (e.g., the transmission component 2934 and/or the reception component 2930). The apparatus 2902 may further include means for apply a first PAPR reduction signal and a second PAPR reduction signal to the data transmission to reduce at least one signal peak of the data transmission to yield a transmission signal, where the first PAPR reduction signal includes a first set of PRTs that does not overlap with data tones and the second PAPR reduction includes a second set of PRTs that overlaps with the data tones and does not overlap with reserved tones (e.g., the PAPR application component 2944). The apparatus 2902 may further include means for transmit the transmission signal to the receiving device (e.g., the data process component 2946 and/or the transmission component 2934).

The means may be one or more of the components of the apparatus 2902 configured to perform the functions recited by the means. As described herein, the apparatus 2902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 30:
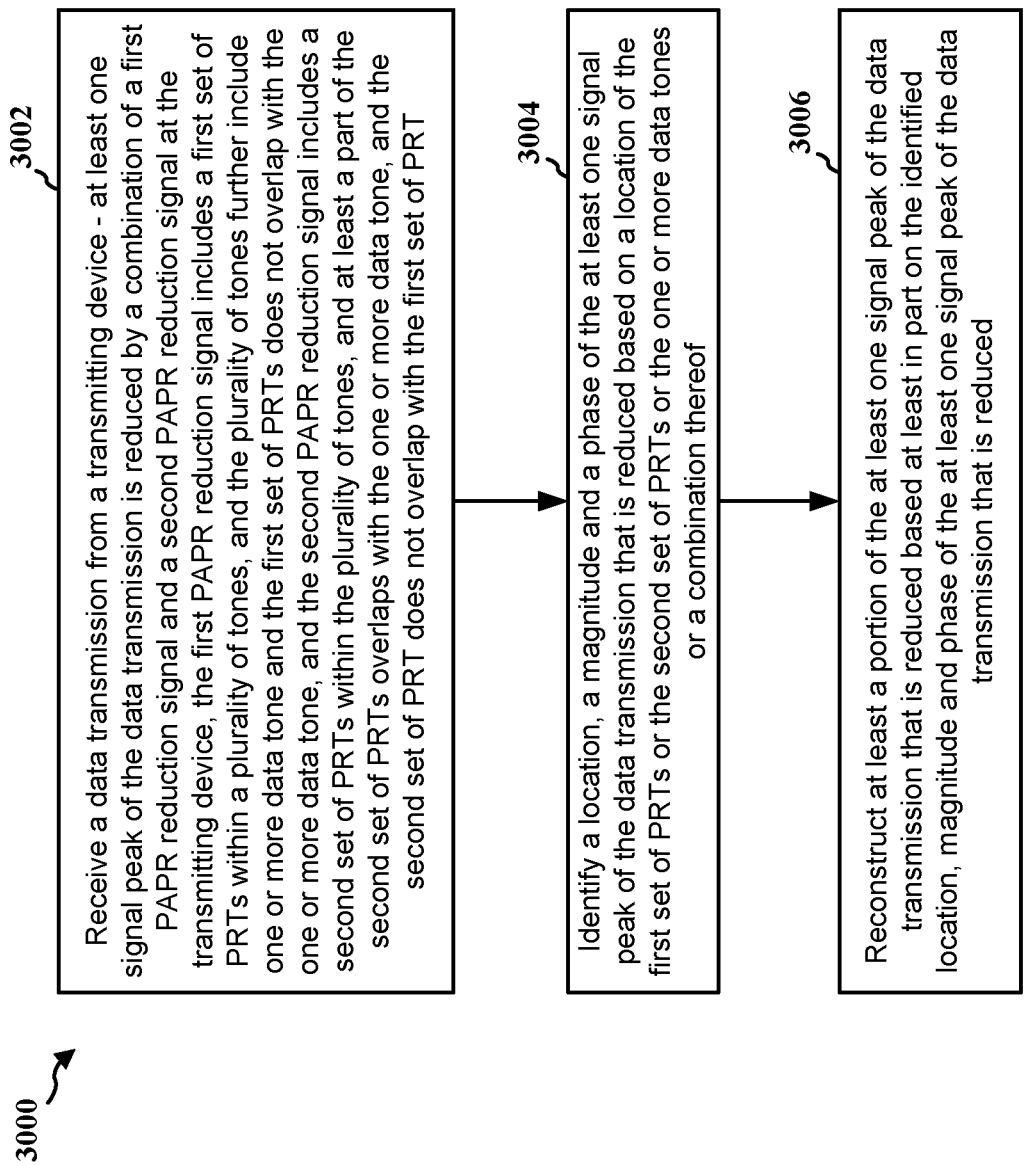
FIG. 30 is a flowchart of a method of wireless communication in accordance with various aspects of the present disclosure.

FIG. 30 is a flowchart 3000 of a method of wireless communication. The method may be performed by a receiving device or a component of a receiving device (e.g., the receiving device 2704; the apparatus 3102; which may include the memory 376 and which may be the entire base station 310 or a component of the base station 310, such as the TX processor 316, the RX processor 370, and/or the controller/processor 375). In some aspects, the method may be performed by a base station or a component of a base station (e.g., base station 102, 180, 310). In other aspects, the method may be performed by a UE or a component of a UE (e.g., UE 104, 350). The method may enable the receiving device to indicate to the transmitting device whether to send a transmission using tone reservation. The method may enable the receiving device to receive a transmission with one or more peak cancelled by a transmitting device, and to regenerate at least a portion of the one or more cancelled peak.

At 3002, the receiving device may receive a data transmission from a transmitting device, where at least one signal peak of the data transmission may be reduced by a combination of a first PAPR reduction signal and a second PAPR reduction signal at the transmitting device. The first PAPR reduction signal may include a first set of PRTs within a plurality of tones, and the plurality of tones may further include one or more data tone. The first set of PRTs may not overlap with the one or more data tone. The second PAPR reduction signal may include a second set of PRTs within the plurality of tones, and at least a part of the second set of PRTs may overlap with the one or more data tone. The second set of PRT may not overlap with the first set of PRT, such as described in connection with FIGS. 16-20 and 27. For example, at 2712, the receiving device 2704 may receive a data transmission from the transmitting device 2702, where at least one signal peak of the data transmission may be reduced by a combination of a PAPR reduction signal and a second PAPR reduction signal at the transmitting device, the first PAPR reduction signal includes a first set of PRTs within a plurality of tones, and the plurality of tones further include one or more data tone and the first set of PRTs does not overlap with the one or more data tone, and the second PAPR reduction signal includes a second set of PRTs within the plurality of tones, and at least a part of the second set of PRTs overlaps with the one or more data tone, and the second set of PRTs does not overlap with the first set of PRT. The reception of the data transmission may be performed, e.g., by the data reception process component 3140 and/or the reception component 3130 of the apparatus 3102 in FIG. 31.

In one example, the first PAPR reduction signal may be generated from a first kernel and the second PAPR reduction signal may be generated from a second kernel at the transmitting device. In such an example, the first kernel may be configured to generate the first PAPR reduction signal without impacting EVM, whereas the second kernel may be configured to generate the second PAPR reduction signal without peak regrowth. In another example, prior to receive the data transmission, the receiving device may transmit an indication to the receiving device, such as a transmitting device, to apply PAPR reduction for the data transmission. The receiving device may also indicate a permissible spectral density to the transmitting device. The receiving device may send indications, parameters, or location of the peak reduction tones to the transmitting device in at least one of RRC signaling, DCI, or a MAC-CE.

At 3004, the receiving device may identify a location, a magnitude and a phase of the at least one signal peak of the data transmission that is reduced based on a location of the first set of PRTs or the second set of PRTs or the one or more data tones or a combination thereof, such as described in connection with FIGS. 16-20 and 27. For example, at 2714, the receiving device 2704 may identify a location, a magnitude and a phase of the at least one signal peak of the data transmission that is reduced based on a location of the first set of PRTs or the second set of PRTs or the one or more data tones or a combination thereof. The identification of the location, the magnitude and the phase of the at least one signal peak of the data transmission may be performed, e.g., by the identification component 3142 of the apparatus 3102 in FIG. 31.

At 3006, the receiving device may regenerate at least a portion of the at least one signal peak of the data transmission that is reduced based at least in part on the identified location, magnitude and phase of the at least one signal peak of the data transmission that is reduced, such as described in connection with FIGS. 16-20. For example, at 2716, the receiving device 2704 may regenerate at least a portion of the at least one signal peak of the data transmission that is reduced based at least in part on the identified location, magnitude and phase of the at least one signal peak of the data transmission that is reduced. The regeneration of the at least one signal peak of the data transmission may be performed, e.g., by the signal regeneration component 3144 of the apparatus 3102 in FIG. 31.

In one example, the regeneration of the at least one signal peak of the data transmission may increase the SNR of the data transmission. In another example, to regenerate a peak cancelled by the first PAPR reduction signal and the second PAPR reduction signal, the receiving device may apply a first ratio to the first PAPR reduction signal and a second ratio to the second PAPR reduction signal, such as described in connection with FIGS. 16-20, where the value of the first ratio and the second ratio may each be less than one, and the first ratio and the second ratio may optionally add up to one. In one aspect, the receiving device may determine the first ratio and the second ratio based on one or more of: channel conditions, an amount of available peak reduction tones, whether a target PAPR can be achieved with a kernel applied to reserved tones, and/or sharing of peak reduction tones with other user equipment. The receiving device may also send an indication of a parameter for at least one of the first ratio or the second ratio to the transmitting device, such that the transmitting device may apply the parameter for the first ratio or the second ratio when sending the data transmission to the receiving device. In response, the receiving device may receive a response from the transmitting device about the parameter, such as a receiving confirmation or capability/availability to apply the parameter, etc.

Figure 31:
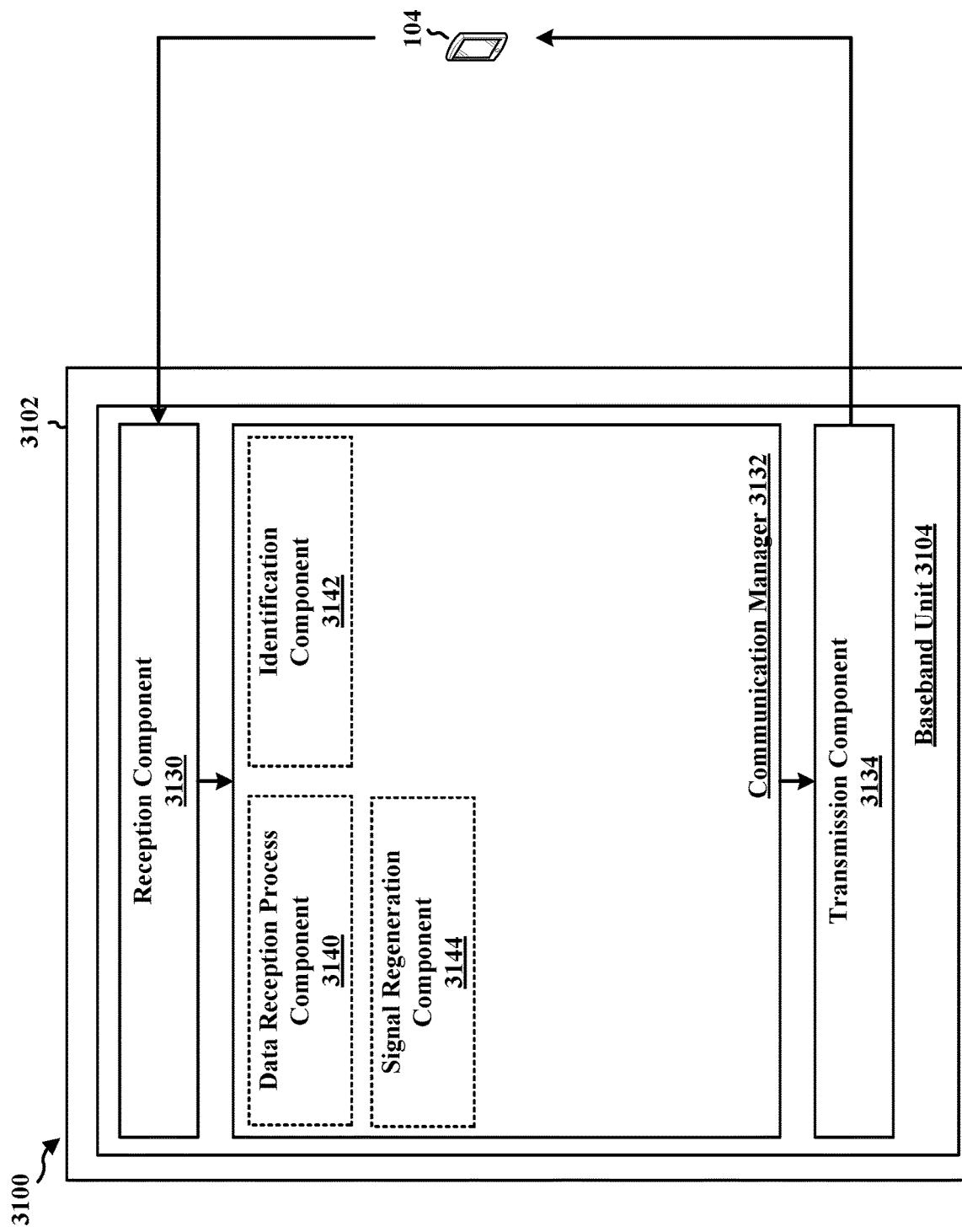
FIG. 31 is a diagram illustrating an example of a hardware implementation for an example apparatus in accordance with various aspects of the present disclosure.

FIG. 31 is a diagram 3100 illustrating an example of a hardware implementation for an apparatus 3102. The apparatus may correspond to the receiving device 2704 described in connection with FIG. 27, for example. In some aspects, the apparatus 3102 may be a base station or a component of base station. In other aspects, the apparatus may be a UE or a component of a UE. The apparatus may include a baseband unit 3104. The baseband unit 3104 may communicate through a cellular RF transceiver with a transmitting device. In some aspects, the apparatus 3102 may be a base station and the transmitting device may be a UE, e.g., UE 104. In other aspects, the apparatus 3102 may be a UE and the transmitting device may be a base station. The baseband unit 3104 may include a computer-readable medium/memory. The baseband unit 3104 is responsible for general processing, including the execution of software stored on the computer-readable medium/memory. The software, when executed by the baseband unit 3104, causes the baseband unit 3104 to perform the various functions described herein. The computer-readable medium/memory may also be used for storing data that is manipulated by the baseband unit 3104 when executing software. The baseband unit 3104 further includes a reception component 3130, a communication manager 3132, and a transmission component 3134. The communication manager 3132 includes the one or more illustrated components. The components within the communication manager 3132 may be stored in the computer-readable medium/memory and/or configured as hardware within the baseband unit 3104. The baseband unit 3104 may be a component of the BS 310 and may include the memory 376 and/or at least one of the TX processor 316, the RX processor 370, and the controller/processor 375.

The communication manager 3132 includes a data reception process component 3140 that receives a data transmission from a transmitting device, where at least one signal peak of the data transmission is reduced by a combination of a first PAPR reduction signal and a second PAPR reduction signal at the transmitting device, where the first PAPR reduction signal includes a first set of PRTs within a plurality of tones, and the plurality of tones further include one or more data tone and the first set of PRTs does not overlap with the one or more data tone, and where the second PAPR reduction signal includes a second set of PRTs within the plurality of tones, and at least a part of the second set of PRTs overlaps with the one or more data tone, and the second set of PRT does not overlap with the first set of PR, e.g., as described in connection with 3002 of FIG. 30. The communication manager 3132 further includes an identification component 3142 that identifies a location, a magnitude and a phase of the at least one signal peak of the data transmission that is reduced based on a location of the first set of PRTs or the second set of PRTs or the one or more data tones or a combination thereof, e.g., as described in connection with 3004 of FIG. 30. The communication manager 3132 further includes a signal regeneration component 3144 that regenerates at least a portion of the at least one signal peak of the data transmission that is reduced based at least in part on the identified location, magnitude and phase of the at least one signal peak of the data transmission that is reduced, e.g., as described in connection with 3006 of FIG. 30.

The apparatus may include additional components that perform each of the blocks of the algorithm in the flowcharts of FIG. 30. As such, each block in the flowcharts of FIG. 30 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 3002, and in particular the baseband unit 3004, includes means for receiving a data transmission from a transmitting device, where at least one signal peak of the data transmission is reduced by a combination of a first PAPR reduction signal and a second PAPR reduction signal at the transmitting device, where the first PAPR reduction signal includes a first set of PRTs within a plurality of tones, and the plurality of tones further include one or more data tone and the first set of PRTs does not overlap with the one or more data tone, and where the second PAPR reduction signal includes a second set of PRTs within the plurality of tones, and at least a part of the second set of PRTs overlaps with the one or more data tone, and the second set of PRT does not overlap with the first set of PRT (e.g., the data reception process component 3140 and/or the reception component 3130). The apparatus 3102 may further include means for identifying a location, a magnitude and a phase of the at least one signal peak of the data transmission that is reduced based on a location of the first set of PRTs or the second set of PRTs or the one or more data tones or a combination thereof (e.g., the identification component 3142). The apparatus 3102 may further include means for regenerating at least a portion of the at least one signal peak of the data transmission that is reduced based at least in part on the identified location, magnitude and phase of the at least one signal peak of the data transmission that is reduced (e.g., the signal regeneration component 3144).

The means may be one or more of the components of the apparatus 3102 configured to perform the functions recited by the means. As described herein, the apparatus 3102 may include the TX Processor 316, the RX Processor 370, and the controller/processor 375. As such, in one configuration, the means may be the TX Processor 316, the RX Processor 370, and the controller/processor 375 configured to perform the functions recited by the means.

The following aspects are illustrative only and may be combined with other aspects or teachings described herein, without limitation.

Aspect 1 is a method of wireless communication at a transmitting device, including: communicating with a receiving device an indication to apply PAPR reduction for a data transmission; applying a first PAPR reduction signal and a second PAPR reduction signal to the data transmission to reduce at least one signal peak of the data transmission to yield a transmission signal, where the first PAPR reduction signal includes a first set of PRTs that does not overlap with data tones and the second PAPR reduction includes a second set of PRTs that overlaps with the data tones and does not overlap with reserved tones; and transmitting the transmission signal to the receiving device.

In aspect 2, the method of aspect 1 further includes that in applying the first PAPR reduction signal and the second PAPR reduction signal to a data transmission, the method further includes: applying a first ratio to the first PAPR reduction signal and a second ratio to the second PAPR reduction signal.

In aspect 3, the method of aspect 1 or aspect 2 further includes that in applying the first PAPR reduction signal and the second PAPR reduction signal to a data transmission, the method further includes: combining the first PAPR reduction signal with the second PAPR reduction signal to form a third PAPR reduction signal prior to applying the first PAPR reduction signal and the second PAPR reduction signal to the data transmission.

In aspect 4, the method of any of aspects 1-3 further includes that the first ratio and the second ratio are determined based on one or more of: channel conditions, an amount of available peak reduction tones, whether a target PAPR can be achieved with a kernel applied to reserved tones, or sharing of peak reduction tones with other user equipment.

In aspect 5, the method of any of aspects 1-4 further includes that the transmitting device is a base station, the method further including: sending an indication of a parameter for at least one of the first ratio or the second ratio to the receiving device.

In aspect 6, the method of any of aspects 1-5 further includes: receiving a response about the parameter from the receiving device.

In aspect 7, the method of any of aspects 1-6 further includes that the first PAPR reduction signal is generated from a first kernel and the second PAPR reduction signal is generated from a second kernel.

In aspect 8, the method of any of aspects 1-7 further includes that the first kernel is configured to generate the first PAPR reduction signal without impacting EVM.

In aspect 9, the method of any of aspects 1-8 further includes that the second kernel is configured to generate the second PAPR reduction signal without peak regrowth.

In aspect 10, the method of any of aspects 1-9 further includes that the transmitting device is a base station, the method further including: transmitting an indication to the receiving device to apply PAPR reduction for the data transmission.

In aspect 11, the method of any of aspects 1-10 further includes that the transmitting device is a UE, the method further including: receiving an indication from a base station to apply PAPR reduction for the data transmission.

In aspect 12, the method of any of aspects 1-11 further includes that the transmitting device is a base station, the method further including: indicating a permissible spectral density to the receiving device.

In aspect 13, the method of any of aspects 1-12 further includes that the transmitting device is a UE, the method further including: receiving an indication from a base station of a permissible spectral density.

In aspect 14 the method of any of aspects 1-13 further includes that the transmitting device is a UE and the receiving device is a base station, and where the UE receives an indication for the location of the reserved tones in at least one of RRC signaling, DCI, or a MAC-CE.

In aspect 15, the method of any of aspects 1-14 further includes that the transmitting device is a base station, and where the base station indicates the location of the reserved tones in at least one of RRC signaling, DCI, or a MAC-CE.

Aspect 16 is an apparatus for wireless communication including at least one processor coupled to a memory and configured to implement a method as in any of aspects 1 to 15.

Aspect 17 is an apparatus for wireless communication including means for implementing a method as in any of aspects 1 to 15.

Aspect 18 is a non-transitory computer-readable medium storing computer executable code, where the code when executed by a processor causes the processor to implement a method as in any of aspects 1 to 15.

Aspect 19 is a method of wireless communication at a receiving device, including: receiving a data transmission from a transmitting device, where at least one signal peak of the data transmission is reduced by a combination of a first PAPR reduction signal and a second PAPR reduction signal at the transmitting device, where the first PAPR reduction signal includes a first set of PRTs within a plurality of tones, and the plurality of tones further include one or more data tone and the first set of PRTs does not overlap with the one or more data tone, and where the second PAPR reduction signal includes a second set of PRTs within the plurality of tones, and at least a part of the second set of PRTs overlaps with the one or more data tone, and the second set of PRT does not overlap with the first set of PRT; identifying a location, a magnitude and a phase of the at least one signal peak of the data transmission that is reduced based on a location of the first set of PRTs or the second set of PRTs or the one or more data tones or a combination thereof; and regenerating at least a portion of the at least one signal peak of the data transmission that is reduced based at least in part on the identified location, magnitude and phase of the at least one signal peak of the data transmission that is reduced.

In aspect 20, the method of aspect 19 further includes that the regeneration of the at least one signal peak of the data transmission increases the SNR of the data transmission.

In aspect 21, the method of aspect 19 or aspect 20 further includes: applying a first ratio to the first PAPR reduction signal and a second ratio to the second PAPR reduction signal.

In aspect 22, the method of any of aspects 19-21 further includes that the first ratio and the second ratio are each less than one and the first ratio and the second ratio add up to one.

In aspect 23, the method of any of aspects 19-22 further includes that the first ratio and the second ratio are determined based on one or more of: channel conditions, an amount of available peak reduction tones, whether a target PAPR can be achieved with a kernel applied to reserved tones, or sharing of peak reduction tones with other user equipment.

In aspect 24, the method of any of aspects 19-23 further includes that the receiving device is a base station, the method further including: sending an indication of a parameter for at least one of the first ratio or the second ratio to the transmitting device.

In aspect 25, the method of any of aspects 19-24 further includes: receiving a response about the parameter from the transmitting device.

In aspect 26, the method of any of aspects 19-25 further includes that the first PAPR reduction signal is generated from a first kernel and the second PAPR reduction signal is generated from a second kernel.

In aspect 27, the method of any of aspects 19-26 further includes that the first kernel is configured to generate the first PAPR reduction signal without impacting EVM.

In aspect 28, the method of any of aspects 19-27 further includes that the second kernel is configured to generate the second PAPR reduction signal without peak regrowth.

In aspect 29, the method of any of aspects 19-28 further includes that the receiving device is a base station, the method further including: transmitting an indication to a UE to apply PAPR reduction for the data transmission.

In aspect 30, the method of any of aspects 19-29 further includes that the receiving device is a UE, the method further including: receiving an indication from a base station to apply PAPR reduction for the data transmission.

In aspect 31, the method of any of aspects 19-30 further includes that the receiving device is a base station, the method further including: indicating a permissible spectral density to the transmitting device.

In aspect 32, the method of any of aspects 19-31 further includes that the receiving device is a UE, the method further including: receiving an indication from a base station of a permissible spectral density.

In aspect 33, the method of any of aspects 19-32 further includes that the receiving device is a UE and the transmitting device is a base station, and where the UE receives an indication for the location of the peak reduction tones in at least one of RRC signaling, DCI, or a MAC-CE.

In aspect 34, the method of any of aspects 19-33 further includes that the receiving device is a base station, and where the base station indicates the location of the peak reduction tones in at least one of RRC signaling, DCI, or a MAC-CE.

Aspect 35 is an apparatus for wireless communication including at least one processor coupled to a memory and configured to implement a method as in any of aspects 19 to 34.

Aspect 36 is an apparatus for wireless communication including means for implementing a method as in any of aspects 19 to 34.

Aspect 37 is a computer-readable medium storing computer executable code, where the code when executed by a processor causes the processor to implement a method as in any of aspects 19 to 34.

Aspect 38 is yet another method of wireless communication at a transmitting device. The method (like other techniques discussed herein) may include one or more optional actions and/or steps (such as those that follow). For example, the method may include generating a first PAPR reduction signal from a first set of PRTs within a plurality of tones, where the plurality of tones further include one or more reserved tones and the first set of PRTs does not overlap with data tones of the plurality of tones. The method may also include generating a second PAPR reduction signal from a second set of PRTs within the plurality of tones, where at least a part of the second set of PRTs overlaps with the data tones, and the second set of PRT does not overlap with reserved tones of the plurality of tones. The method may also include applying the first PAPR reduction signal and the second PAPR reduction signal to a data transmission, where at least one signal peak of the data transmission is reduced by the first PAPR reduction signal and the second PAPR reduction signal. Further, the method may optionally include sending the data transmission to a receiving device.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a transmitting device, comprising:
    a memory; and
    at least one processor, communicatively connected to the memory, the memory and the at least one processor configured to:
        communicate with a receiving device an indication to apply peak to average power ratio (PAPR) reduction for a data transmission;
        apply a first PAPR reduction signal and a second PAPR reduction signal to the data transmission to reduce at least one signal peak of the data transmission to yield a transmission signal, wherein the first PAPR reduction signal comprises a first set of peak reduction tones (PRTs) that does not overlap with data tones and the second PAPR reduction comprises a second set of PRTs that overlaps with the data tones and does not overlap with reserved tones; and
        transmit the transmission signal to the receiving device.

2. The apparatus of claim 1, to apply the first PAPR reduction signal and the second PAPR reduction signal to the data transmission the at least one processor is further configured to:
    apply a first ratio to the first PAPR reduction signal and a second ratio to the second PAPR reduction signal.

3. The apparatus of claim 2, to apply the first PAPR reduction signal and the second PAPR reduction signal to the data transmission the at least one processor is further configured to:
    combine the first PAPR reduction signal with the second PAPR reduction signal to form a third PAPR reduction signal prior to applying the first PAPR reduction signal and the second PAPR reduction signal to the data transmission.

4. The apparatus of claim 3, wherein the first ratio and the second ratio are determined based on one or more of:
    channel conditions,
    an amount of available peak reduction tones,
    whether a target peak to average power ratio (PAPR) can be achieved with a kernel applied to the reserved tones, or
    sharing of peak reduction tones with other user equipment.

5. The apparatus of claim 3, further comprising:
    a transceiver communicatively coupled to the memory and the at least one processor, wherein the transmitting device is a base station, the at least one processor, and the transceiver are further configured to:
    transmit an additional indication of a parameter for at least one of the first ratio or the second ratio to the receiving device.

6. The apparatus of claim 1, wherein the first PAPR reduction signal is generated from a first kernel and the second PAPR reduction signal is generated from a second kernel.

7. The apparatus of claim 6, wherein the first kernel is configured to generate the first PAPR reduction signal without impacting error vector magnitude (EVM) and the second kernel is configured to generate the second PAPR reduction signal without peak regrowth.

8. The apparatus of claim 1, further comprising:
    a transceiver communicatively coupled to the memory and the at least one processor, wherein the transmitting device is a base station, the at least one processor, and the transceiver are further configured to:
    transmit the indication to the receiving device to apply PAPR reduction for the data transmission.

9. The apparatus of claim 1, further comprising:
    a transceiver communicatively coupled to the memory and the at least one processor, wherein the transmitting device is a user equipment (UE), the at least one processor, and the transceiver are further configured to:
    receive the indication from a base station to apply PAPR reduction for the data transmission.

10. The apparatus of claim 1, wherein the transmitting device is a user equipment (UE) and the receiving device is a base station, and wherein the memory and the at least one processor is configured to receive an additional indication for a location of the reserved tones in at least one of radio resource control (RRC) signaling, downlink control information (DCI), or a medium access control-control element (MAC-CE).

11. The apparatus of claim 1, wherein the transmitting device is a base station, and wherein the memory and the at least one processor is configured to indicate a location of the reserved tones in at least one of radio resource control (RRC) signaling, downlink control information (DCI), or a medium access control-control element (MAC-CE).

12. The apparatus of claim 1, further comprising a transceiver coupled to the at least one processor, wherein the at least one processor is configured to transmit the data transmission to the receiving device via the transceiver.

13. A method of wireless communication at a transmitting device, comprising:
communicating with a receiving device an indication to apply peak to average power ratio (PAPR) reduction for a data transmission;
applying a first PAPR reduction signal and a second PAPR reduction signal to the data transmission to reduce at least one signal peak of the data transmission to yield a transmission signal, wherein the first PAPR reduction signal comprises a first set of peak reduction tones (PRTs) that does not overlap with data tones and the second PAPR reduction comprises a second set of PRTs that overlaps with the data tones and does not overlap with reserved tones; and
transmitting the transmission signal to the receiving device.

14. The method of claim 13, in applying the first PAPR reduction signal and the second PAPR reduction signal to the data transmission, further comprising:
applying a first ratio to the first PAPR reduction signal and a second ratio to the second PAPR reduction signal.

15. The method of claim 14, in applying the first PAPR reduction signal and the second PAPR reduction signal to the data transmission, further comprising:
combining the first PAPR reduction signal with the second PAPR reduction signal to form a third PAPR reduction signal prior to applying the first PAPR reduction signal and the second PAPR reduction signal to the data transmission.

16. The method of claim 15, wherein the first ratio and the second ratio are determined based on one or more of:
channel conditions,
an amount of available peak reduction tones,
whether a target peak to average power ratio (PAPR) can be achieved with a kernel applied to the reserved tones, or
sharing of peak reduction tones with other user equipment.

17. The method of claim 15, wherein the transmitting device is a base station, the method further comprising:
sending an additional indication of a parameter for at least one of the first ratio or the second ratio to the receiving device.

18. The method of claim 13, wherein the first PAPR reduction signal is generated from a first kernel and the second PAPR reduction signal is generated from a second kernel.

19. The method of claim 18, wherein the first kernel is configured to generate the first PAPR reduction signal without impacting error vector magnitude (EVM) and the second kernel is configured to generate the second PAPR reduction signal without peak regrowth.

20. The method of claim 13, wherein the transmitting device is a base station, the method further comprising:
transmitting the indication to the receiving device to apply PAPR reduction for the data transmission.

21. The method of claim 13, wherein the transmitting device is a user equipment (UE), the method further comprising:
receiving the indication from a base station to apply PAPR reduction for the data transmission.

22. The method of claim 13, wherein the transmitting device is a user equipment (UE) and the receiving device is a base station, and wherein the UE receives an additional indication for a location of the reserved tones in at least one of radio resource control (RRC) signaling, downlink control information (DCI), or a medium access control-control element (MAC-CE).

23. The method of claim 13, wherein the transmitting device is a base station, and wherein the base station indicates a location of the reserved tones in at least one of radio resource control (RRC) signaling, downlink control information (DCI), or a medium access control-control element (MAC-CE).

24. An apparatus for wireless communication at a receiving device, comprising:
a memory; and
at least one processor, communicatively connected to the memory, the at least one processor configured to:
receive a data transmission from a transmitting device, wherein at least one signal peak of the data transmission is reduced by a combination of a first peak to average power ratio (PAPR) reduction signal and a second PAPR reduction signal at the transmitting device, wherein the first PAPR reduction signal comprises a first set of peak reduction tones (PRTs) within a plurality of tones, and the plurality of tones further comprise one or more data tone and the first set of PRTs does not overlap with the one or more data tone, and wherein the second PAPR reduction signal comprises a second set of PRTs within the plurality of tones, and at least a part of the second set of PRTs overlaps with the one or more data tone, and the second set of PRTs does not overlap with the first set of PRT;
identify a location, a magnitude and a phase of the at least one signal peak of the data transmission that is reduced based on a location of the first set of PRTs or the second set of PRTs or the one or more data tones or a combination thereof; and
regenerate at least a portion of the at least one signal peak of the data transmission that is reduced based at least in part on the identified location, the magnitude and the phase of the at least one signal peak of the data transmission that is reduced.

25. The apparatus of claim 24, wherein the memory and the at least one processor are further configured to:
apply a first ratio to the first PAPR reduction signal and a second ratio to the second PAPR reduction signal.

26. The apparatus of claim 25, wherein the first ratio and the second ratio are determined based on one or more of:
channel conditions,
an amount of available peak reduction tones,
whether a target peak to average power ratio (PAPR) can be achieved with a kernel applied to reserved tones, or
sharing of peak reduction tones with other user equipment.

27. The apparatus of claim 25, further comprising:
a transceiver communicatively coupled to the memory and the at least one processor, wherein the receiving device is a base station, the at least one processor, and the transceiver are further configured to:

transmit an indication of a parameter for at least one of the first ratio or the second ratio to the transmitting device.

28. A method of wireless communication at a receiving device, comprising:

receiving a data transmission from a transmitting device, wherein at least one signal peak of the data transmission is reduced by a combination of a first peak to average power ratio (PAPR) reduction signal and a second PAPR reduction signal at the transmitting device, wherein the first PAPR reduction signal comprises a first set of peak reduction tones (PRTs) within a plurality of tones, and the plurality of tones further comprise one or more data tone and the first set of PRTs does not overlap with the one or more data tone, and wherein the second PAPR reduction signal comprises a second set of PRTs within the plurality of tones, and at least a part of the second set of PRTs overlaps with the one or more data tone, and the second set of PRTs does not overlap with the first set of PRT;

identifying a location, a magnitude and a phase of the at least one signal peak of the data transmission that is reduced based on a location of the first set of PRTs or the second set of PRTs or the one or more data tones or a combination thereof; and regenerating at least a portion of the at least one signal peak of the data transmission that is reduced based at least in part on the identified location, the magnitude and the phase of the at least one signal peak of the data transmission that is reduced.

29. The method of claim 28, further comprising:
applying a first ratio to the first PAPR reduction signal and a second ratio to the second PAPR reduction signal.

30. The method of claim 29, wherein the first ratio and the second ratio are determined based on one or more of:
channel conditions,
an amount of available peak reduction tones,
whether a target peak to average power ratio (PAPR) can be achieved with a kernel applied to reserved tones, or
sharing of peak reduction tones with other user equipment.

31. The method of claim 29, wherein the receiving device is a base station, the method further comprising:
sending an indication of a parameter for at least one of the first ratio or the second ratio to the transmitting device.

* * * * *